(12) United States Patent
Baratta

(10) Patent No.: US 10,953,509 B2
(45) Date of Patent: Mar. 23, 2021

(54) DATA COLLECTION, TRANSFER AND FEEDBACK IN WORKING TOOLS

(71) Applicant: BARON INVESTMENTS LLC, Oxnard, CA (US)

(72) Inventor: Anthony Baratta, Oak Park, CA (US)

(73) Assignee: Baron Investments, LLC, Oxnard, CA (US)

(*) Notice: Subject to any disclaimer, the term of this patent is extended or adjusted under 35 U.S.C. 154(b) by 607 days.

(21) Appl. No.: 15/503,398

(22) PCT Filed: Aug. 17, 2015

(86) PCT No.: PCT/US2015/045584
§ 371 (c)(1),
(2) Date: May 12, 2017

(87) PCT Pub. No.: WO2016/025963
PCT Pub. Date: Feb. 18, 2016

(65) Prior Publication Data
US 2017/0274489 A1  Sep. 28, 2017

Related U.S. Application Data

(60) Provisional application No. 62/112,178, filed on Feb. 5, 2015, provisional application No. 62/037,617, filed on Aug. 15, 2014.

(51) Int. Cl.
*B23Q 17/00* (2006.01)
*B23Q 17/09* (2006.01)
(Continued)

(52) U.S. Cl.
CPC ...... *B23Q 17/0995* (2013.01); *B23B 51/0406* (2013.01); *B23D 59/001* (2013.01);
(Continued)

(58) Field of Classification Search
CPC .............. B23B 49/006; B23B 2231/10; B23B 2260/128; B23B 2270/36; B23B 45/00;
(Continued)

(56) References Cited

U.S. PATENT DOCUMENTS 4,773,800 A 9/1988 Furuhashi et al.
6,234,051 B1 5/2001 Bareggi
(Continued)

FOREIGN PATENT DOCUMENTS

WO  WO 2006/066259  6/2006
WO  WO 2007/141578  12/2007
(Continued)

OTHER PUBLICATIONS

Gillett, Tim, International Search Report, dated Nov. 16, 2015, 4 pages, Australian Patent Office, Woden Act Australia.
(Continued)

*Primary Examiner* — Scott A Smith
(74) *Attorney, Agent, or Firm* — Henricks Slavin LLP

(57) ABSTRACT

Tool bodies, tools and machines for operating the tool include electronic circuits for providing data, collecting data, analyzing data and for controlling machines based on such data. Tool bodies and tools may include electronic circuits having data collecting sensors, which may be embedded in a housing with the electronic circuit and/or positioned outside of such a housing. Sensors include temperature sensors, motion sensors, strain sensors, moisture sensors, electrical resistance sensors, position sensors, antennas, and other components.

31 Claims, 61 Drawing Sheets

(51) Int. Cl.

| | |
|---|---|
| *B23B 51/04* | (2006.01) |
| *B23D 59/00* | (2006.01) |
| *B23Q 15/12* | (2006.01) |
| *B24B 49/02* | (2006.01) |
| *B23D 61/02* | (2006.01) |
| *B23D 61/18* | (2006.01) |
| *B23Q 15/013* | (2006.01) |
| *B28D 1/12* | (2006.01) |
| *B28D 7/00* | (2006.01) |
| *G01K 7/02* | (2021.01) |
| *G01N 25/00* | (2006.01) |
| *G01S 19/35* | (2010.01) |
| *G06Q 30/02* | (2012.01) |
| *G06Q 30/06* | (2012.01) |

(52) U.S. Cl.
CPC ........... *B23D 61/02* (2013.01); *B23D 61/185* (2013.01); *B23Q 15/013* (2013.01); *B23Q 15/12* (2013.01); *B23Q 17/00* (2013.01); *B23Q 17/0971* (2013.01); *B23Q 17/0985* (2013.01); *B24B 49/02* (2013.01); *B28D 1/122* (2013.01); *B28D 7/005* (2013.01); *G01K 7/02* (2013.01); *G01N 25/00* (2013.01); *G01S 19/35* (2013.01); *G06Q 30/0283* (2013.01); *G06Q 30/0633* (2013.01); *G06Q 30/0645* (2013.01); *B23B 2231/10* (2013.01); *B23B 2260/128* (2013.01); *B23B 2270/32* (2013.01)

(58) Field of Classification Search
CPC ........ G05B 11/01; G05B 19/00; G05B 19/18; G05B 19/25; G05B 2219/33221; G05B 2219/37351; G05B 2219/45145; G05B 2219/49304; G05B 2219/49305; B23Q 15/12; B23Q 17/0985; B23Q 15/02; B23Q 17/00; B28D 7/005; B23D 61/02; B24B 49/02
USPC ............. 173/1, 2, 217, 171, 20; 83/72, 76.7, 83/522.11; 700/160, 169, 174, 175; 483/9; 451/5, 8; 408/16; 318/560
See application file for complete search history.

(56) References Cited

U.S. PATENT DOCUMENTS

| | | | |
|---|---|---|---|
| 6,585,628 | B1 | 7/2003 | Tsung et al. |
| 6,786,683 | B2 | 9/2004 | Schaer et al. |
| 7,240,845 | B2 | 7/2007 | Komine et al. |
| 7,431,682 | B2 * | 10/2008 | Zeiler ................ B23B 45/00 483/9 |
| 7,641,537 | B2 | 1/2010 | Rense |
| 7,673,360 | B2 | 3/2010 | Hilscher et al. |
| 7,740,425 | B2 | 6/2010 | Zeiler et al. |
| 7,840,305 | B2 * | 11/2010 | Behr .................. B24B 49/02 438/5 |
| 7,853,350 | B2 * | 12/2010 | Jou .................... B23Q 15/12 318/560 |
| 2006/0014475 | A1 | 1/2006 | Sekiya |
| 2006/0102682 | A1 | 5/2006 | Etter et al. |
| 2007/0213692 | A1 | 9/2007 | Neubauer et al. |
| 2008/0004743 | A1 * | 1/2008 | Goers ................ B24B 49/02 700/121 |
| 2008/0195244 | A1 | 8/2008 | Jou et al. |
| 2008/0262526 | A1 | 10/2008 | Neubardt et al. |
| 2009/0175694 | A1 | 7/2009 | Craig et al. |
| 2009/0301778 | A1 | 12/2009 | Taylor |
| 2010/0098507 | A1 | 4/2010 | Binmore |
| 2013/0291696 | A1 | 11/2013 | Gustaysson et al. |
| 2014/0334892 | A1 | 11/2014 | Baratta |
| 2017/0274489 | A1 | 9/2017 | Baratta |

FOREIGN PATENT DOCUMENTS

| | | |
|---|---|---|
| WO | WO 2008/002735 | 1/2008 |
| WO | WO 2014/152063 | 9/2014 |

OTHER PUBLICATIONS

Gillett, Tim, Written Opinion of the International Searching Authority, Nov. 16, 2015, 4 pages, Australian Patent Office, Woden Act Australia.

* cited by examiner

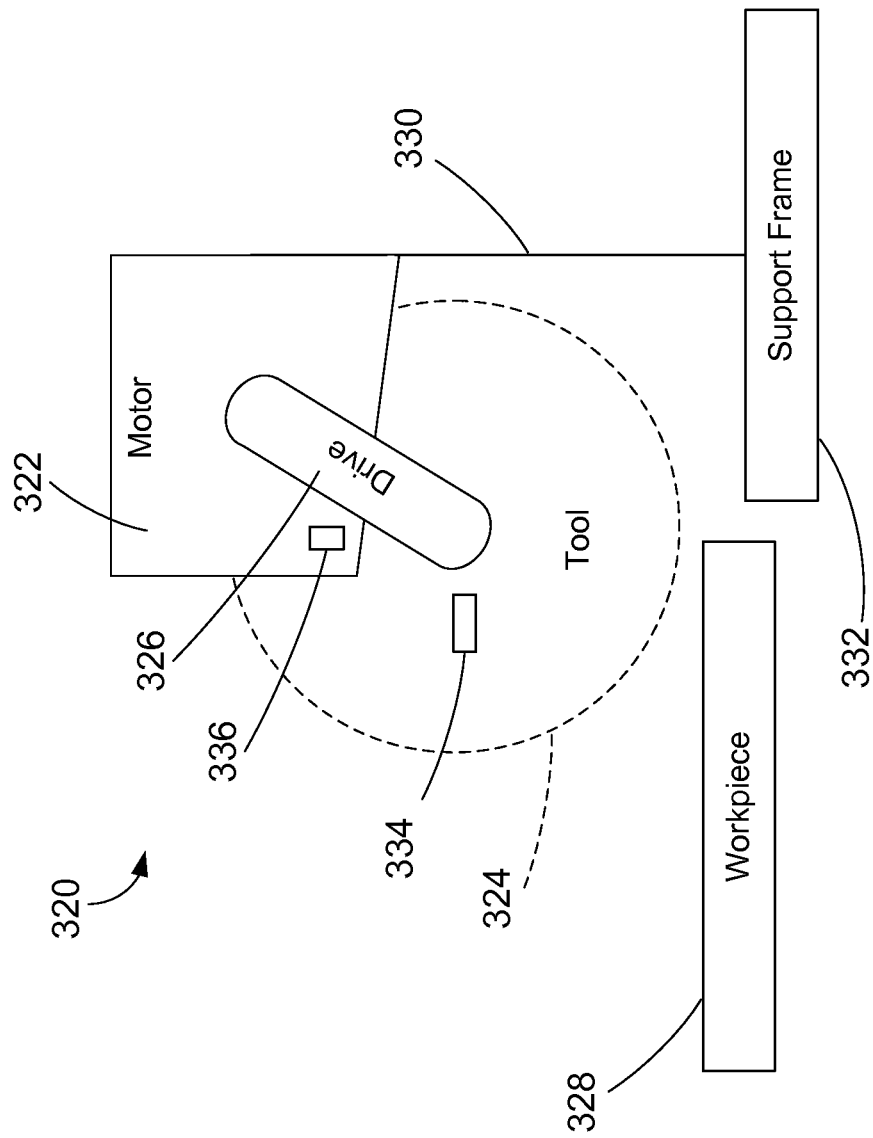

| IntelliCore with embedded sensors | |
|---|---|
| Housing length (in) | 3.25 or less |
| Housing width (in) | 1.75 or less |
| Housing thickness (in) | 0.060 or less |
| Housing material (enclosure) | PA Type 6 GFR 60 |
| Power LED color | green |
| Pairing link LED color | blue |
| Battery type | coin |
| Battery voltage | 1.5VDC |
| Battery diameter (in) | 1.5 or less |
| Battery thickness (in) | 0.05 or less |
| Battery life | 2 years |
| Thermocouple type | type K |
| Thermocouple location | molded into enclosure |
| Antenna location | molded into enclosure |
| Antenna Range | 50 feet (15.25M) |
| Data acquisition sample rate | ~80µs |
| Clock | 24hr |
| Power switch type | centrifugal |
| GPS type | On-chip |
| GPS location | molded into enclosure |
| Manufacturing data | see "On-chip data" spec sheet |
| Co-molded logo / brand | yes |

IntelliCore with remote sensors

| | |
|---|---|
| Housing length (in) | 3.25 or less |
| Housing width (in) | 1.75 or less |
| Housing thickness (in) | 0.060 or less |
| Housing material (enclosure) | PA Type 6 GFR 60 |
| Power LED color | green |
| Pairing link LED color | blue |
| Battery type | coin |
| Battery voltage | 1.5VDC |
| Battery diameter (in) | 1.5 or less |
| Battery thickness (in) | 0.05 or less |
| Battery life | 2 years |
| Thermocouple 1 type | type K |
| Thermocouple 1 location (in) | 2,500 BC |
| Thermocouple 1 lead length (in) | 3 |
| Thermocouple 2 type | type K |
| Thermocouple 2 location | peripheral edge of core |
| Thermocouple 2 lead length (in) | (diameter + 1)/2 |
| Antenna type | Bluetooth® WIFI |
| Antenna location | molded into enclosure |
| Antenna Range | ~50 feet (15.25M) |
| Data acquisition sample rate | 60-80µs |
| Clock | On-chip, sleep |
| Power switch type | Centrifugal, accelerometer |
| GPS type | Fujitsu |
| GPS location | On-chip |
| Power switch location | integrated |
| Manufacturing data | see "On-chip data" spec sheet |
| Moisture sensor type | Azo Sensors |
| Moisture sensor lead length (in) | (diameter + 1)/2 |
| Strain sensor type | X, Y ribbon |
| Strain sensor location | Depends on geometry |
| Strain sensor lead length (in) | (diameter + 1)/2 |
| SafeCore peripheral LED color | red |
| SafeCore peripheral LED location | Depends on geometry |
| SafeCore peripheral LED lead length (in) | (diameter + 1)/2 |
| Electrical resistance sensor type | See "ERS" spec sheet |
| Electrical resistance sensor Lead length (in) | (diameter + 1)/2 |
| Co-moulded logo / brand | yes |

| IntelliGrind with integrated sensors | | | |
|---|---|---|---|
| Housing Ø (in) | 1 or less | Data acquisition sample rate | 60-80µs |
| Housing width (in) | N/a | Clock | On-chip, sleep |
| Housing thickness (in) | 0.060 or less | Power switch type | accelerometer |
| Housing material (enclosure) | PA Type 6 GFR 60 | GPS type | Fujitsu |
| Power LED color | green | GPS location | On-chip |
| Pairing link LED color | blue | Power switch location | integrated |
| Battery type | coin | Manufacturing data | see "On-chip data" spec sheet |
| Battery voltage | 1.5VDC | Moisture sensor type | N/a |
| Battery diameter (in) | 0.75 or less | Moisture sensor lead length (in) | N/a |
| Battery thickness (in) | 0.05 or less | Strain sensor type | N/a |
| Battery life | 1 year | Strain sensor location | N/a |
| Thermocouple 1 type | type K | Strain sensor lead length (in) | N/a |
| Thermocouple 1 location (in) | Depends on diameter | SafeCore peripheral LED color | N/a |
| Thermocouple 1 lead length (in) | N/a | SafeCore peripheral LED location | N/a |
| Thermocouple 2 type | N/a | SafeCore peripheral LED lead length (in) | N/a |
| Thermocouple 2 location | N/a | Electrical resistance sensor type | N/a |
| Thermocouple 2 lead length (in) | N/a | Electrical resistance sensor Lead length (in) | N/a |
| Antenna type | Bluetooth® WIFI | | |
| Antenna location | molded into enclosure | | |
| Antenna Range | ~50 feet (15.25M) | Co-moulded logo / brand | yes |

| | General |
|---|---|
| Location in cores | Depends on core geometry |
| Laser cut geometry in cores | 0.005" offset from final housing |
| Installation method in solid core | Potted with 2216 epoxy |
| Installation method in laminated core | Bonded in cure cycle |
| Installation method in laminated embossed core | Bonded in cure cycle |
| Installation method in laminated orthotropic analog core | Potted with 2216 epoxy |
| Installation method in laminated embossed orthotropic analog core | Bonded in cure cycle |
| Location in laminated chain bars | Inside bearing plate |
| Installation method in laminated chain bars | Bonded in cure cycle |
| Laser cut geometry in laminated chain bars | 0.005" offset from final housing |
| Location in core tubes | Ultra spar plate / splash shield |
| Installation method in core tubes | Potted with 2216 epoxy |
| Laser cut geometry in core tubes | 0.005" offset from final housing |
| Location in threaded tubes | Drive flange |
| Laser cut geometry in threaded tubes | n/a |
| Installation method in threaded tubes | Potted with 2216 epoxy |
| Location in grooving / grinding cores | Depends on geometry |
| Laser cut geometry in grooving / grinding cores | 0.005" offset from final housing |
| Installation method in grooving / grinding cores | Potted with 2216 epoxy |
| Location in removeable segment cores | Depends on core geometry |
| Laser cut geometry in removable segment cores | 0.005" offset from final housing |
| Installation method in removable segment core | Bonded in cure cycle |
| Location in removable segment | Center 1" from outer edge |
| Laser cut geometry in removable segment | 0.005" offset from final housing |
| Installation method in removable segment | Potted with 2216 epoxy |

FIG. 9

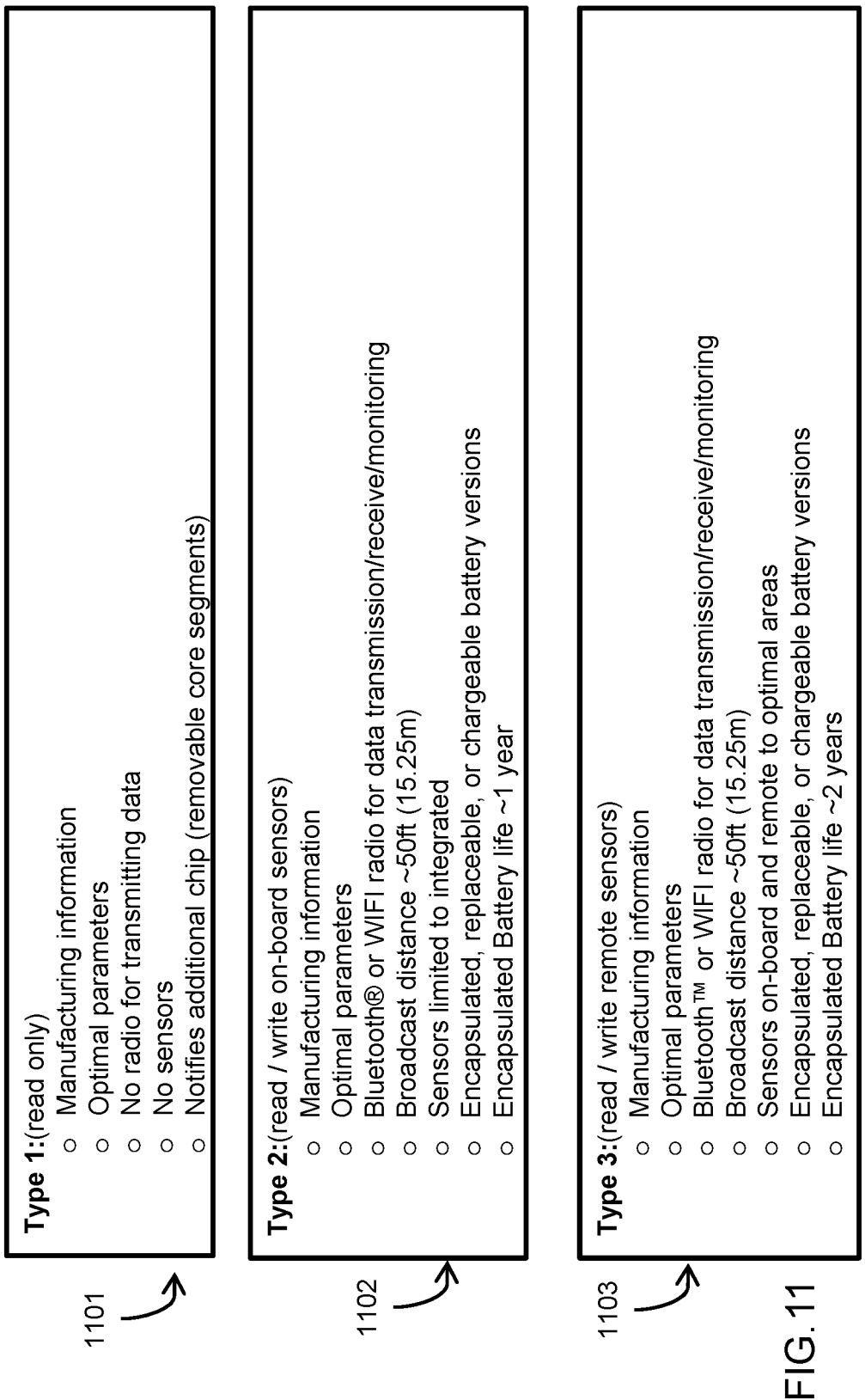

FIG. 11

Type 1: (read only)
- Manufacturing information
- Optimal parameters
- No radio for transmitting data
- No sensors
- Notifies additional chip (removable core segments)

1101

Type 2: (read / write on-board sensors)
- Manufacturing information
- Optimal parameters
- Bluetooth® or WIFI radio for data transmission/receive/monitoring
- Broadcast distance ~50ft (15.25m)
- Sensors limited to integrated
- Encapsulated, replaceable, or chargeable battery versions
- Encapsulated Battery life ~1 year

1102

Type 3: (read / write remote sensors)
- Manufacturing information
- Optimal parameters
- Bluetooth™ or WIFI radio for data transmission/receive/monitoring
- Broadcast distance ~50ft (15.25m)
- Sensors on-board and remote to optimal areas
- Encapsulated, replaceable, or chargeable battery versions
- Encapsulated Battery life ~2 years

1103

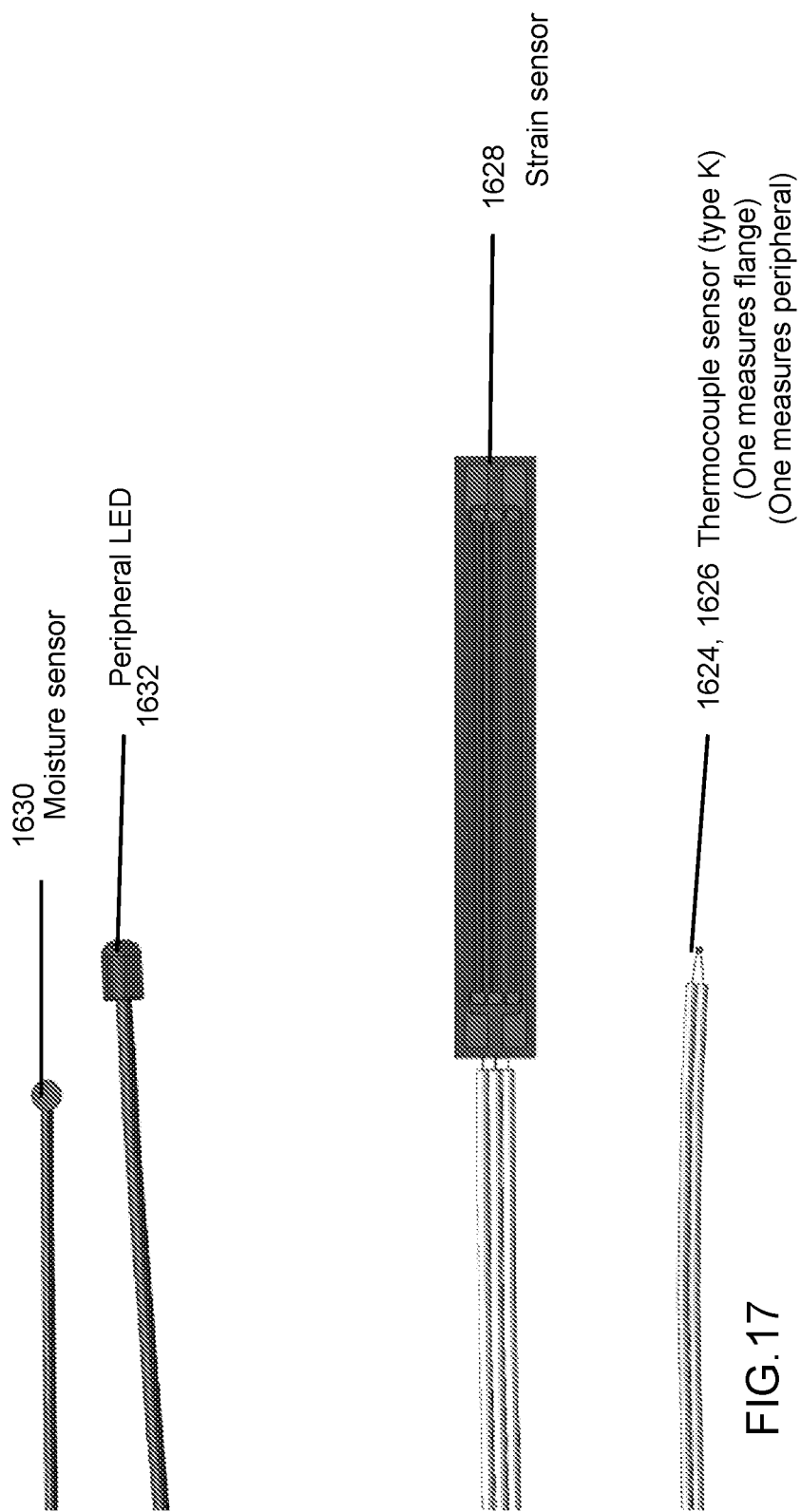

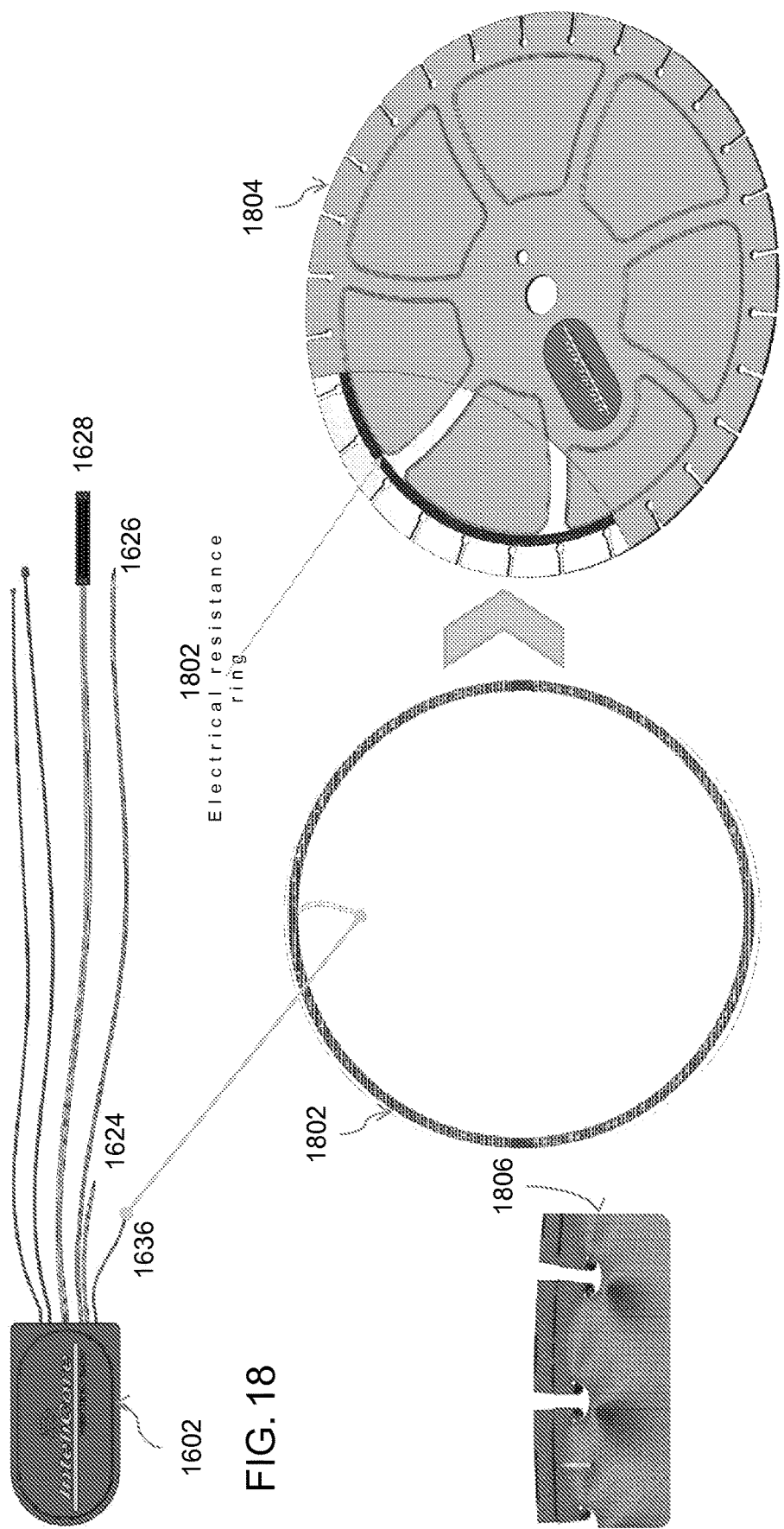

| Version | Description |
|---|---|
| DT | Diamond Tool |
| SB | Saw Body |
| CB | Chain Bar |
| DB | Drill Bit |
| TT | Threaded Tube |
| IP | Intellipart |
| GG | Groove / Grind |
| HH | Hand Held |
| EE | Early Entry |
| SP | Surface Prep |
| TM | Tile / Masonry |
| RD | Remote Demolition |
| WS | Wire Sawing |

FIG. 19B    1902

|  | DT | SB | HH | EE | TM | RD | DB | TT | CB | GG | WS | SP | IP |
|---|---|---|---|---|---|---|---|---|---|---|---|---|---|
| Electronic serial number | X | X | X | X | X | X | X | X | X | X | X | X | X |
| Manufacturing Date | X | X | X | X | X | X | X | X | X | X | X | X | X |
| Part Number | X | X | X | X | X | X | X | X | X | X | X | X | X |
| Revision number | X | X | X | X | X | X | X | X | X | X | X | X | X |
| Serial Number | X | X | X | X | X | X | X | X | X | X | X | X | X |
| Core construction type | X | X | X | X | X | X |  |  |  |  |  |  |  |
| Material Type | X | X | X | X | X | X | X | X | X | X | X | X | X |
| Heat Lot Number | X | X | X | X | X | X | X | X | X | X |  | X | X |
| Material Tag Number | X | X | X | X | X | X | X | X | X | X |  | X | X |
| Material Supplier | X | X | X | X | X | X | X | X | X | X |  | X | X |
| Hardness | X | X | X | X | X | X |  |  | X | X | X | X | X |
| Outer Diameter | X | X | X | X | X | X | X | X |  | X |  | X | X |
| Arbor Diameter | X | X | X | X | X | X |  |  |  | X |  | X | X |
| Special Arbor | X | X | X | X | X | X |  |  |  |  |  | X |  |
| Thickness | X | X | X | X | X | X | X | X | X | X |  | X | X |
| Thickness upper tolerance | X | X | X | X | X | X | X | X | X | X |  | X | X |
| Thickness lower tolerance | X | X | X | X | X | X | X | X | X | X |  | X | X |
| Segment / Carbide Details | X | X | X | X | X | X |  |  |  | X |  |  |  |
| Slot type 1 | X | X | X | X | X | X |  |  |  | X |  |  |  |
| Slot 1 width | X | X | X | X | X | X |  |  |  | X |  |  |  |
| Slot 1 length | X | X | X | X | X | X |  |  |  | X |  |  |  |
| Slot 1 Base Diameter | X | X | X | X | X | X |  |  |  | X |  |  |  |
| Slot 1 quantity | X | X | X | X | X | X |  |  |  | X |  |  |  |
| Slot 1 Angle | X | X | X | X | X | X |  |  |  | X |  |  |  |
| Slot type 2 | X | X | X | X | X | X |  |  |  | X |  |  |  |
| Slot 2 width | X | X | X | X | X | X |  |  |  | X |  |  |  |
| Slot 2 length | X | X | X | X | X | X |  |  |  | X |  |  |  |
| Slot 2 Base Diameter | X | X | X | X | X | X |  |  |  | X |  |  |  |
| Slot 2 quantity | X | X | X | X | X | X |  |  |  | X |  |  |  |
| Slot 2 Angle | X | X | X | X | X | X |  |  |  | X |  |  |  |

|  | DT | SB | HH | EE | TM | RD | DB | TT | CB | GG | WS | SP | IP |
|---|---|---|---|---|---|---|---|---|---|---|---|---|---|
| Rotation arrow bolt circle | X | X | X | X | X | X |  |  |  | X |  | X |  |
| Rotation arrow angle offset | X | X | X | X | X | X |  |  |  | X |  | X |  |
| Calculated land length | X | X | X | X | X | X |  |  |  | X |  |  |  |
| Drive pinhole 1 quantity | X | X | X | X | X | X | X |  |  | X |  | X |  |
| Drive pinhole 1 diameter | X | X | X | X | X | X | X |  |  | X |  | X |  |
| Drive pinhole 1 bolt circle | X | X | X | X | X | X | X |  |  | X |  | X |  |
| Drive pinhole 1 vertical offset | X | X | X | X | X | X | X |  |  | X |  | X |  |
| Drive pinhole 1 countersink | X | X | X | X | X | X | X |  |  | X |  | X |  |
| Drive pinhole 1 rotation | X | X | X | X | X | X | X |  |  | X |  | X |  |
| Drive pinhole 2 quantity | X | X | X | X | X | X | X |  |  | X |  | X |  |
| Drive pinhole 2 diameter | X | X | X | X | X | X | X |  |  | X |  | X |  |
| Drive pinhole 2 bolt circle | X | X | X | X | X | X | X |  |  | X |  | X |  |
| Drive pinhole 2 vertical offset | X | X | X | X | X | X | X |  |  | X |  | X |  |
| Drive pinhole 2 countersink | X | X | X | X | X | X | X |  |  | X |  | X |  |
| Drive pinhole 2 rotation | X | X | X | X | X | X | X |  |  | X |  | X |  |
| Drive pinhole 3 quantity | X | X | X | X | X | X | X |  |  | X |  | X |  |
| Drive pinhole 3 diameter | X | X | X | X | X | X | X |  |  | X |  | X |  |
| Drive pinhole 3 bolt circle | X | X | X | X | X | X | X |  |  | X |  | X |  |
| Drive pinhole 3 vertical offset | X | X | X | X | X | X | X |  |  | X |  | X |  |
| Drive pinhole 3 countersink | X | X | X | X | X | X | X |  |  | X |  | X |  |
| Drive pinhole 3 rotation | X | X | X | X | X | X | X |  |  | X |  | X |  |
| Drive pinhole 4 quantity | X | X | X | X | X | X | X |  |  | X |  | X |  |
| Drive pinhole 4 diameter | X | X | X | X | X | X | X |  |  | X |  | X |  |
| Drive pinhole 4 bolt circle | X | X | X | X | X | X | X |  |  | X |  | X |  |
| Drive pinhole 4 vertical offset | X | X | X | X | X | X | X |  |  | X |  | X |  |
| Drive pinhole 4 countersink | X | X | X | X | X | X | X |  |  | X |  | X |  |
| Drive pinhole 4 rotation | X | X | X | X | X | X | X |  |  | X |  | X |  |
| Keyway 1 quantity | X | X | X | X | X | X |  |  |  | X |  | X |  |
| Keyway 1 width | X | X | X | X | X | X |  |  |  | X |  | X |  |
| Keyway 1 depth | X | X | X | X | X | X |  |  |  | X |  | X |  |
| Keyway 1 radius | X | X | X | X | X | X |  |  |  | X |  | X |  |

FIG. 19D    1902

| | DT | SB | HH | EE | TM | RD | DB | TT | CB | GG | WS | SP | IP |
|---|---|---|---|---|---|---|---|---|---|---|---|---|---|
| Keyway 1 offset angle | X | X | X | X | X | X | | | | X | | X | |
| Keyway 2 quantity | X | X | X | X | X | X | | | | X | | X | |
| Keyway 2 width | X | X | X | X | X | X | | | | X | | X | |
| Keyway 2 depth | X | X | X | X | X | X | | | | X | | X | |
| Keyway 2 radius | X | X | X | X | X | X | | | | X | | X | |
| Keyway 2 offset angle | X | X | X | X | X | X | | | | X | | X | |
| Harmonic damper type | X | X | X | X | X | X | | | | X | | | |
| Harmonic damper epoxy filled | X | X | X | X | X | X | | | | X | | | |
| Slurc type | X | X | X | X | X | X | | | | X | | | |
| Slurc lead drop | X | X | X | X | X | X | | | | X | | | |
| Slurc trail drop | X | X | X | X | X | X | | | | X | | | |
| Slurc quantity | X | X | X | X | X | X | | | | X | | | |
| Slurc matching center hole | X | X | X | X | X | X | | | | X | | | |
| Side runout (TIR) | X | X | X | X | X | X | | | | X | | X | |
| Dish | X | X | X | X | X | X | | | | X | | X | |
| Tension | X | X | X | X | X | X | | | | | | X | |
| Tube type | | | | | | | X | X | | | | | |
| Hex nut OD | | | | | | | X | X | | | | | |
| Hex nut Length | | | | | | | X | X | | | | | |
| Hex nut thread | | | | | | | X | X | | | | | |
| Tube thread per inch | | | | | | | | X | | | | | |
| Tube thread major diameter | | | | | | | | X | | | | | |
| Tube thread minor diameter | | | | | | | | X | | | | | |
| Tube thread pitch diameter | | | | | | | | X | | | | | |
| Tube thread depth | | | | | | | | X | | | | | |
| Tube length | | | | | | | X | X | | | | | |
| Chainbar length | | | | | | | | | X | | | | |
| Chainbar width | | | | | | | | | X | | | | |
| Adhesive pattern number | X | X | X | X | X | X | | | | X | | | X |
| Special manufacturing notes | X | X | X | X | X | X | X | X | X | X | X | X | X |
| Weight | X | X | X | X | X | X | X | X | X | X | X | X | X |

FIG. 20

|  | DT | SB | HH | EE | DB T | T | CB G | G | SP | TM | RD | WS | IP |
|---|---|---|---|---|---|---|---|---|---|---|---|---|---|
| Maximum allowable RPM | x | x | x | x | x | x | x | x | x | x | x | x | x |
| Machine compatibility information matrix | x | x | x | x | x | x | x | x | x | x | x | x | x |
| Maximum temperature limit 1 (arbor) | x | x | x | x | x | x | x | x | x | x | x | x | x |
| Maximum temperature limit 2 (peripheral) | x |  | x |  |  |  | x |  | x | x |  |  | x |
| Minimum temperature limit 1 (arbor) | x | x | x | x | x | x | x | x | x | x | x | x | x |
| Minimum temperature limit 2 (peripheral) | x |  | x |  |  |  | x |  | x | x |  |  | x |
| Maximum vibration limit X-axis | x | x | x | x | x | x | x | x | x | x | x | x | x |
| Maximum vibration limit Y-axis | x | x | x | x | x |  | x | x | x | x | x | x | x |
| Maximum strain limit (high) | x | x | x | x | x | x | x | x | x | x | x | x | x |
| Maximum service limit | x | x | x | x | x | x | x | x | x | x | x | x | x |
| Wet / dry usage verification | x | x | x | x | x | x | x | x | x | x | x | x | x |
| Rotational directionality verification | x | x | x | x | x |  | x |  | x | x | x | x | x |
| Optimal RPM | x | x | x | x | x | x | x | x | x | x | x | x | x |
| Optimal temperature 1 (arbor) | x | x | x | x | x | x | x | x | x | x | x | x | x |
| Optimal temperature 2 (peripheral) | x |  | x |  |  |  | x |  | x | x |  |  | x |
| Optimal depth per pass | x | x |  |  | x |  |  |  |  |  |  |  | x |
| Optimal vibration limit (high) | x | x | x | x | x | x | x | x | x | x | x | x | x |
| Optimal strain limit (high) | x | x | x | x | x | x | x | x | x | x | x | x | x |

| Version | Description |
|---|---|
| DT | Diamond Tool |
| SB | Saw Body |
| CB | Chain Bar |
| DB | Drill Bit |
| TT | Threaded Tube |
| IP | InteliPart |
| GG | Groove / Grind |
| HH | Hand Held |
| EE | Early Entry |
| SP | Surface Prep |
| TM | Tile / Masonry |
| RD | Remote Demolition |
| WS | Wire Sawing |

For use with InteliModule

- Standard solid core
  - Laser cut microchip window
- Microchip potted with 2216 epoxy
- Limited to integrated on-board sensors
  - Thermocouple
  - Accelerometer
  - GPS

The tool, InteliModule or a combination of both can detect and record if unauthorized use has taken place If equipped, the GPS and asset tracking will show location, duration of use, etc.

This will enable the owners of companies to monitor their assets on weekends and off hours when equipment and tools are in possession of operators They can also choose to have the machines automatically lock-out based on hours of the day or days of the week

FIG.39

Thermal monitoring on peripheral edge, medial section of core, and flange/shaft

Increase or decrease coolant flow to minimize cleanup, but maintain tool temperature Records max temp Vs. time Record min temp Vs. time

MCX-1 InteliModule

4602

InteliModule description
The InteliModule is a module that interfaces a machine to a tool. The tool can send data to the machine and vice versa. This data is processed in the InteliModule and a command is sent to the machine that changes a parameter. This occurs at a frequency of 60-80μs

FIG. 46

DATA COLLECTION, TRANSFER AND FEEDBACK IN WORKING TOOLS

CROSS REFERENCE TO RELATED APPLICATIONS

This application is a National Stage of International Application No. PCT/US15/45584, filed Aug. 17, 2015, pending, and claims priority to Provisional Patent Applications Nos. 62/037,617 filed Aug. 15, 2014, and 62/112,178 filed Feb. 5, 2015, the entire contents of which are incorporated herein by reference.

FIELD

Machine tools are described having microchip packages with powered electronic circuits and sensors for sensing data relative to operation of the tool, where the sensors are embedded in the microchip packages and/or remote on the tool from the microchip packages. Machines and devices are also described that can receive data from the microchip packages and that can control operation of the tools based on such data.

SUMMARY

Tools, for example any powered tool, machines for operating tools, operators using such tools and machines, as well as the owners and/or lessors, of such tools and machines, as well as the original manufacturers of such tools and machines, can benefit from data stored on the tools, data collected during operation and use of tools, as well as information calculated from such data, either during use of the tools or over the lifetime of the tools. Data may be stored, collected and/or processed on one or more microchips, microprocessors, data storage devices and/or data communication devices. Such devices can be embedded in, attached to or positioned adjacent a tool. The tool can be a rotary tool, a reciprocating tool, a band tool, a linear tool, or the like. Machines include machines for operating such tools. Communication can occur by and between a tool, a machine, an operator, the contractor, and employer of an operator or contractor, an owner of the tool, an owner of the machine, and/or an original manufacturer of the tool or the machine.

Exemplary tools include concrete cutting blades, grinders, including grinders and grooving tools, grinding wheels, core drills, wood cutting blades, wafer cutting blades, stone blades, guide bars for chainsaws, machine tools, and other tools for similar work. Such tools can be monolithic, but are commonly assemblies of a core and working elements. The tools can include replaceable components, or may be disposable.

These and other examples are set forth more fully below in conjunction with drawings, a brief description of which follows.

BRIEF DESCRIPTION OF THE DRAWINGS

FIG. 3A is a schematic block diagram of a tool and a machine for driving a tool.

FIG. 6 is a schematic representation of characteristics of an exemplary data component that can be used with apparatus and methods described herein.

FIG. 7 is a schematic representation of characteristics of a further exemplary data component that can be used with apparatus and methods described herein.

FIG. 8 is a schematic representation of characteristics of another exemplary data component that can be used with apparatus and methods described herein, including grinding and grooving tools and machines.

FIG. 9 is a schematic representation of design and installation considerations for data components when used with apparatus and methods described herein.

FIG. 11 is a schematic representation of exemplary configurations of data components for use with apparatus and methods described herein.

FIG. 17 is a detailed plan view and partial schematic of a plurality of the external components of FIG. 16.

FIG. 18 is an upper isometric and partial cut away and exploded view of an exemplary tool with an exemplary data component having external components, including an electrical resistance ring.

FIGS. 19A-D are schematic representations of possible data components and possible contents of one or more data components for use with the apparatus and methods described herein.

FIG. 20 is a schematic representation of possible contents of one or more data components for use with the apparatus and methods described herein.

FIG. 39 is a schematic representation of a further functionality of one or more data components that can be used with apparatus and methods described herein, and also including plan views of exemplary data components that can incorporate such functionality.

FIG. 46 is a schematic representation of a data component such as one or more of those described herein for use with the apparatus and methods described herein.

FIG. 55 is an isometric and partial cutaway view of a tool and exemplary data components for use there with.

DETAILED DESCRIPTION

Figure 1:
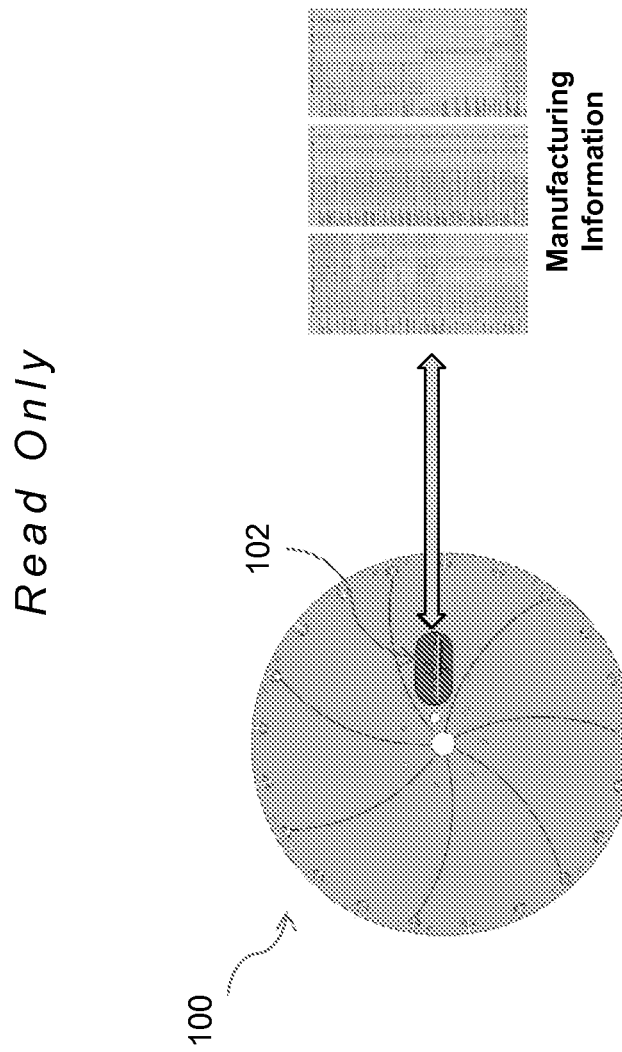
FIG. 1 is a plan view of a tool with a data component and partial schematic representing information that can be stored, saved or recorded on the data component.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of tools and of methods of making and using the tools are described. Depending on what feature or features are incorporated in a given structure or a given method, benefits can be achieved in the structure or the method. Additionally, some cutting tool configurations may also benefit from lower-cost and reduced wear. As used herein, "tool" is used interchangeably to refer to an apparatus or assembly used for operating on a workpiece both before and after working surfaces, such as cutting segments, cutting tips, cutting chain or other wearing components are attached to a tool body to form the final working tool. The illustrations herein are of tool bodies before the wearing components are attached, but it is understood that "tool" includes the apparatus or assembly both before and after appropriate wearing components are attached to the tool body. "Tool body" refers to the apparatus or assembly to which the wearing components are attached to allow the tool body to be used as a tool on a machine for working on a workpiece.

In tools similar to circular saw blade configurations, one or more aspects of the examples described may allow longer life, possibly higher operating speeds and improved tool performance. In high-speed applications, such as may occur in a number of circular saw blade configurations, benefits such as longer life, possibly higher operating speeds and improved performance may be more pronounced, relative to the lower-speed applications.

Improvements are also provided to components with which the tools may be used. For example, machines may operate more efficiently. Additionally, machine operation may be more closely tied to the operating tool, for example so that the tool is not operated outside of its intended ranges or applications. If desired, machine data and tool data can be recorded and processed in real-time or later for information, as desired.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of tool configurations and of methods of making and using the tools are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Saw blades, drills, and guide bars are used as examples of tools that can incorporate one or more of the features and derive some of the benefits described herein, and in particular concrete cutting tools. With concrete saw blades, they often operate at elevated speeds, are cooled with water, experience significant loading from a number of sources, and are used for a number of applications. Tools other than these and their equipment can benefit from one or more of the present inventions.

It should be understood that terminology used for orientation, such as front, rear, side, left and right, upper and lower, and the like, are used herein merely for ease of understanding and reference, and are not used as exclusive terms for the structures being described and illustrated.

FIG. 1 shows a tool body in the form of rotary cutting blade core 100 with a microchip package 102, and in the present example representing a read-only memory microchip contained in an appropriate housing (though it is understood that the blade 100 can include any one or more of the microchip packages described herein). The data could include as much or as little original manufacturing data as desired, but may include a unique identification number, lot number, manufacturing date, model number, revision number, part number, serial number, material types and characteristics, material manufacturer or supplier, tool characteristics such as geometry, dimensions, and tolerances, usage information and/or restrictions, machine characteristics with which the tool is to be used, including for example but not by limitation, operating parameters, machine sizes, and the like. The microchip package can be attached to or formed integral with the tool. The microchip package can be attached for example by adhesive or other fastening means. The microchip package can be formed integral with the tool such as by being part of a laminate in a laminar assembly, or embedded in an opening or recess in the tool.

Figure 2:
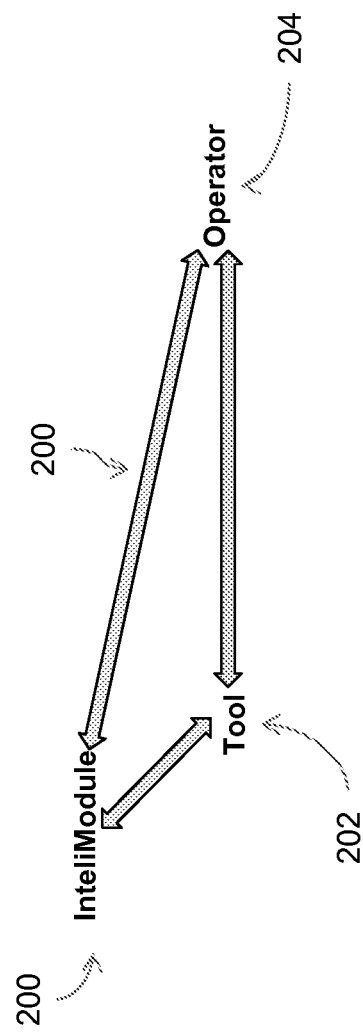
FIG. 2 is a schematic diagram of possible communication paths for apparatus and methods described herein.

FIG. 2 shows an example of one form of interaction between one form of a microchip 200, identified as "Intelimodule" in the FIGS., in which a tool 202 having a microchip package (including but not limited to any one or more of Type 1, 2 or 3) and/or an operator 204 having a suitable device can obtain information from the microchip package on the tool, and the tool can operate according to the information on the microchip package, for example at defined speeds, defined durations, defined operating profiles and the like, or not at all if the tool is not being used for the intended purpose. It is an example of communication between a tool or tools, machine or machines and an operator or other user/entity. It may include remote monitoring as well as data acquisition from various sensors, for example on a tool and/or on a machine. The operator can use the information to properly apply and use the tool, or not if the tool is incorrect for the application. In one configuration, the Intelimodule microchip can control a machine (FIG. 3) or provide information for other uses. Where the microchip 200 has read/write capabilities, which the Intelimodule microchip has as described herein, the microchip 200 can receive information from the tool 202 typically having, though it need not have, its own microchip (including but not limited to any of the Types 1, 2 or 3 described herein) containing, for example operating characteristics such as speed, duration, temperature, and/or any other characteristics common or desirable with a particular tool, particularly with the capabilities now made available with the present configurations. Such information can come from other microchip packages on or associated with the tool (for example one or more tools in close proximity that, for example, may be undergoing the same or similar operations and therefore experiencing the same or similar conditions), or from sensors or other devices capable of providing information to the microchip 200. A read/write microchip 200 can be used by an operator not only in the same way as a read-only microchip package, but also for entering identifying information for example of a project, such as start and ending times, operating characteristics, environmental characteristics, anomalies, and the like. The information can be communicated to the microchip 200 and/or the tool 202 for recording, and for future analysis if desired.

Figure 3:
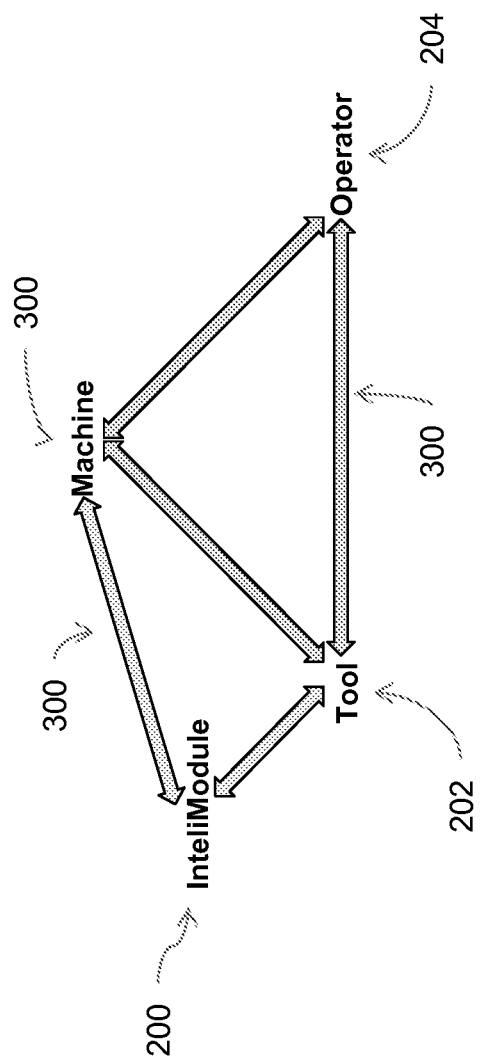
FIG. 3 is a schematic diagram of an additional example of possible communication paths for apparatus and methods described herein.

FIG. 3 shows the same capabilities for the structures, functions and results represented in FIG. 2, but also adds an additional factor of a machine 300 with which the tool 202 can be used. Additionally, in a situation where an operator 204 would not be able to communicate directly with the microchip package 202, FIG. 3 represents the possibility of the operator obtaining information from the microchip package on the tool 202 by way of the machine. Where the microchip package on the tool 202 is read-only, the machine can obtain any or all of the data available on the microchip package, and transmit and/or use the information for operating the machine and the tool. Where the microchip package on the tool is read/write, the machine can send information to the microchip package, including machine identifying information, operating characteristics such as speed, duration, temperature and/or any other characteristics, or desirable with the operation of the machine, particularly with the capabilities now made available with the present configurations. Data stored on the tool can be used for later analysis and action, but it is also possible that the same data can be transmitted and stored on the machine, on the microchip 200, or elsewhere for recording and/or analysis.

An example of a machine for driving a tool can be any number of machines suitable for driving a selected tool (FIG. 3A). The machine can be a saw for driving a cutting blade, such as a wood saw, concrete saw (including but not limited to flat saw, floor saw, wall saw, handheld saw, green concrete saw), tile and masonry saw, or the like, a groover and grinder, a chainsaw, a drill, surface preparation machine such as a motorized trowel, a wire saw and demolition equipment. In the illustrated example, a generic machine 320 includes a motor 322 for driving a tool 324 through a drive 326. Positioning of the tool relative to a workpiece 328 can be carried out through the drive mechanism 326, or by changing a support 330 for the machine supported on a support frame 332, or both. Positioning of the tool may include any existing functions for the particular tool, and for cutting blades, groovers and grinders, drill tubes, chainsaws, drill bits, threaded tubes, early entry machines, tile and masonry saws, and similar may include depth of cut and feed rate, and the drive 326 can also set/change the tool speed. For such tools as surface preparation machines, wire saws, and remote demolition equipment, positioning may be conventional positioning techniques, and may include appropriate movement of the drive element and/or the support structure. The drive 326 for surface preparation machines, wire saws, and remote demolition equipment may be used for setting/adjusting the tool speed.

A combination of a machine and a tool is also illustrated in FIG. 3A, in which the tool 324 is illustrated as a circular tool such as a cutting blade, grinder, groover, or the like, but it is understood that the tool can take any number of configurations for working on the workpiece 328. In any of the tools described herein, the tool can include a microchip package 334, where the microchip package is any of the microchip packages described herein, including those illustrated and described in conjunction with FIGS. 1-54, and including for example but not by way of limitation either Type 1, Type 2 or Type 3, and the tool can also include multiple microchips, either identical to each other or different.

The machine 320 can, but need not, include a microchip package 336. The microchip package 336 can be any of the microchip packages described herein, including the microchip packages illustrated and described with respect to FIGS. 1-54. In another example, the microchip package 336 is a microchip package with communications capability, and it can also have other capabilities similar or additional to the functions of the tool microchip package 334. The microchip package 336 can communicate data to and from the microchip package 334. The microchip package 336 can also communicate data (including the data from the microchip package 334) to and from an external device, including but not limited to a cell phone or other portable communications device, either dedicated or general. It can also communicate to and from a contractors truck or other facility within range having communications and possibly computing capability, for example for storing, processing or retransmitting the information. The microchip package 336 can also communicate data to and from a repeater antenna and then to a processing system such as a computer, or the like. The microchip package 336 can also be an Intelimodule or comparable, as described herein, for example having functionality to allow or lockout operation of the machine, control and adjust tool position and tool speed, collect and/or analyze data, for example from the tool, from a user, or other external source, for example for the functions described with respect to FIGS. 5 and 46, receive, process and record positioning data, as well as other functions. The microchip package 336 can be placed at any usable location on the machine, such as on the motor 322, the support element 330 or the support frame 332, or on other components of the machine supported by the support frame. The microchip package 336 is preferably positioned sufficiently close to the tool to be able to accurately communicate with the microchip package 334.

Figure 3B:
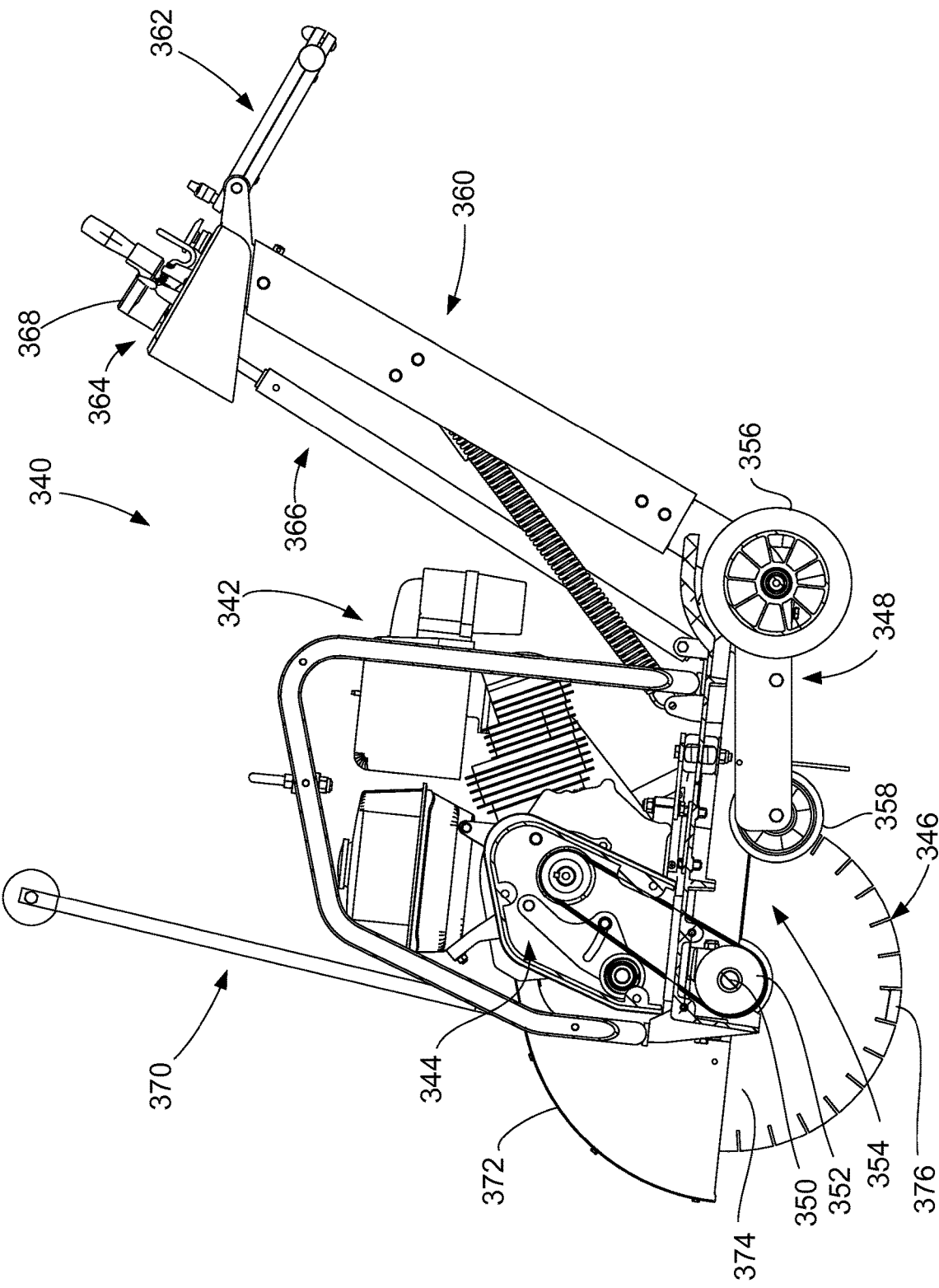
FIG. 3B is a side elevation view of a machine for operating a tool such as a concrete saw.

One example of a machine for operating a tool is a concrete saw 340 (FIG. 3B). The machine includes a powering element, in the present example a motor 342, a drive assembly 344 and a working tool in the form of the saw blade 346, the motor, drive assembly and tool being supported on a frame combination 348.

The motor 342 can take a number of configurations. In one configuration, the motor is an internal combustion engine, and in other configurations, the motor can be a hydraulic motor or an electric, air or other motor to drive the tool and in some examples to also to move or advance/return the machine, for example toward or along a workpiece, such as wood, a concrete slab, wall, floor, or other form of the workpiece.

The tool can also take a number of configurations. It can include saw blades, drilling or coring elements, grinding elements, machining elements, chain and guide bar, wire saw, tile and masonry saw, grooving and grinding machines, or other operating tools including those described herein. In the example illustrated in FIG. 3B, the tool is a concrete cutting blade 346.

The drive assembly 344 also takes a number of configurations. The configuration of the drive assembly may depend on the type of motor, the type of tool, or the configuration of the frame or other support for the working tool assembly. The drive assembly will typically include in the present examples the components in the drive train from the motor output to the tool, and include the components driven by the motor output in order for the tool to work on whatever work piece is being operated on. In the present concrete saw example, the drive train does not include any components used to move the saw along a concrete surface. In a concrete saw, the drive assembly 344 includes a drive belt, tensioning element and blade drive shaft 350 with a pulley 352, but can take any number of other forms and combinations to transfer drive for motive force from the motor to the work tool.

The frame combination 348 has a number of configurations, and those skilled in the art will appreciate that movable machines with which various parts of the present examples can be used are also numerous. In the example, the frame combination includes a first frame element 354, in this example an upper frame portion that supports the motor 342. The first frame element 354 may be considered an engine platform for the motor 342. The engine platform 354 in the present examples supports the motor 342, the drive assembly 344 and the tool 346. The engine platform 354 can have a number of shapes and sizes, and the configuration of the engine platform is preferably such as to reliably support the motor 342, the drive assembly 344 and the tool 346 during normal operation over the lifetime of the saw.

In the example of the saw 340, the saw is supported on a work surface (not shown) by travel devices, for example in the present saw by first wheels 356, and when the saw blade is up, by second wheels 358. The saw can be maneuvered manually by a handle assembly 360, including an adjustable handle 362. The handle may support a console 364 having various controls for controlling the saw, which may be mechanical or electronic/electromechanical. Controls may include controls for on/off functions, blade speed, depth of cut, feed rate, coolant or fluid flow rate, as well as other controls. It is noted that the particular configuration of saw 340 in FIG. 3B does not include a drive mechanism for the wheels, but could be configured for such, and other machines include such functionality. The console 364 may also include user interfaces such as gauges, data readouts, or the like.

The exemplary saw 340 also includes a height adjustment mechanism 366 for adjusting the height of the blade 346, and therefore the depth of cut, and also for lifting and lowering the blade. The height adjustment mechanism 366 in the illustrated example includes a handle 368 for manually raising and lowering the blade. In other configurations, the height adjustment mechanism can be electromechanical, and can be controlled by a controller, for example a controller on a microchip package 336. In the present example, the height adjustment mechanism 336 raises and lowers the first frame element 354 relative to the handle assembly and the wheels.

The exemplary saw 340 also includes a travel guide 370 which can be used to help guide the travel of the saw relative to a desired line or other reference. In the illustrated example, the travel guide 370 is a visual aid for the operator. In other examples, the travel guide 370 can have one or more sensors or other feedback components for providing data to a microchip package 336. The data can be used to start or stop the blade, change the depth of cut, or change the direction of travel of the saw, for example where the wheels are driven by a drive component that can be controlled by the microchip package 336. Alternatively or additionally, the travel guide 370 and sensors thereon can be used to provide feedback to the operator, for example a graphic that can indicate to the operator required adjustments.

Machines operating tools often include shields or guards adjacent or over the operating tool. Positioning, orientation or movement of such shields or guards can be set automatically based on movement of the machine, for example mechanically or electromechanically. In the present example, the saw includes a blade guard 372 for extending over and covering part of the blade 346. The blade guard can include a microchip package mounted thereon (not shown), of any of the types described herein, including one that may have the structure and function of an Intelimodule as described herein, except that such a microchip package would not be typically configured to control operation of the machine, such control being carried out by a microchip package on the machine. However, a microchip package on the blade guard could provide data to a microchip package on the machine, in the form of either static data associated with the blade guard and/or dynamic data acquired by the blade guard microchip package, for example during operation or otherwise.

The blade 346 of the type illustrated would include a core 374 and cutting segments arranged uniformly about the circumference of the core, one of which is represented schematically at 376 for purposes of illustration, secured to the core. Other cutting blades can have other configurations.

The console 364, or other part of the machine, may also include an electronics package, such as a control system 378 (FIGS. 3B and 3C). The electronics package may include a number of components and functions, and in the present example may include an Intelimodule, such as described herein. In the present example, the electronics package 378 includes a display or user interface (not shown) by which a user may, for example, view machine data, tool data, real-time or stored data, and the like, and in some configurations may enter data into the control system 378. In the present example as illustrated in FIG. 3C, the control system includes an Intelimodule 379, which receives input from various sources, and provides output to one or more devices/ components, and which may communicate data to and/or from the control system. In the present example, the control system 378 can be used to control one or more aspects of the machine, based either on previously stored information in the control system, input from a user, input from an external source, such as any of the sources described herein. In one configuration, the control system 378 can receive input from the tool 346 through a remote communication link 380. The control system can read data from a microchip package on the tool, for example in one of the forms as described herein, or additionally may also write information to a microchip package on the tool. The control system 378 by way of the Intelimodule 379 can also communicate with an external device through remote communication 381, for example to any of the external devices described herein.

The Intelimodule 379 may also be configured to receive input from an access control unit 380, which may provide output based on a user input 381 and/or another authorization input 382. An example of user input may be a user code or key or other authorization or approval input, indicating that the particular user is an authorized user. Alternatively, or additionally, authorization input can be provided from the authorization input component 382, which may be provided, for example, by an external source such as by remote communication, a supervisor input, or the like. Once an appropriate approval or authorization configuration is provided to the access control 380, a signal can be sent to the Intelimodule 379 to allow operation of the machine.

The control system 378 may also include GPS apparatus 383 and software either incorporated within the control system, or based on appropriate signals from an external source providing input to the Intelimodule 379. The Intelimodule 379 can then use the information for recording data, associated with usage, operating characteristics and resulting data from any external inputs, such as those described herein. Some suitable inputs into the control system 378 may also include, for example, input from a speed sensor unit 384 on the machine, which may sense the actual tool speed, or which may be derived from a drive unit for the tool. Another input may include a depth sensor 385, which may for example be an electromechanical device for measuring the depth that the tool has reached in the workpiece. Input may also come from a feed rate sensor 386, the rate of advance of tool through operation of the machine. The feed rate sensor 386 may include a resistive element, a center for tracking forward advance of one or more wheels, motion of a tool head, and the like. Data may also be derived from a target location sensor 37, which may be used to send the actual position of the tool relative to the intended position, for example as a function of time, based on a registration arrangement based on a reference point or datum. Other sensors can provide data to the Intelimodule 379 for recording operating information or other information, and if desired for processing one or more pieces of the data to help in controlling the machine.

The control system 378 can control various components and functions of the machine. The control system can control power 388, for example by way of a mechanical switch, key or other interrupt, so that the machine remains off until the switch, key or other interrupt is activated. In another configuration, the Intelimodule 379 can control power 388 to the machine, for example through an electromechanical lockout, solenoid or other suitable device controlled electronically. The Intelimodule 379 can require entry of an access code, for example on a keypad or other user interface 381, or through the authorization input 382, so that power is available only after the proper input has been provided. Additionally, power 388 can also be controlled by assigning lockout times and/or lockout geographic locations. Times and geographic locations can be stored in memory or otherwise set in the control system 378, for example in the Intelimodule 379. Lockout times may include after-hours and weekends. Lockout geographic regions may include areas other than an assigned job site or region, or geographic locations known to be unsuitable for operation of the particular machine and/or tool.

The Intelimodule can also be used to control tool speed 389. Tool speed can be set based on a mechanical machine setting, manual input from a user, operating data provided from a database in the control system 378 provided with the machine, data from the tool 346 transmitted 382 the control system (where the tool includes a microchip package of Type 1, 2 or 3), or based on control signals from the Intelimodule 379. Control from the Intelimodule 379 can be based on the data from the tool 346 alone, or data from any sensors, for example 384-387 or others, or both. The Intelimodule 379 can be used to calculate appropriate or optimal tool speed and send control signals to the tool speed controller 389 (for example to control the motor), and such calculations can be based on one or more of prior speed, current depth, current feed rate, makeup of the current workpiece, data from the tool such as temperature, vibration or any other parameters available from the tool, age of the tool, and the like.

The Intelimodule can control the depth of the tool through a depth controller 390. The depth controller can be any suitable electromechanical device for receiving input from the control system 378 or from the Intelimodule and translating that information to mechanical motion, such as to raise or lower or otherwise position the tool accordingly. A value for the desired depth can be based on manual input from the user, operating data provided from information in the control system 378, data from the tool or based on control signals from the Intelimodule 379. The Intelimodule 379 can calculate an appropriate or optimal tool operating depth and send control signals to the depth controller 390, and such calculations can be based on data from machine centers, for example one or more of tool speed, current depth, current feed rate, makeup of the current workpiece, data from the tool such as temperature, vibration or any other parameters available from the tool, age of the tool and the like.

In a machine that can move relative to the workpiece, separately from any movement of the tool, the Intelimodule can be used to control the advance or other machine movement if the machine has a drive mechanism for moving the machine that can be controlled by an advanced controller 391. The advanced controller can be an electromechanical unit, for example for operating wheels, casters or other movement devices on the machine. Movement can be controlled by the user based on user input, for example at the console, or advance can be controlled by the Intelimodule. The Intelimodule can control a machine advance based on predetermined settings, for example stored in memory, based on input from the user, or based on a calculated advance rate. A calculated advance rate may take into account data stored in memory or from the user, and/or data from the tool or from machine sensors. Calculations based on data from the tool may take into account tool speed, current depth, makeup of the current workpiece, data from the tool such as temperature, vibration or other parameters available from the tool, age of the tool and the like. Advance speed can also be set based on data from other machines that have operated previously in the same area, on the same workpiece, or based on other relevant historical information, or based on nearby machines that are operating simultaneously on the same workpiece.

In a machine that can adjust its position additional to advancement, for example adjusting direction of travel or other orientation, the Intelimodule can be used to control position adjustments. Position adjustments can be made through a position adjust controller 392, for example based on user input or based on control signals from the Intelimodule 379. The Intelimodule can control adjustments in the position or orientation of the machine based on predetermined settings, for example stored in memory in the control system 378, based on input from the user, or based on calculations made by the Intelimodule. In the example of the machine shown in FIG. 3 A, a travel guide 370 having a sensor and feedback for indicating relative position can be used to input information to the Intelimodule. The Intelimodule can then use such feedback to calculate adjustments in the position for orientation. Such calculations can also be based on GPS data, nearby machines, or other input.

Many tools include a fluid supply or cooling supply (referred to hereafter as cooling supply or coolant supply), for cooling the tool, removing debris, or the like. Coolant can be controlled using a coolant controller 393, and in some instances may be set for a constant rate. Where the coolant can be controlled during a job, coolant can be controlled manually by the user, based on controls from the control system 378 or based on ongoing or real-time calculations from the Intelimodule 379. The Intelimodule can control coolant flow based on predetermined settings, or calculated based on data from the tool or from machine sensors. Data from the tool can be such information as temperature, moisture or other data.

In addition to the foregoing, the Intelimodule can control one or more controllers based on additional information such as historical data, information from other sensors, information from other machines, and the like.

Figure 4:
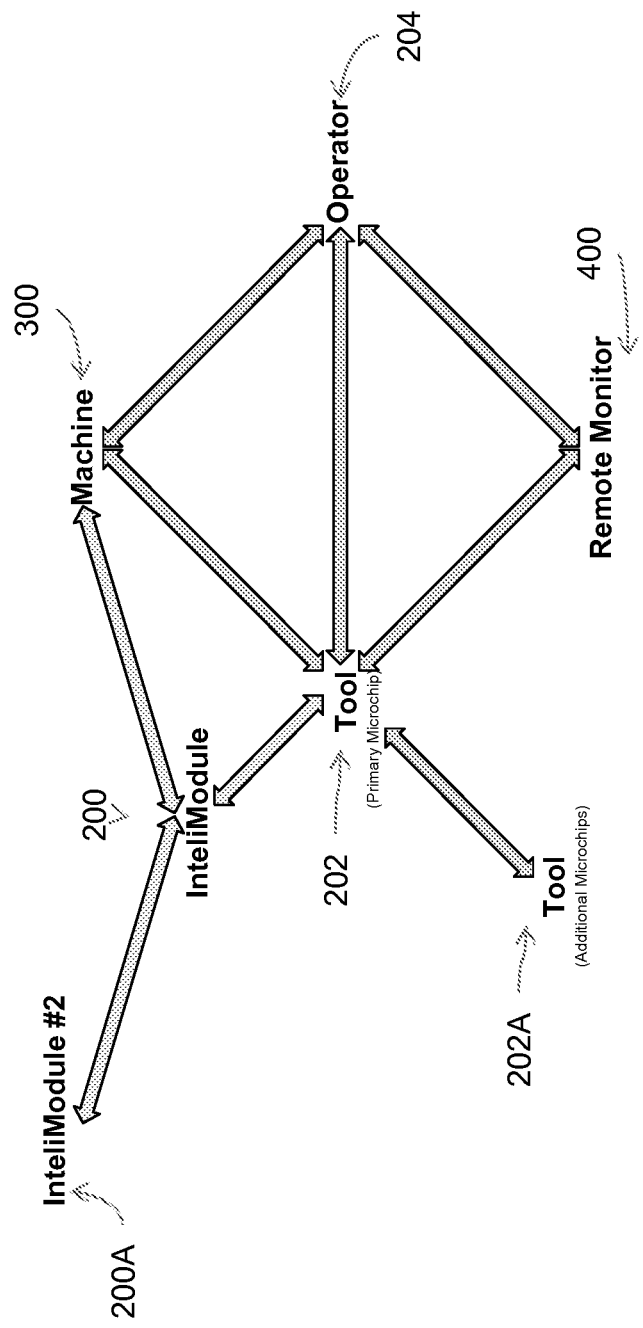
FIG. 4 is a schematic diagram of a further example of possible communication paths for apparatus and methods described herein.

FIG. 4 shows the same capabilities for the structures, functions and results represented in FIGS. 2 and 3, but also adds additional tools and/or additional microchip packages on the same tool represented at 202A, additional microchip packages 200A, and remote monitoring with a remote monitor 400. A microchip package on the tool 202 can serve as a primary microchip package, and a microchip package on another or additional tools 202 A can serve as additional microchip packages feeding information to the microchip package on the tool 202. Additional tools 202A can have additional microchip packages (including any which can be any of Type 1, 2 or 3) which communicate with a primary microchip package such as the microchip package on tool 202, which in turn can communicate with other devices. One example of multiple tools 202 and 202 A may be a grinding and grooving machine which may have multiple blades only one or several of which may have primary microchip package capabilities, for example. A second Intelimodule microchip can be a duplicate in terms of structure, function and result as any of the Intelimodule microchips described herein. A remote monitor 400 can send and receive information to and from the tool, the operator, and/or the machine. A remote monitor can monitor the operation of the machine, the tool and all the characteristics thereof. The remote monitor 400 can be a device with suitable communications capabilities, and can be a cell phone or smart phone, a portable communications device, either dedicated or general, a contractors truck or facility within range, a repeater antenna, or similar devices. Suitable communications capabilities include one or more of Bluetooth, radio or cellular communications or similar communications capabilities now known or that may be developed. The remote monitor 400 can receive communications according to established protocols, device identifications, encryption, if any, and similar conventions. The remote monitor 400 can be associated with or used by any of the entities related to any of the devices involved, for example the original manufacturer of the tool, original manufacturer of the machine, contractor employing the operator, agency monitoring or employing the contractor, or anybody else with an interest in the operation. Original manufacturers can use the information for research and development, warranty compliance, manufacturing scheduling, reordering and resupply, and the like. Others involved in the operation may have similar interests in monitoring the operation and data.

Figure 5:
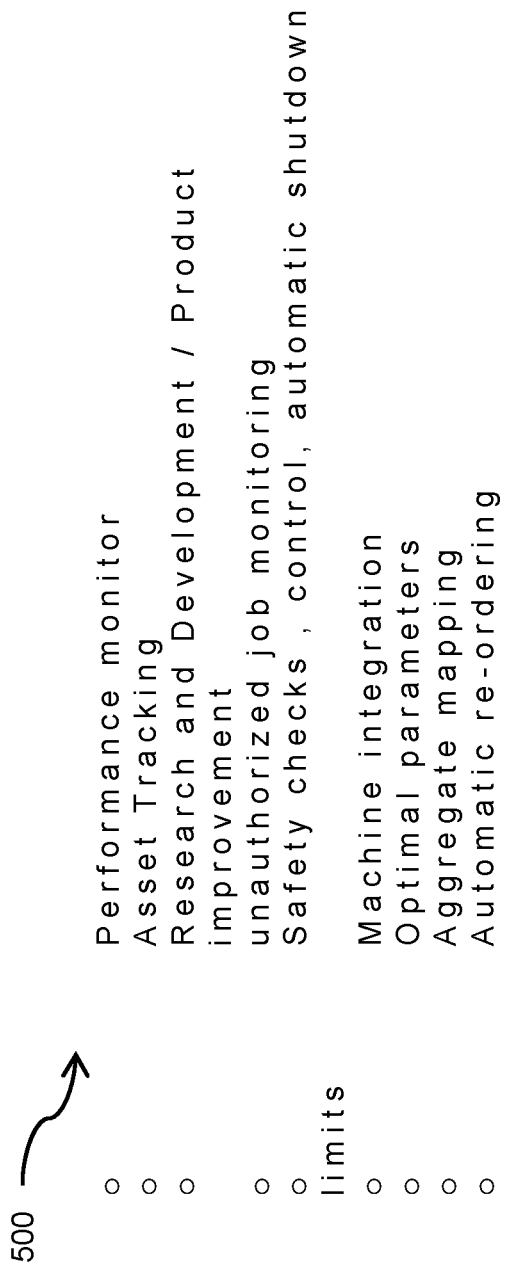
FIG. 5 is a schematic representation of functions that can be achieved using apparatus and methods described herein.

FIG. 5 identifies some of the benefits 500 associated with the use of microchip packages with tools and or machines for operating such tools. Asset tracking can occur for example by a user scanning or otherwise obtaining information from a microchip package on the tool, a machine scanning or otherwise obtaining information from the microchip package, or where the microchip package has communications capabilities, by data being transmitted to another device for storage, processing or retransmission. The other device may be any of the devices described herein, for example those represented in FIG. 10. Asset tracking can be used to lockout use of the tool outside of designated areas or regions, adjust operation based on location and known data (for example, known characteristics of the workpieces, such as aggregate with concrete or hardness or content for wood, etc.), and the like. Data can be collected and saved on the tool or transmitted to an adjacent microchip package or device (for example on any of the devices described herein, such as those represented in FIG. 10), and such data can be derived from any sensors on the tool. Data can be used for research and development and product improvement, monitor ongoing operation to ensure operation is within desired or calculated limits (for example, outside of which a machine operating the tool might be automatically shut down), and to allow a machine, such as one with an Intelimodule, to optimize operation of the tool. Collected data can also be used by others to geographically track and map aggregate locations and characteristics. Additionally, collected data may be used to reorder product, set flags for inspection, or the like, for example by tracking usage, comparing to expected product lifetime, including based on calculations during the lifetime of the tool that might account for extreme or unexpected usage, such as overheating, extended stresses, and the like.

The microchip packages described herein can have a number of characteristics 600 (FIG. 6). Some exemplary characteristics of one form of microchip package include microchip package dimensions, construction, and specifications. Additionally, such a microchip package can be read only or read/write. In any of the examples herein, the microchip package can be powered on and off by a suitable switch, for example an accelerometer turning the microchip package on or off upon sensing changes in motion. Communications may be by an antenna, and may be with any of the components, entities or personnel described herein, including other equipment and machines, to a communications device such as a phone or to a nearby transportation unit such as an operator's truck, transport trailer, contractor's trailer, etc. An antenna may be part of the construction of a microprocessor, included on a circuit board containing a microprocessor, or coupled to a circuit board containing the microprocessor and housed within the microchip package or extend outward from the microchip package. In the present example, the microchip package also includes integrated sensors of selected types, for example those that sense temperature, microchip package location (GPS), motion sensors, and the like, including those described herein, for example with respect to FIG. 16.

In one example, the Type 2 microchip packages can include a temperature sensor in the form of a type K thermocouple. The thermocouple is molded in the enclosure of the microchip package, for example between respective opposite shells of a housing secured together to form an enclosed package. The Type 2 microchip packages also include an antenna (for example of any of the types, including Bluetooth, Wi-Fi, etc.) within the enclosure of the package, for communicating data between a microprocessor in the microchip package and another device, which may be another microchip package on the same tool, a microchip package on another tool, a machine operating the tool, a nearby machine, or any of the other devices represented for communications in and described with respect to FIG. 10 or elsewhere herein. The microchip package can also include an on-off switch or power switch. In one configuration, the microchip package can be on during operation, and off when the tool is not being used. The tool can be on at other times as well, for example for a selected or predetermined or preset time before and after operation, for example to allow data transfer or other settings and/or communications. The power switch can be a centrifugal power switch, such as that described in conjunction with FIG. 31, or the power switch may be coupled to an accelerometer and set to power on when the tool is running according to a predetermined condition, for example at a selected speed, or the like.

The Type 2 microchip packages can include, in addition to or alternative to a temperature sensor, a position sensor such as a GPS for identifying the position of the tool. The GPS component is included in the interior of the package, for example within the interior of opposite shells of a housing. The GPS component can provide positioning data real-time or at desired intervals. The GPS component can provide positioning data for storage on a memory device within the microchip package, for example as a function of time, and/or for immediate transmission to another device, as mentioned in the preceding paragraph.

The Type 2 microchip packages can include, in addition to or alternative to a temperature sensor or GPS positioning tool, a moisture sensor. The moisture sensor is also contained within the housing provided by the respective shells secured together. In one example, the moisture sensor can be used to provide a warning or alarm indicating the presence of moisture. The indication can be used to control the tool, for example automatically by communication with the machine operating the tool, such as by way of an Intelimodule, or directly to a user who can take appropriate action. The data can also be sent to other devices, such as described with respect to FIG. 10.

The Type 2 microchip packages identified herein can be constructed and include the components represented in FIG. 6.

Other microchip packages described herein can have additional characteristics beyond those described with respect to FIG. 6 (FIG. 7). Some exemplary characteristics 700 illustrated include microchip package dimensions, construction, and specifications. In any microchip package example described herein having remote sensors, the microchip package may include all of the characteristics represented in FIG. 6, for example characteristics of Type 2 microchip packages, but also includes remote sensors communicating with the microchip package. The Type 3 microchip packages may be used with a rotary cutting element, for example a saw blade with a core, a guide bar for chainsaws, a drill, and other working tools driven by a machine for the respective tool. Exemplary remote sensors include thermocouples, for example Type K thermocouples, moisture sensors, strain sensors, electrical resistance sensors, and the like. Additional functions provided by the microchip package may also include such things as indicators, for example an indicator light such as LEDs, and the like. In the illustrated example, an LED can be provided at a peripheral location of the tool or at other locations on the tool useful for an operator, for example that which may indicate motion, location, or the like.

Any Type 3 microchip package can include any one or more of the features, structures and functions identified herein for a Type 2 microchip package, along with one or more external or remote sensors, and it will be understood that any microchip package having an external or remote sensor can have any one or more of the Type 2 microchip package features and functions achieved in a manner as described herein. A Type 3 microchip package will have one or more pins, slots, or connection points for receiving a conductor for a respective remote sensor. The Type 3 microchip package can also have a connection point for an external antenna and/or for an external device that is other than a sensor, and in one example an indicator LED.

Figure 16:
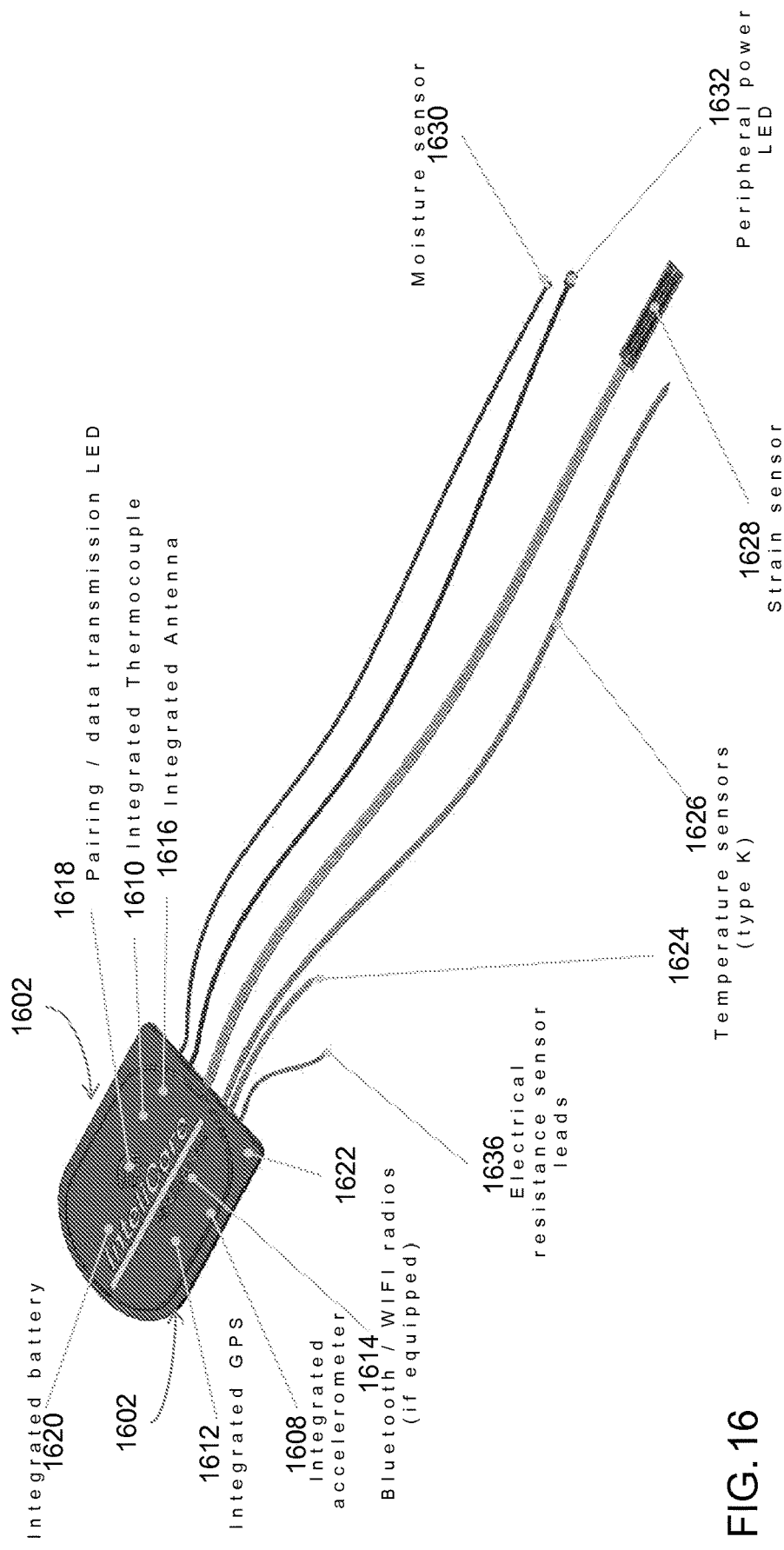
FIG. 16 is an isometric view and partial schematic of an exemplary data component for use with the apparatus and methods described herein, depicting a plurality of embedded components and a plurality of external components.

A Type 3 microchip package can include one or more temperature sensors extending from the microchip package, such as described below with respect to FIGS. 16-18. As indicated in FIG. 7, the temperature sensors can be Type K thermocouples. In one example, a temperature sensor can be included with a length sufficient to reach a perimeter or edge area of a working portion of the tool. In an example of a circular saw blade, the temperature sensor can extend to the area of the cutting perimeter, for example to gullets at the perimeter, in the area of the cutting segments or cutting tips. For example, the tip of a thermocouple can be positioned in a cavity, depression or opening in a portion of the core just interior to a circumference running through the gullets. The tip of the thermocouple can be placed approximately ½ inch to an inch below the area where cutting segments or cutting tips are secured to the core of the blade.

An intermediate temperature sensor can be included in a microchip package having external or remote sensors, in addition to or alternative to a perimeter temperature sensor. In one example, an intermediate sensor can be coupled to the microchip package with a lead sufficiently long to have the sensor approximately 2 to 3 inches beyond a blade flange or beyond a mounting structure of the machine for mounting the tool, in such a way that a temperature of the tool can be measured sufficiently far from the machine mounting structure to reduce the effects of any temperature contribution from the machine. In another example, the intermediate sensor can be positioned approximately half way between the mounting structure of the machine for the tool and the working perimeter of the tool. In an example of a guide bar having a plurality of external temperature sensors, the temperature sensors can be positioned at locations dividing the length of the guide bar into approximately equal sections. In another example of a guide bar having a plurality of external temperature sensors, the plurality of external temperature sensors can be placed at opposite working edges of the guide bar. In addition to or alternative to external temperature sensors, a microchip package having external sensors can have a temperature sensor internal to the microchip package.

The microchip package having external sensors can have, additional or alternative to external temperature sensors, moisture sensors and/or strain sensors and/or electrical resistance sensors and/or a light element and/or other sensors. An exemplary microchip package is described further in conjunction with FIGS. 16-18.

The Type 3 microchip packages identified herein can include the components and be constructed according to the information represented in FIG. 7.

FIG. 8 provides another example of specifications and characteristics 800 for a microchip package, in the present example one with integrated sensors, for example a Type 2 microchip package. It may include all the characteristics 600 represented in FIG. 6, and have integrated sensors. For example, the microchip package can be used with a grooving and grinding tool.

The microchip packages described herein can be applied or secured in or onto tools in a number of ways. For example (FIG. 9), some possible specifications 900 for microchip packages that can be used in the present applications for locating and fixing microchip packages on exemplary tools may vary depending on the type of tool. Exemplary tools include cores for circular saw blades, whether solid core, laminated core, laminated and embossed cores, laminated orthotropic analogue cores, laminated, embossed, orthotropic analogue cores, chain bars, core drilling tubes, grinding cores, cores having removable segments, and the like. In solid cores, for example for circular saw blades, solid chainsaw guide bars, grooving and grinding cores, and cores for removable segments, the microchip package can be placed in a laser cut opening according to the geometry of the microchip package, for example by potting with 2216 epoxy. In a laminated core and/or embossed core (see WO2014152063, incorporated herein by reference), a microchip package and any associated remote sensors can be positioned in the core and bonded in a cure cycle for the core. A microchip package can be sandwiched between layers, and may extend through openings in outer layers of the laminate. In a core tube, the microchip package can be placed on a spar plate or on a splash shield (see for example, US 2014-0334892, incorporated herein by reference) and potted with 2216 epoxy. The microchip package can be placed in a laser cut opening, such as one cut 0.005 inch larger than the perimeter of the microchip package. For removable segments, for example segments that can be removably secured to a core, microchip packages can be placed on a structure of the segment approximately 1 inch from an outer edge of the segment, and centered.

Figure 10:
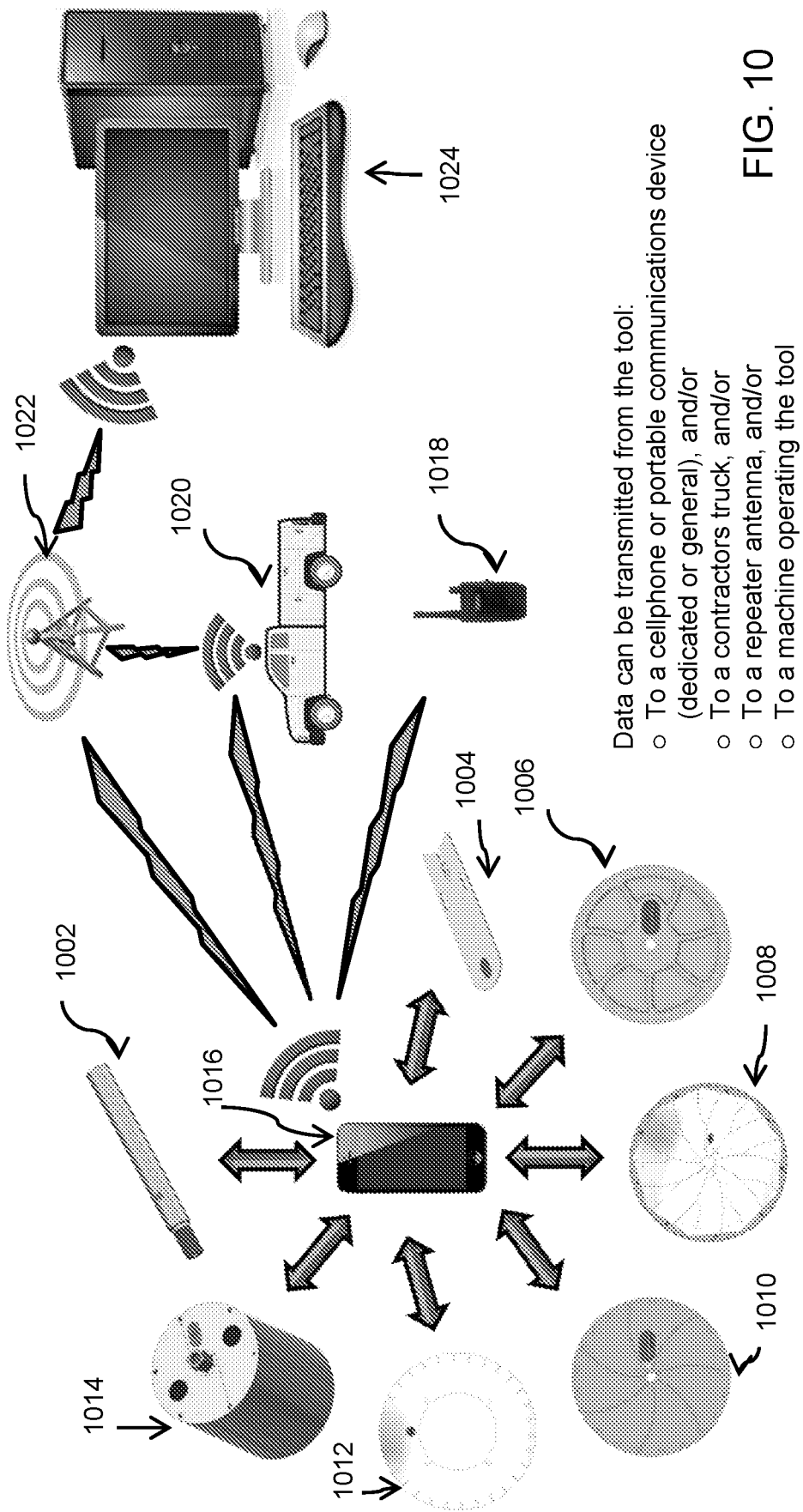
FIG. 10 is a schematic representation of combinations and permutations of tools, data components, machines, other equipment and communications examples between and among them, including as described herein.

FIG. 10 provides examples of communication and data transmission modes and some exemplary tools that can be used with the microchip packages described herein (Type 1, 2 and/or 3 and Intelimodule microchips). The tools include clockwise from the top threaded cores 1002, chainsaw guide bars or chain bars 1004, embossed cores 1006, a removable segment core 1008, laminated orthotropic core 1010, grinding core 1012, and drill tube 1014. The microchip packages can be secured on or in the tools as described herein, for example as described with respect to FIG. 9 or otherwise, and can have the characteristics described herein, for example with respect to FIGS. 7 and 8. In addition to or instead of communicating with the machine on which the tool is mounted and driven, another tool or other local equipment, communications can be with a communications device such as a cell phone 1016 or other two-way communications device 1018, to a vehicle such as a contractors truck or headquarters trailer 1020, and/or to a satellite or other repeater 1022, which can send and receive data to a remote device such as off-site data centers 1024, or other approved entities having an interest in the operation. Communications can be relatively continuous, or can be by batch processing, for example under processor control, or whenever a microchip package is within range of another microchip package or device having communications capabilities.

Figure 19A:
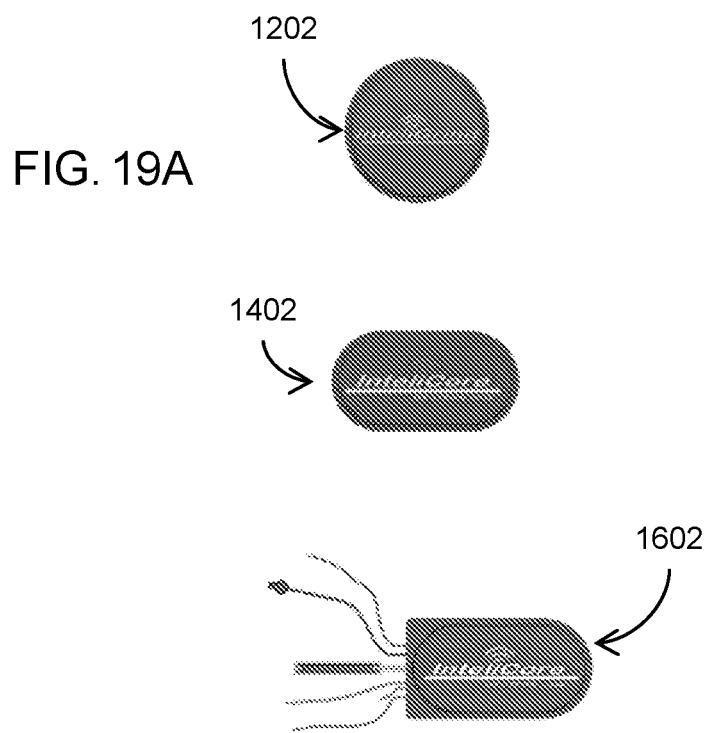

FIG. 11 illustrates an example of three types of microchips, simply by way of example, while it should be understood that other chip types can be used, designed or combined with other components. Type 1 1101 is a read-only configuration, Type 2 1102 is read/write with onboard sensors, mainly sensors that are within the envelope of the package supporting a microprocessor and other electronics, and Type 3 1103 is read/write with remote sensors. The Types 1, 2 and 3 correspond to the microchip package types described herein under those labels. Type 2 can but need not have all the characteristics of the Type 1 device, and Type 3 can but need not have all the characteristics of either or both of Types 1 and 2. Each of the microchip packages can include the manufacturing information desired for the tool, for example such information as listed in 1902 (FIG. 19). Each in addition or alternatively can include operational data such as 2002 (FIG. 20), which may be useful with an Intelimodule in setting operating parameters for a machine with the tool carrying the microchip package. The Intelimodule can be included on the machine operating the tool, or may otherwise interface with the machine for controlling the machine and the tool. Such operational data may include maximum allowable speed and temperature, optimal speed and temperature, machine compatibility information, and the like.

Each of the microchip package Types 1, 2 and 3 include a microchip, memory device or other device for storing the information, and electronic circuitry permitting the data to be read from the microchip package. The storage device and the electronic circuitry may be on a dedicated chip or can be on discreet components on a printed circuit board or other common support structure. The term "microchip" includes any of the devices described herein as Type 1, Type 2 or Type 3, or similar structures having similar functions with similar results, and "microchip" does not refer only to a microprocessor. The electronics are then packaged in a secure and reliable package, for example a pair of housing elements glued, bonded, adhered or otherwise secured together to withstand moisture, vibration, impact and the like. The microchip package can then be secured on or into a tool as desired, for example in one of the methods and configurations described and specified with respect to FIG. 9. Examples of assembled tool and microchip package combinations are illustrated in and described with respect to FIGS. 55-56.

Figure 12:
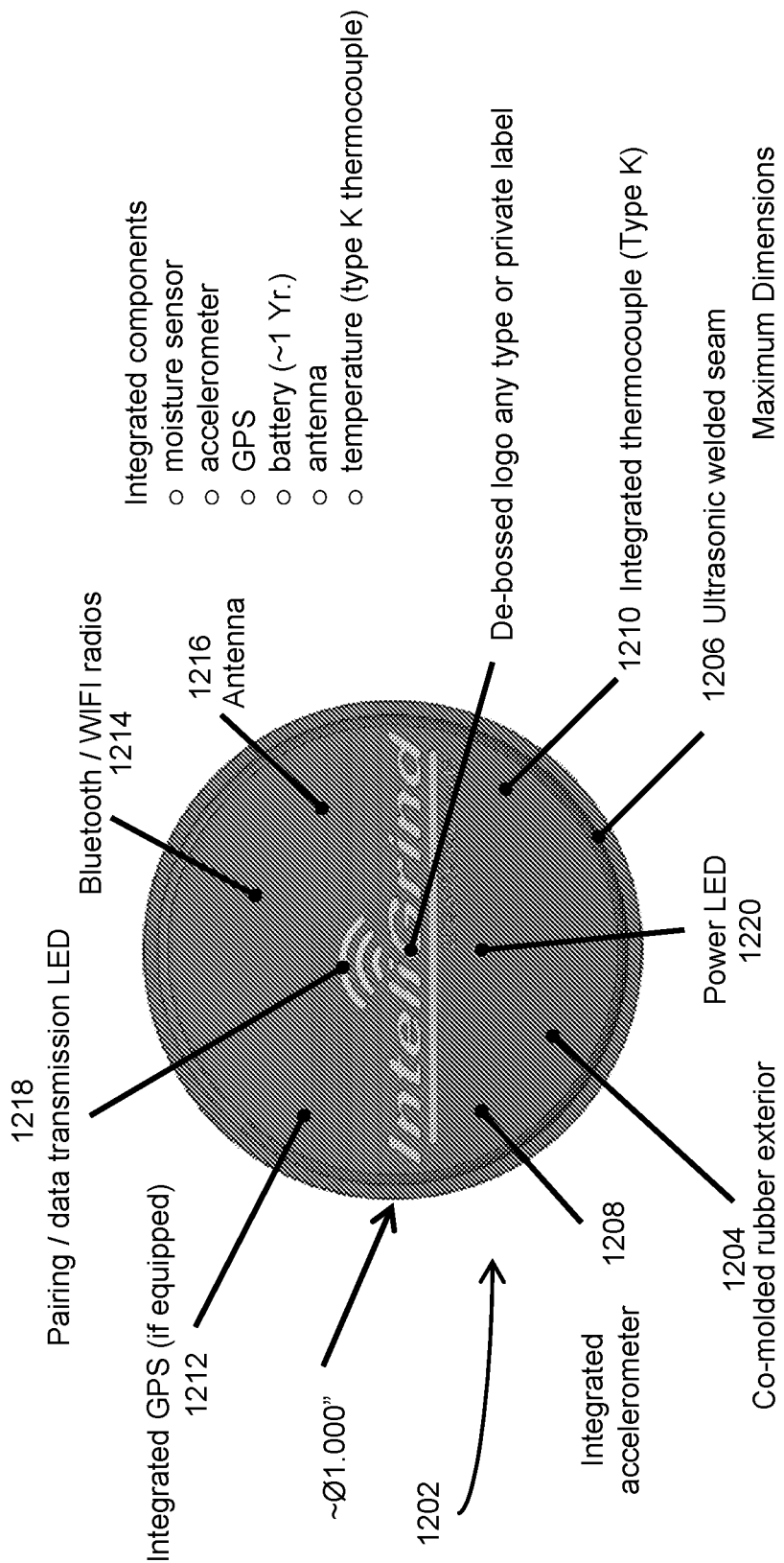
FIG. 12 is a plan view of an exemplary data component for use with apparatus and methods described herein.

FIG. 12 illustrates an example of a microchip package 1202, that can be a Type 1 or 2 microchip package, for example. The package is shown as being substantially circular, but other shapes are possible and contemplated. In the illustrated example, the package is formed from two opposite shells or layers, mated together to form an interior cavity around the contents, such as any of those described herein. The package can be formed from co-molded rubber shells 1204, or other suitable materials. The shells join at a perimeter flange formed by respective lips on the shells, which are then ultrasonically welded or otherwise secured to form a seam 1206. In a configuration of a Type 1 microchip package, the contents of the package include the desired storage component and electronics for providing the stored information when activated. The illustrated example has a 1 inch diameter.

In another configuration, the microchip package 1202 can have a greater capability than passive data storage of a Type 1 microchip package, and can include sensors, positioning functions, and/or communications capability, for example functions that may be included on a Type 2 microchip package, as well as the components, data and functionality of a Type 1 microchip package. As one example, the microchip package 1202 may be used on a grinding tool, with onboard sensors, for example GPS, accelerometer 1208, thermocouple 1210, and/or a GPS positioning system, and the like. The sensors can be integrated onto a single chip, or maybe placed on a printed circuit board or other circuit platform. The microchip package 1202 in a Type 2 configuration also includes communications capability, Bluetooth and/or Wi-Fi radio communication 1214, or similar, along with an integrated or internal antenna 1216. The microchip package may include a pairing or data transmission indicator such as an LED 1218 for indicating a communications link or transmission, for example. The microchip package also includes a battery or other storage device, and may include a power indicator 1220.

It should be understood that a microchip package example such as a Type 1 might not have embedded sensors, but in the present examples, a Type 2 microchip package may have moisture and temperature sensors, accelerometer, GPS, and the like, e.g. any of the functions and characteristics of the Types 2 and 3 microchip packages described herein but embedded on the components within the housing of the Type 2 microchip package. In the present example in FIG. 12, as with all of the examples described herein of the component generically identified as "microchip", the microchip package is a primarily electronic device in a protective housing, for example PA 6 polymer (polyamide), possibly with graphite, which may be potted in place with 2216 Epoxy, for example, in a solid core, a laminated core, in a tool wall, or the like. The components inside and/or forming the "microchip" may include the desired components along with a microprocessor, a power supply such as a battery or other supply, analog components, contacts or connection elements, communication circuits, indicators, sensors, and the like.

Figure 13:
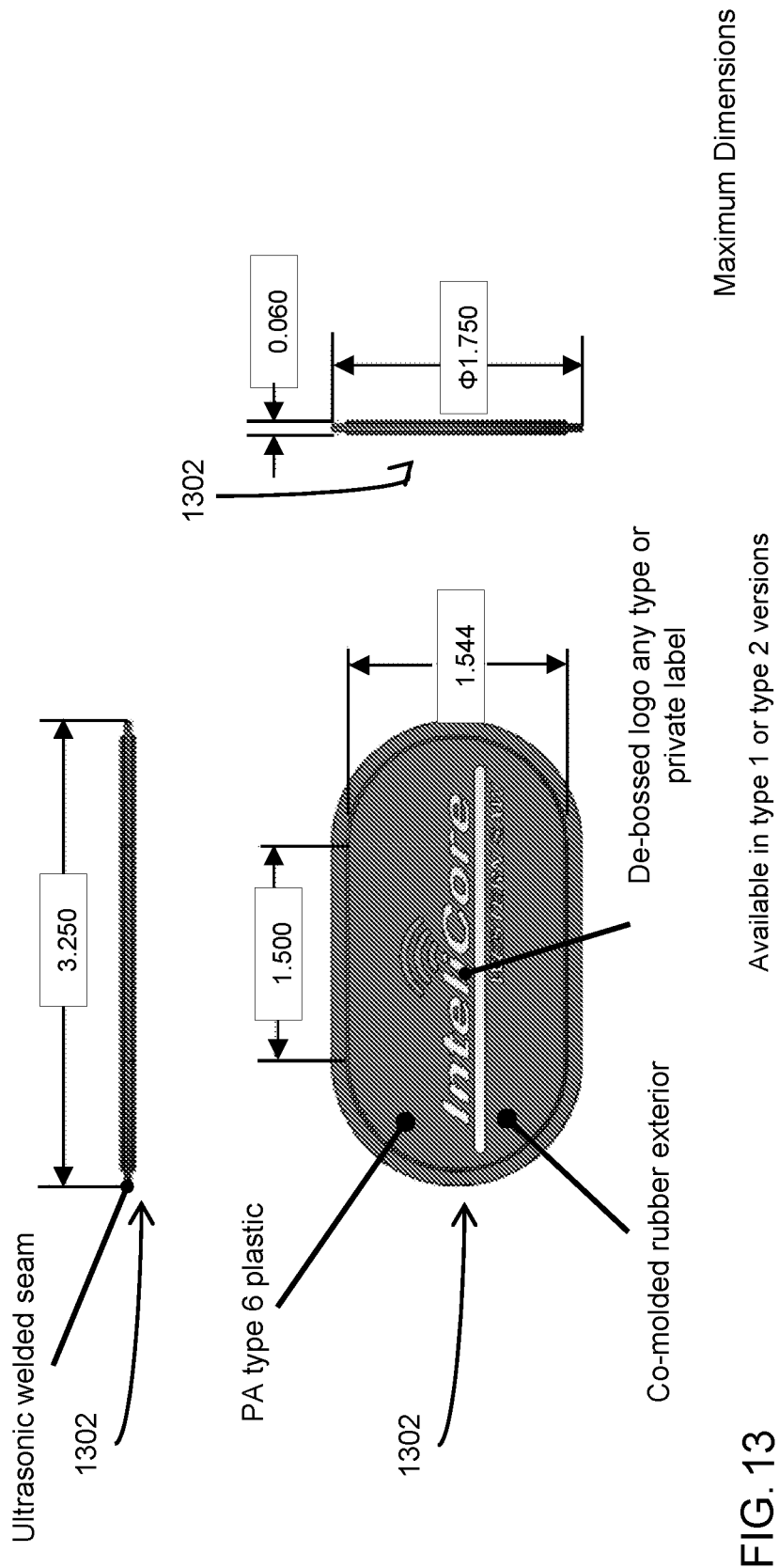
FIG. 13 is a plan view of a further exemplary data component for use with apparatus and methods described herein.

FIG. 13 is another example of a microchip package, which can also represent Type 1 or Type 2 microchip package versions. As with any of the microchip packages described herein, the microchip packages can have a planar geometry with first and second sides, and can have a perimeter rim having a smaller thickness than the remainder of the microchip package, for example around which an ultrasonic weld is formed to seal and secure the sides of the package or assembly together. The rim can be used to pot the microchip package in place, or to place and secure the microchip package in a laminar structure (see FIG. 56). Such a geometry can be used with a solid core, a laminar core, and other tool structures. Other perimeter geometries can be used to support and secure the microchip package in or on the supporting structure, whether the structure be a blade core, a drill core, grinder core, guide bar for a chainsaw, tube, or a machine for a tool such as others of those described herein or other devices. The two halves of the assembly can be formed from a PA type 6 plastic, or they can have a co-molded rubber or other softer durometer exterior (for example, softer than the PA type 6 plastic from which the sides of the assembly can be formed, or a durometer similar to rubber or similar materials), which can reduce the effects of vibration and also help to seal against moisture or foreign debris. FIG. 13 illustrates exemplary dimensions of the microchip package in the non-circular example.

Figure 14:
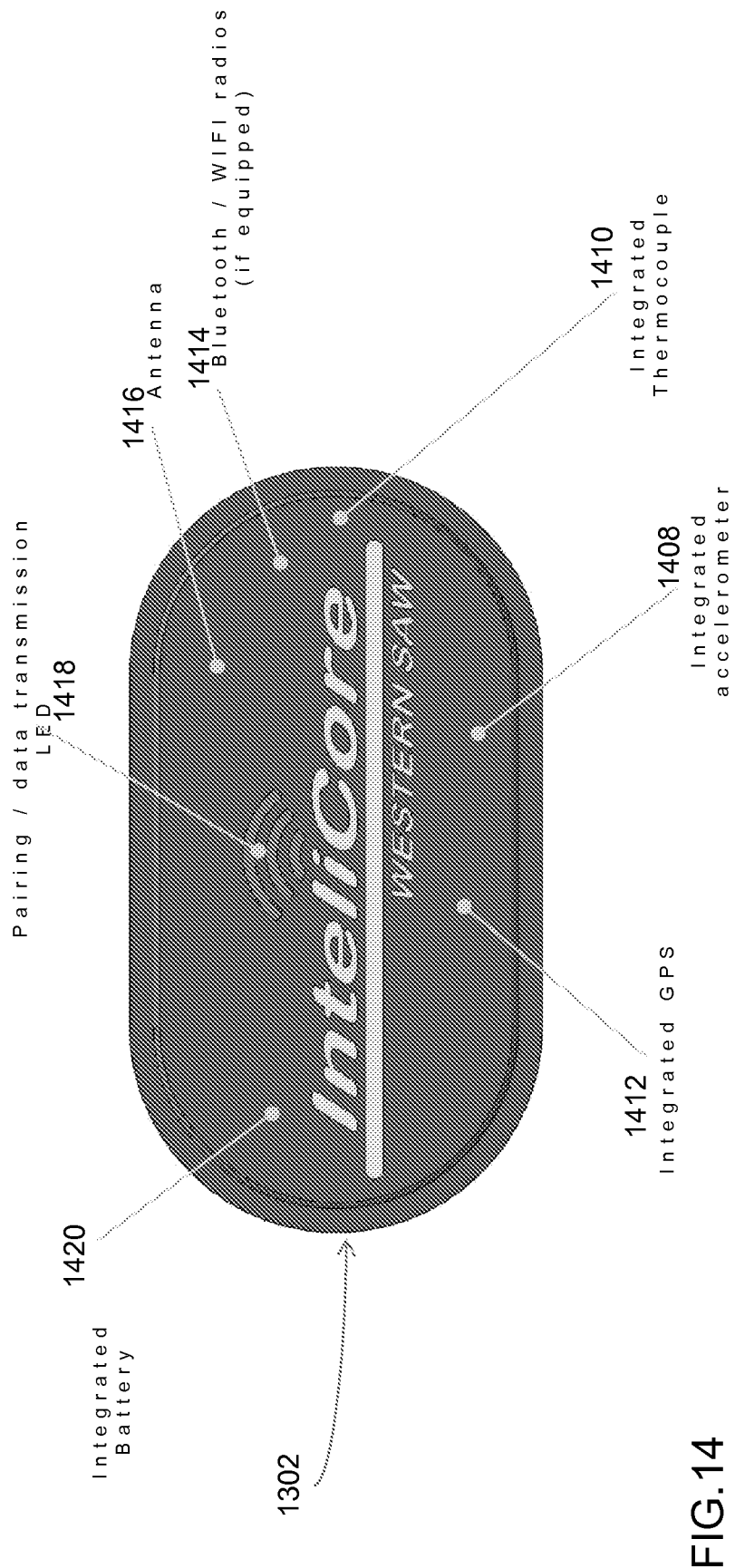
FIG. 14 is a plan view and partial schematic of a further exemplary data component for use with apparatus and methods described herein.
Figure 15:
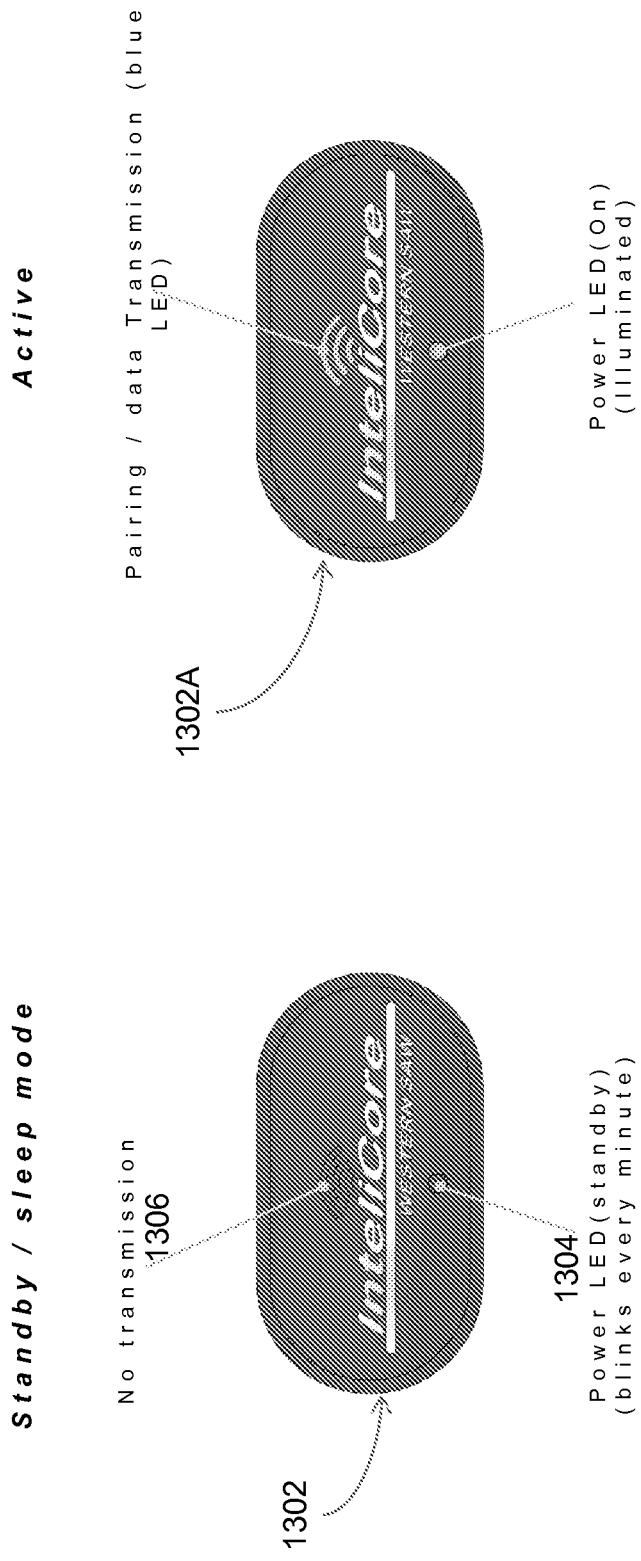
FIG. 15 is a plan view and partial schematic of an exemplary data component for use with apparatus and methods described herein depicting 2 states of operation.

The microchip package 1302 (FIG. 14) may be used on the tools as described herein, among others, and may include onboard sensors, for example an integrated GPS positioning system 1412, integrated accelerometer 1408, integrated thermocouple 1410, and the like. The microchip package also includes a co-packaged or integrated battery 1420, for example of the type described herein. The microchip package 1402 in a Type 2 configuration also includes communications capability, for example Bluetooth and/or Wi-Fi radio communication 1414, or similar, along with an integrated or internal antenna 1416. The microchip package can also include a pairing or data transmission indicator such as LEDs 1418. When the microchip package 1302 is in a standby mode, a power LED 1304 (FIG. 15) may blink periodically, for example every minute. When there are no transmissions occurring, a transmission indicator 1306 may be dark. When power is being supplied, and/or when devices are paired or transmission occurs, the indicators 1304 and 1306 can be illuminated, as indicated at 1302A.

The microchip package 1302, in the example in a Type 2 configuration, is often positioned on the tool to minimize degradation of communications capability. One example may include a circular saw blade, which is often secured on a machine such as a saw on an arbor and sandwiched by opposing blade flanges. The microchip package 1302 can be placed at least partly outside the outer perimeter of the blade flanges, and in some instances completely external to the blade flanges. The desired location of a Type 2 microchip package 1302 may depend on the tool and the onboard/internal functionalities incorporated into the microchip package 1302.

In another example of a microchip package, having additional functionalities beyond a Type 2 microchip package, a Type 3 microchip package 1602 (FIGS. 16-18) may have all the functionalities, components and stored data as a Type 2 microchip package, including if desired and without limitation, integrated accelerometer 1608, integrated thermocouple 1610, and/or a GPS positioning system 1612 integrated or a component of the microchip package 1602. The microchip package 1602 in a Type 3 configuration also includes communications capability, Bluetooth and/or Wi-Fi radio communication 1614, or similar, with an integrated or internal antenna 1616, or the microchip package can include an external antenna (not shown in FIG. 16) coupled to the microchip package and extending outside of the package. The microchip package may include a pairing or data transmission indicator such as an LED 1618 for indicating a communications link or transmission, for example. The microchip package also includes a battery or other storage device 1620 for powering the electronics of the Type 3 microchip package.

The physical enclosure of the microchip package 1602 may be substantially identical to that for the Type 1 and 2 packages in form and function except for a distal end of the package. The distal end of the package is configured to seal around and support one or more externally-extending components, which may include one or more external sensors (i.e. external to the microchip package), communications antenna, or leads for other components, or other structures/functions. The distal end of the package includes in the present example a longitudinally extending flange 1622 that provides a pair of opposite corner portions on the original oval configuration of the Type 2 microchip package. The flange 1622 helps to secure the externally-extending components in the package and provide strain relief and/or structural support therefore, as well as to provide additional surface area for extending along respective adjacent layers of a tool. The flanges 1622 can take other configurations, or can be omitted.

The microchip package 1602 in an alternative configuration can have more limited functions for the integrated components. In any case, in any configuration of the microchip package 1602, the capabilities of the microchip package 1602 can be extended by including external functionalities, including one or more external sensors, one or more external antennas and/or one or more output devices, namely devices that do not provide feedback to the microchip package 1602. In the context of a microchip package such as a Type 3 microchip package, "external" refers to a hardwired component coupled to the electronics package internal to the microchip package and having one or more structural components external to the microchip package. Such external components can be used to produce signals output from the microchip package, such as may be provided by a peripheral LED indicator, provide data signals to the microchip package from outside the microchip package, such as may be provided by external sensors, and may communicate signals bidirectionally such as by means of an antenna.

The microchip package 1602 is particularly useful in laminated tool structures and other multi-component tools, for example that can more easily accommodate external components than can solid core tools. The microchip package 1602 is secured in the tool with any of the structures and methods described herein. In the illustrated example of the microchip package 1602, the microchip package can be secured in a tool in a manner similar to that described and illustrated in FIG. 56. Other methods and means for securement can be used. Considerations for placement of the microchip package 1602 are similar to those for the Type 2 microchip package 1302.

The external components forming part of the microchip package 1602 are each coupled to the appropriate circuits in the microchip package 1602 as required for proper functionality. The microchip package 1602 includes an appropriate circuit board or connection bus, as desired, for the desired connections of the individual external components to the electronics in the microchip package.

While the microchip package 1602 can incorporate one or more of a number of external components, the illustrated example includes first and second external temperature sensors 1624 and 1626, respectively, for sensing temperatures at different locations on the tool. The external temperature sensors, in an example of multiple sensors, will be typically, but need not be, identical sensor components, in the present example type K thermocouples. In the illustrated configuration of the microchip package 1602, the integrated thermocouple 1610 can sense temperature in the region of the blade flange, sensor 1624 can measure temperature at an intermediate location of the tool, and the sensor 1626 can measure temperature in an area of a perimeter or peripheral region of the tool. In such a configuration, the sensor 1624 can measure temperature at a location intermediate the blade flange and the tool periphery. The respective temperature sensors are coupled back into respective circuits in the microchip package 1602, and data produced by the sensors can be recorded, transmitted or otherwise processed. The multiple temperature sensors can be used to map a temperature profile of the tool, with or without approximating or mapping algorithms. Data from any one or several of the temperature sensors can be used to adjust coolant supply, tool speed, rate of advance or feed rate, as well as other operating conditions, for example using an Intelimodule. The data can also be used for tool and machine analysis for example through calculations on remote machines or servers. Such data can then be used to better operate machines, set operating parameters for such tools, as well as possibly improved tool design. Similarly, data from any other sensors associated with any of the microchip packages can be used for adjusting machine operation and other operating conditions, for example using an Intelimodule, for tool and machine analysis, and for setting operating data for machines and tools as well as for possible improved tool design.

Another example of an external sensor includes a strain gauge 1628. The strain gauge may be a foil or similar strain gauge. The strain gauge can be mounted on or between structures of a tool for measuring deflection of the structure. Depending on the structure, a strain gauge might also be able to detect fractures, delamination, expansion stress or other structural issues. The strain gauge is coupled to a corresponding circuit in the microchip package 1602, and data from the sensor recorded, transmitted or otherwise processed as desired.

A further example of an external sensor includes a moisture sensor 1630. The sensor can take a number of configurations, but in one example may be a component providing a binary output, namely high or low as a function of whether or not moisture is detected. The moisture sensor can be placed between adjacent lamina in an interior of a tool assembly, in which case sensing moisture in the interior indicates a possible breach of the integrity of the tool. Presence of moisture may indicate cracking, delamination, or other structural issues. The moisture sensor is coupled to a corresponding circuit in the microchip package 1602, and data from the sensor recorded, transmitted or otherwise processed as desired, including possibly providing an alarm or lockout of the machine, restricting or preventing further use of the tool. Other processing or actions may also be implemented as a function of the sensor output.

In addition to sensors that can be incorporated as external elements with a microchip package such as microchip package 1602, which acquire and transmit data to the package, other components can be incorporated as external components combined with the microchip package 1602. In one example, an additional external component may be a peripheral power LED 1632, which is powered by the microchip package, but does not collect and return any data to the microchip package. The peripheral power LED may be coupled to an appropriate circuit in the microchip package to power the LED or other indicator or light source, and the LED is placed on or in a support structure of a tool, for example a laminated blade core, to extend to a peripheral portion of the tool. The LED may then be illuminated when the tool begins operating, thereby indicating the operating status of the tool. In a tool such as a circular saw blade, a peripheral LED also provides a visual indication of not only the location and approximate peripheral boundary of the tool, but also an indication of a direction of travel.

Another external sensor that can be used with the microchip package 1602 includes an electrical resistance sensor 1802 (FIG. 18) coupled to a resistance sensor lead 1636. The sensor lead 1636 is coupled to an appropriate circuit in the microchip package 1602 for applying a voltage or current to the sensor 1802, and for detecting electrical changes on the circuit which may indicate structural changes adjacent the sensor 1802. As illustrated in FIG. 18, the lead 1636 from the microchip package 1602 is coupled to the sensor 1802, in the present example extending as a continuous element about a peripheral portion of a circular saw blade 1804. In the present example, the sensor 1802 is a continuous element to provide a complete circuit around the periphery of the blade, but other sensor configurations can have the sensor discrete or discontinuous. In the present example, the sensor is a conductive film adhered to one or more structures in the blade, in the present example adhered to facing surfaces of adjacent lamina in a laminated blade. The blade 1804 also includes embossed lamina, but can take other configurations. The sensor can also be placed on solid core tools, for example if the sensor includes a form of protection from the working environment. When a voltage is applied to the electrical resistance ring 1802, variations in the material characteristics can be sensed, for example variations that might arise from fractures, bending or other stresses in the tool. Such stresses can be detected by appropriate circuitry in the microchip package 1602, for example by sensing resistance changes in the ring 1802, the magnitude or variation of which can be used to evaluate possible changes occurring in the tool. Such data can be recorded, transmitted or otherwise processed as desired, including possibly providing an alarm or lockout of the machine, restricting or preventing further use of the tool, or other actions. Data collected from the electrical resistance sensor can be used to map structural variations or influences on the core, such as may be used to provide a map of the type shown at 1806.

FIG. 19 graphically illustrates three types of microchip packages described as examples herein (1202, 1402 and 1602), and exemplary tools on which one or more of them may be used, and exemplary manufacturing data that may be placed on the microchip packages in onboard memory that can be read from the microchip package. The data may include the types of information described above with respect to FIG. 1, and includes generally static or manufacturing data corresponding to the tool on which the microchip package is to be placed. Exemplary tools 1904 include diamond tools (DT), saw bodies (SB), chain bars (CB), drill bits (DB), threaded tubes (TT), Inteliparts (IP), grooving and grinding tools (GG), handheld tools (HH), early entry tools (EE), surface preparation tools (SP), tile and masonry tools (TM), remote demolition tools (RD), and wire sawing (WS) tools. Any moving tool can benefit from the microchip packages as described herein.

FIG. 20 illustrates exemplary operating data that can be static operating data that is static on a microchip package (including Types 1, 2 and 3 microchip packages described herein). With moving tools, such as the tools described with respect to FIG. 19, such data may include maximum allowable RPM, machine compatibility information, temperature limits, for example at an arbor and at a periphery and at a location intermediate the arbor and perimeter, vibration limits, strain limits, service or duration limits, wet or dry usage verification, rotational or directionality verification, optimal RPM data, optimal temperature data, optimal depth per pass, optimal vibration limits and/or optimal strain limits. One or more of these data can be used with a microchip package on a machine or other device capable of controlling or influencing the operation of the tool, including based on static and/or dynamic data from the machine or from the tool, such a microchip package on or available in connection with a machine in the present example being termed "Intelimodule".

Figure 21:
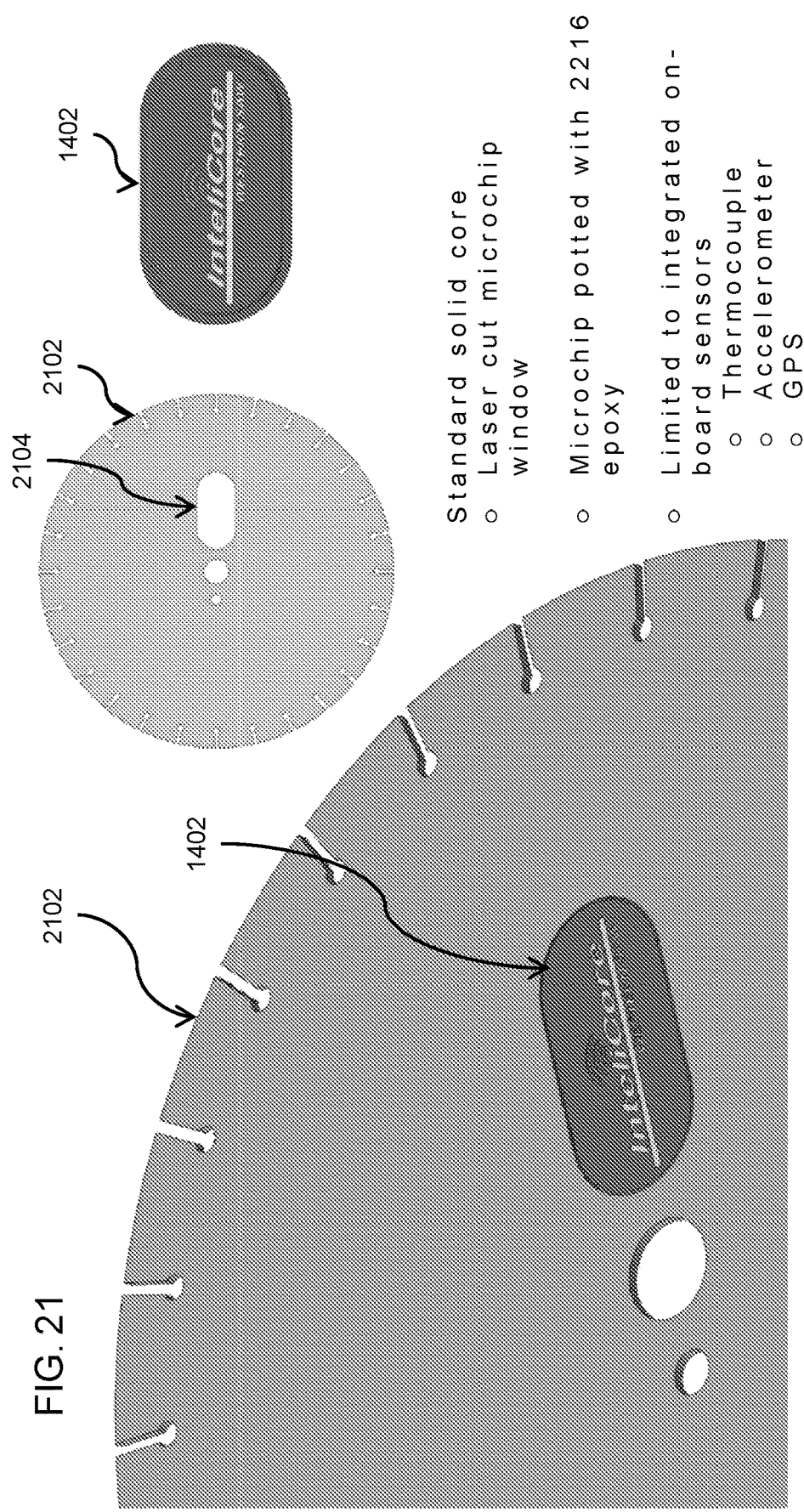
FIG. 21 is a plan view and a partial isometric view of a tool and a data component in the exploded and un-exploded form.

FIG. 21 illustrates an example of installation of a microchip package on a solid core, in some configurations of which the microchip package may be limited to one having only integrated onboard sensors, if any. Therefore, in such a configuration, the core could include Type 1 and/or Type 2 microchips, 1202 and 1402 respectively. The microchip package can be positioned in a corresponding opening 2104 in the core 2102, such as may be laser cut, and potted in place, for example with 2216 epoxy.

Figure 22:
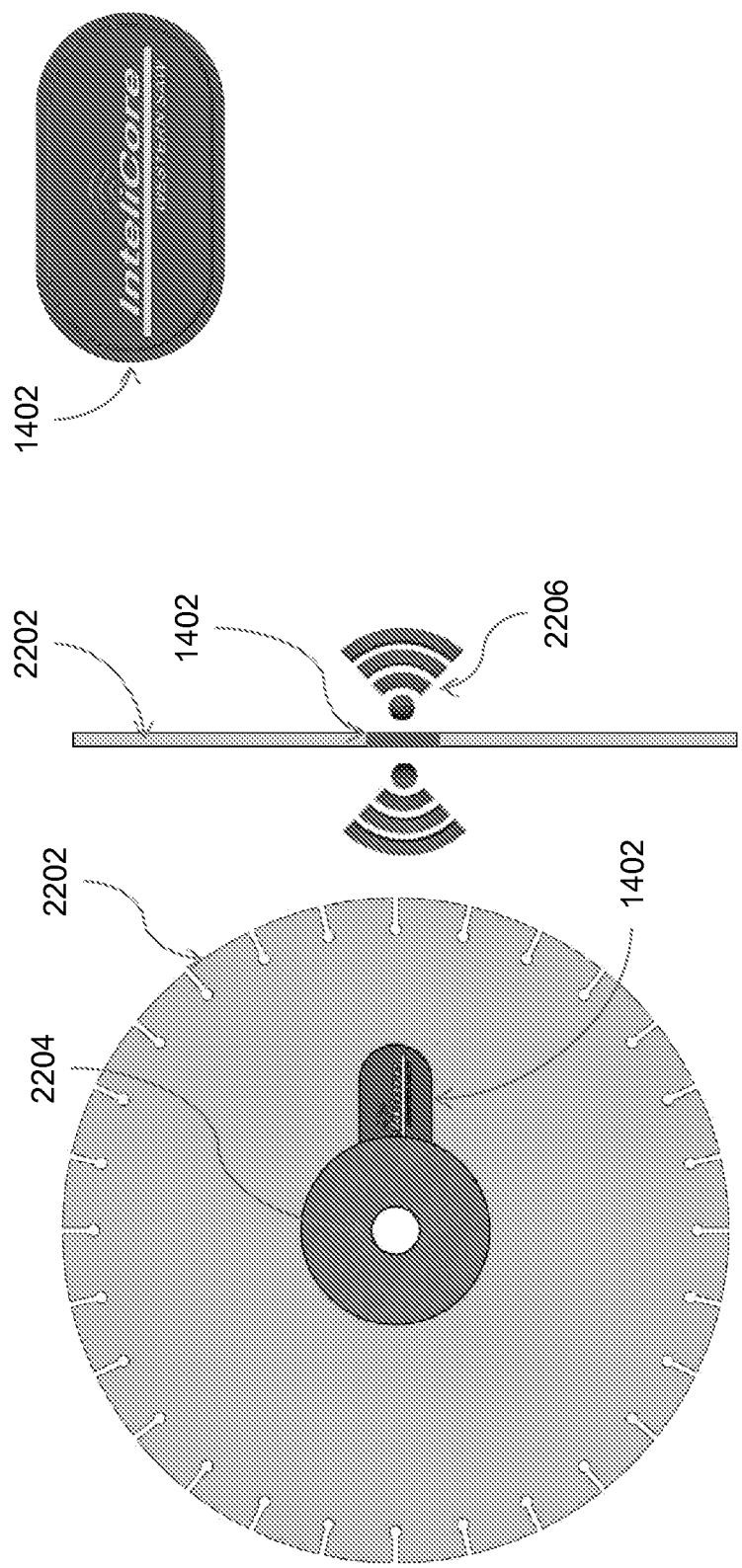
FIG. 22 includes a plan view and a side elevation view of an exemplary tool and data component and schematically illustrating communication of data to and/or from the data component.

FIG. 22 illustrates several design considerations for placement of one or more microchip packages on a circular tool, for example a cutting blade 2202, and for example one that may be supported with flanges extending outward from a center 2204 of the tool. In one configuration, the microchip package includes a portion (for example between half and two thirds for broadcasting within a desirable range) that extends or is positioned outside of the outer boundary of the flange. Data transmissions can occur on both sides of the tool, as represented by the electromagnetic waves 2206. An embedded temperature sensor such as a thermocouple within the microchip package can measure temperature in the area of the blade flanges.

Figure 23:
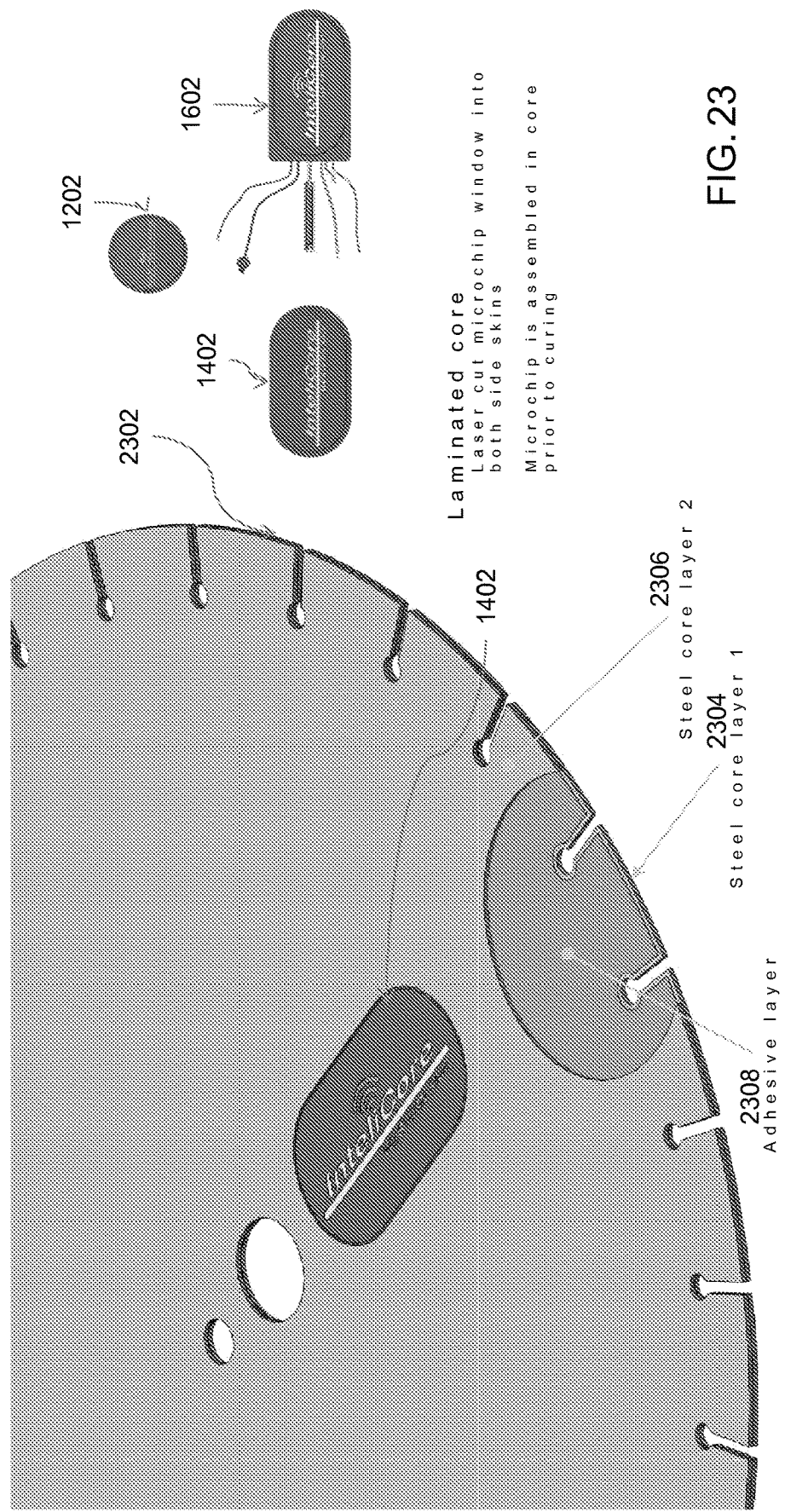
FIG. 23 is an isometric and partial cutaway view of an exemplary tool and data component, including possible examples of data components that can be used with such a tool.

FIG. 23 illustrates design considerations that may be useful for laminated structures with which one or more types of microchip packages can be used, including Types 1, 2 and 3, 1202, 1402 and 1602, respectively. In the illustrated example, the tool is a circular cutting blade 2302 formed with a laminar core having first and second outer core layers 2304 and 2306, respectively, and secured with adhesive 2308 between adjacent lamina (see, for example, FIG. 56). Additional layers may be included, depending on the desired core structure. Type 1, Type 2 and/or Type 3 microchip packages can be used with such a configuration, for example as well as other microchip package configurations.

Figure 24:
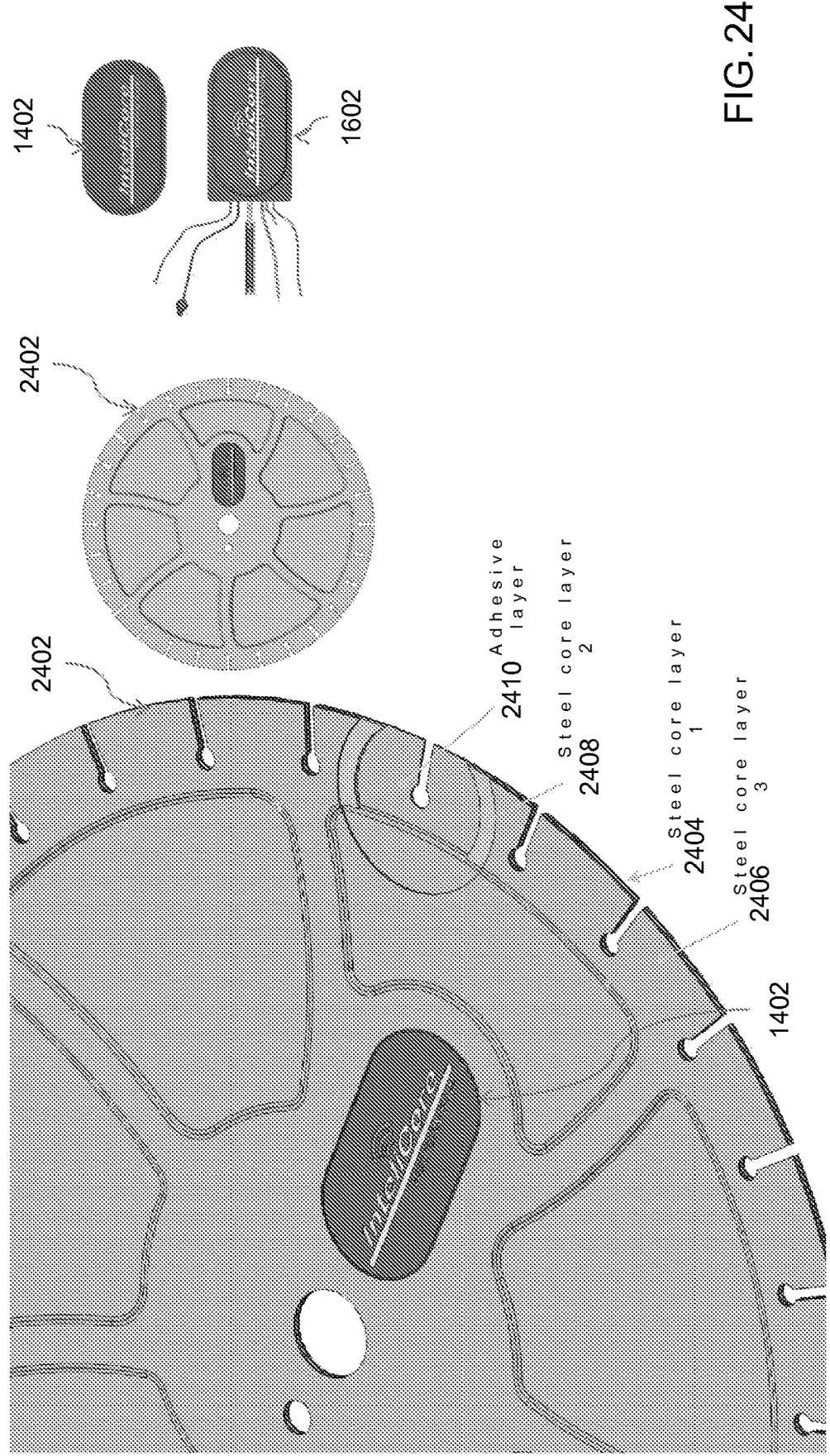
FIG. 24 is an isometric and partial cutaway view of a further exemplary tool and data component, including possible examples of data components that can be used with such a tool.

FIG. 24 illustrates several design considerations for placement of one or more microchips, including for example microchip package is 1402 and 1602, on a tool 2402 similar to that illustrated in FIG. 22, but where the core is a laminated embossed core. The core 2402 includes first and second outer layers 2404 and 2406, respectively, with an intermediate steel core layer 2408 between the first and second outer layers. Each of the first and intermediate layers and the second and intermediate layers are bonded together with a respective adhesive layers 2410. Microchip packages such as those described herein can include Type 1, Type 2 and/or Type 3 microchip packages as well as other microchip package configurations, and are placed into laser cut or otherwise formed openings in corresponding layers of the core 2402, and placed in the core prior to curing of the core. In another example of an embossed core such as a solid embossed core (not shown), the microchip packages of Type 1 and Type 2 would be more often used, not having external sensors.

Figure 25:
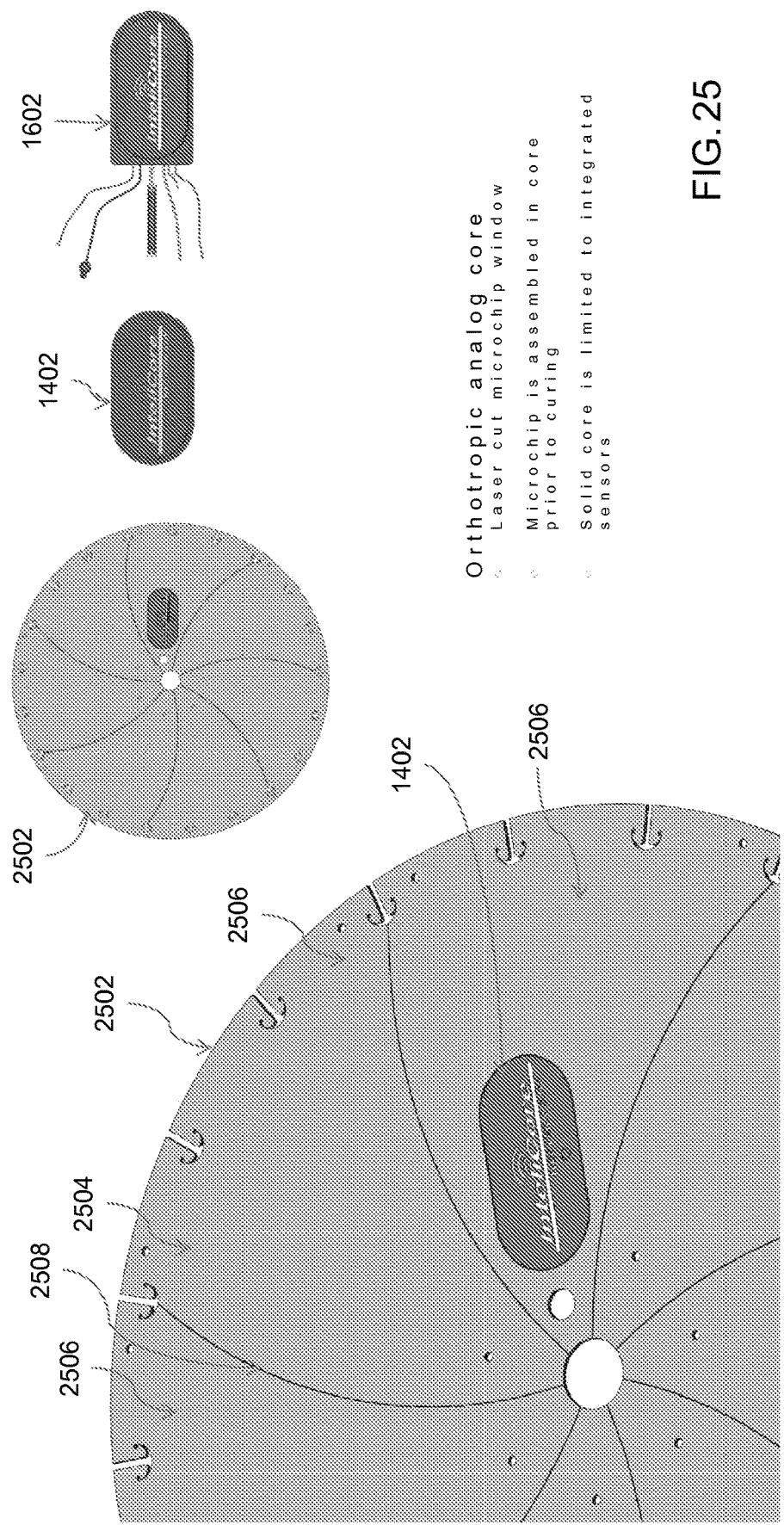
FIG. 25 includes a partial isometric view and a plan view of a further exemplary tool and data component, including possible examples of data components that can be used with such a tool.

FIG. 25 illustrates several design considerations for placement of one or more microchips, including for example microchip packages 1402 and 1602, on a tool 2502 similar to that illustrated in FIG. 22, but where the core is a laminated orthotropic analog core. The core 2502 includes first and second outer layers, one of which is indicated at 2504, and wherein each layer includes sections 2506 patterned and assembled into a layer to form the layer 2504. The second, opposite layer on the opposite side of the core may be a solid core, but in the present example is formed in a pattern and assembly identical to that shown for layer 2504, where the arcuate junctions 2508 between adjacent sections 2506 would also be arcing outward in a clockwise direction if the core were reversed and viewed in the same direction as the core is viewed in FIG. 25. Microchip packages such as those described herein can include Type 1, Type 2 and/or Type 3 microchip packages as well as other microchip package configurations and are placed into laser cut or otherwise formed openings in the layers of the core, and assembled into the core prior to curing.

Figure 26:
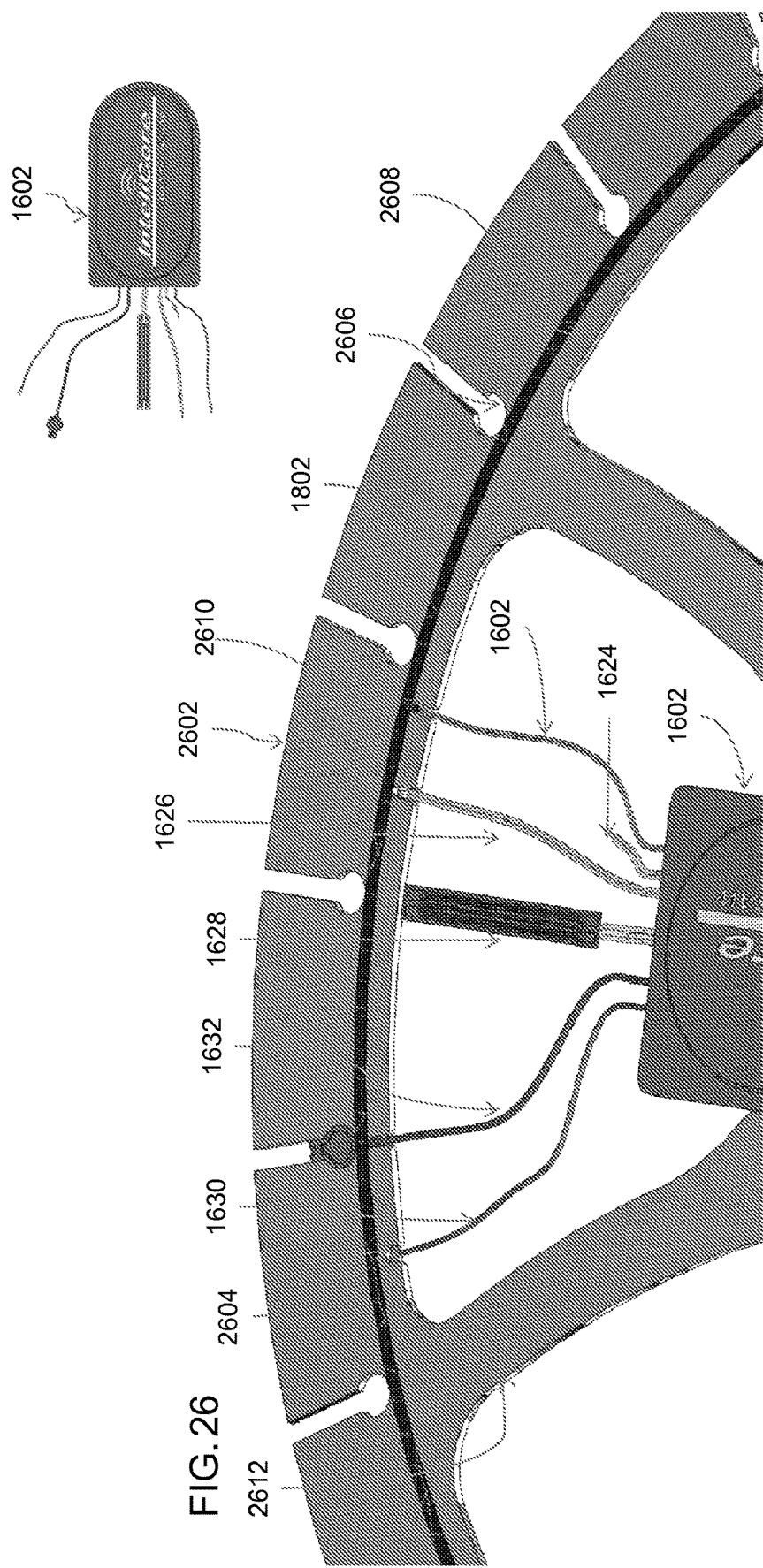
FIG. 26 is a partial isometric view of part of a tool component and an exemplary data component that can be used there with for forming a tool and data component combination.

FIG. 26 illustrates several design configurations for external sensors used with a microchip package, including for example configurations for placement of external sensors in a laminated core "L" (FIG. 23), a laminated and embossed core "LE" (FIG. 24), a laminated and embossed orthotropic analogue core "LEOA", and a laminated orthotropic analogue core "LOA". FIG. 26 shows an intermediate core layer, which would have at least one and generally a second outer layer on respective sides of the intermediate core element or layer 2602. In various configurations, such microchip packages and one or more external sensors may be used on laminated cores, laminated and embossed cores, laminated, embossed and orthotropic analogue cores, and/or laminated orthotropic analogue cores. Other configurations are also possible. In the present illustration, left-most sensor is a moisture sensor (1630), after which is an LED source or other light source (1632), followed by a strain sensor (1628), one or more thermocouples (1624 and 1626), and then in the present example, electrical resistance sensor (1602) coupled to an electrical resistance ring (1802, FIG. 18). Other sensors and configurations can be used or included with one or more of the illustrated sensors and/or indicators. Additional microchip packages can also be included on such tools.

In the present example, the moisture sensor 1630 is placed in a cavity 2604 in a portion of the perimeter of the core 2602 interior to an annular structure 2608 defined by interior surfaces of the gullets 2606. The moisture sensor can alternatively or additionally be placed at other locations in the core, for example between outer layers of the core. The moisture sensor is then coupled back to the microchip package through a corresponding lead.

The light source 1632 in the present example is placed in the bottom of a gullet 2606 with a lead therefore being formed in a groove or channel across the perimeter structure 2608. In the present example, the light source is visible from both sides of the core and from a perimeter of the core. In other configurations, the light source can be positioned in openings in the outer layers of the core to be visible from both sides of the core, even though the light source may not be directly visible from the precise perimeter in a plane containing the core. The light source is then coupled back to the microchip package through a corresponding lead.

The strain sensor 1628 may be positioned in the core anywhere between the microchip package 1602 and the perimeter of the core. In the present example, illustrated in FIG. 26, the strain sensor 1628 extends radially, but may extend off a radius. As illustrated, the strain sensor 1628 is positioned to have a distal end portion adjacent the annular structure 2608, and approximate location that could see the largest movement of a portion of the core out of a plane of the core, for example lateral motion. The strain sensor 1628 can, but need not be, bonded for example adhesively to adjacent surfaces of layers of the core. In a core having three layers, for example first and second outer layers and the layer 2602 in between, the strain sensor 1628 can be attached to respective adjacent inward-facing surfaces of the first and second outer layers. The sensor then coupled back to the microchip package through corresponding leads.

In the illustrated example of FIG. 26, the core includes a perimeter thermocouple 1626 and an intermediate thermocouple 1624. The perimeter thermocouple is positioned in a corresponding cavity or opening 2610 in the perimeter structure 2608 of the intermediate core 2602. The cavity 2610 can, but need not extend completely through the thickness of the intermediate core. The thermocouple 1626 is then coupled back to the microchip package through corresponding leads.

The intermediate thermocouple 1624 extends outward from the microchip package 1602 and terminates at the selected distance from the microchip package and positioned at the selected location along a radius from the center of the core to the core perimeter. The position or positions of an intermediate thermocouple or multiple intermediate thermocouples may be selected as a function of the number of thermocouples and the expected operation for which the tool is to be used. In one configuration, the intermediate thermocouple 1624 can be positioned in a cavity (not shown) in a support structure 2612 of the intermediate core. The thermocouple 1624 is then coupled back to the microchip package through corresponding leads.

The illustrated example of FIG. 26 also includes the conductive resistance sensor 1602. The resistance sensor 1602 is a conductive film, tape, strip or other continuous or partially continuous structure positioned on a layer of the core. In the present example, the resistance sensor is positioned on one or both surfaces of the intermediate core layer 2602, on the annular structure 2608 interior to the gullets 2606. A resistance sensor is coupled back to the microchip package through respective corresponding leads.

Figure 27:
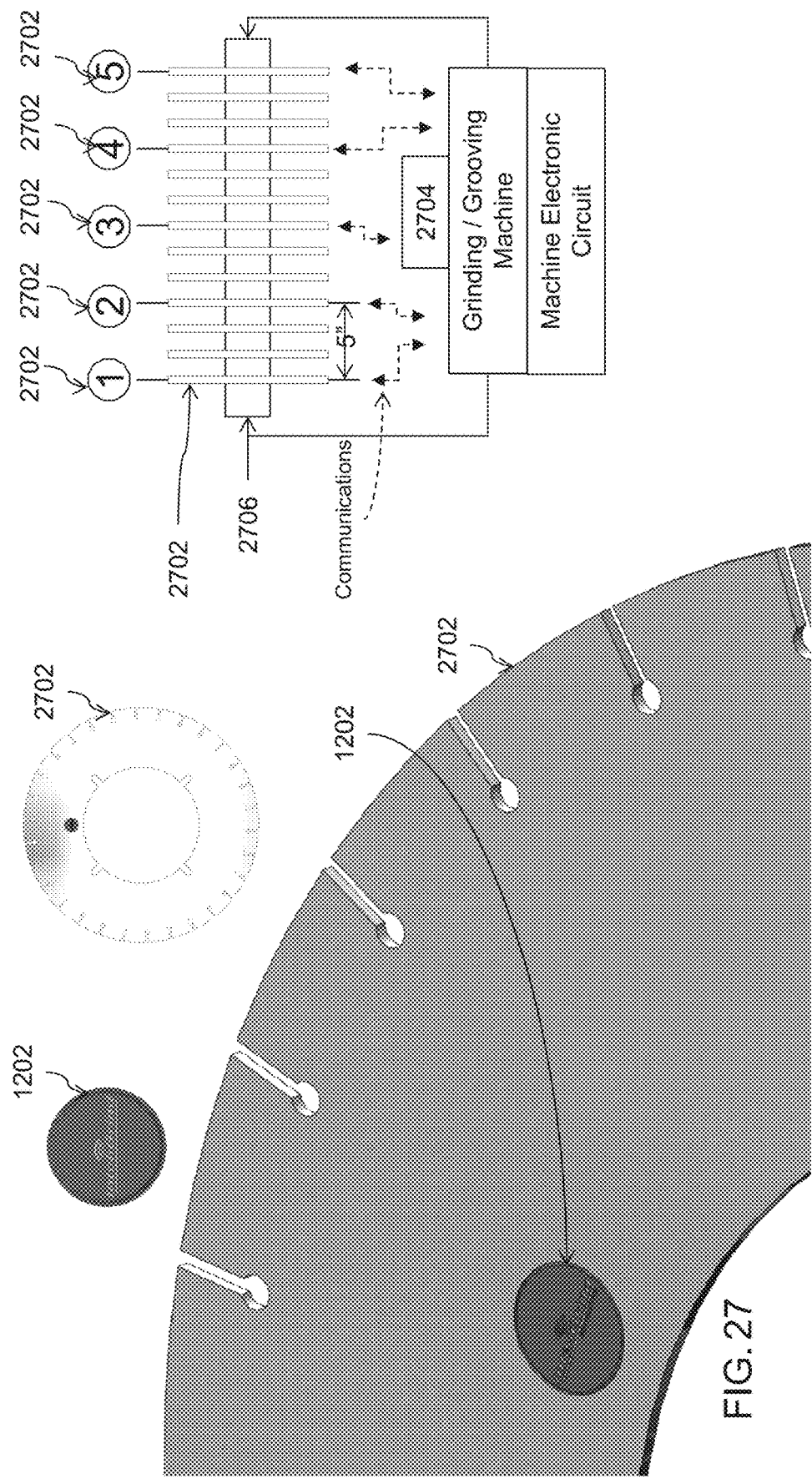
FIG. 27 includes a partial isometric view and a plan view of a tool and data component for use there with, for example a grooving or grinding core, and a plan view of an assembly of a grooving or grinding apparatus including a plurality of grooving or grinding cores.
Figure 51:
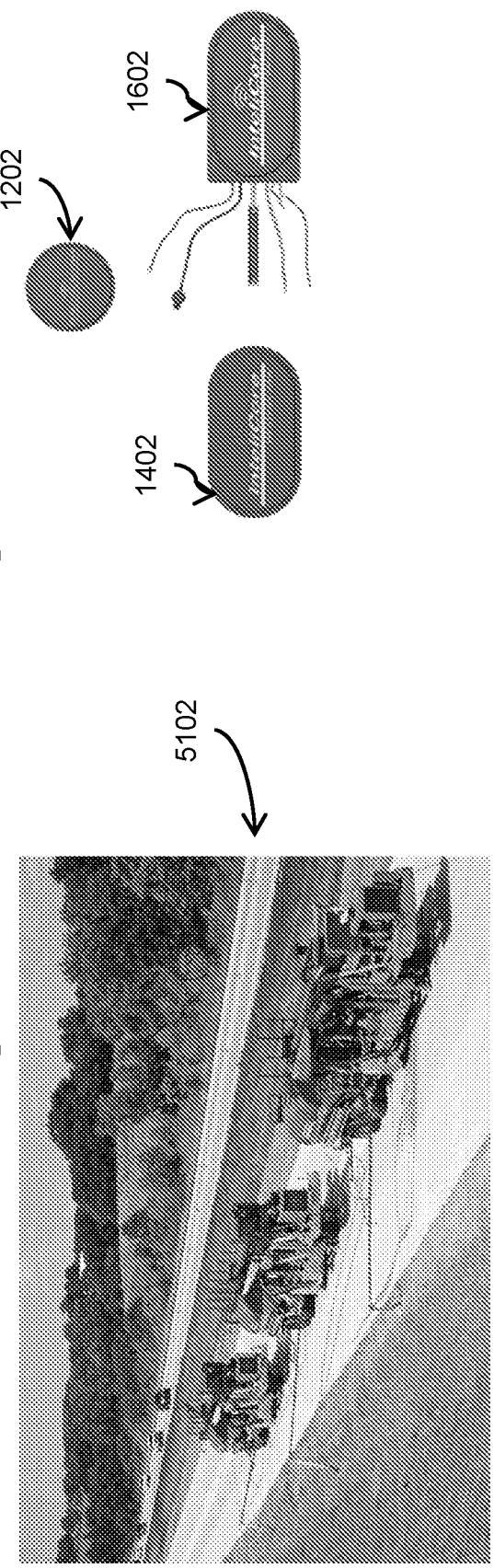
FIG. 51 is a schematic representation of a functionality such as that described with respect to FIG. 50.

One or more microchip packages can be used on one or more grooving and grinding cores (FIG. 27). Microchip packages such as an Inteligrind microchip package 1202 identified herein and discussed with respect to FIG. 12 can be used on one or more grooving and grinding cores 2702 of a grooving and grinding machine. In one configuration, all cores can include a microchip package, and in another configuration, alternating cores at positions 1-5 can have respective microchip packages either identical to each other (for example the microchip described with respect to FIG. 12), or different, as desired. In one configuration, unique electronic serial numbers can be read in software and plotted simultaneously for data analysis. Where each microchip package includes a thermocouple, temperature can be sensed on each of the corresponding cores, and transmitted along with a core serial number or other identification to an Intelimodule or other communications and processing device 2704 on the grooving and grinding machine (such as illustrated in FIG. 51. The grooving and grinding machine is a conventional grooving and grinding machine in which multiple cores 2702 are spaced apart and supported on a driving shaft 2706 according to a desired spacing. In the present example, every fourth core positioned on 5 inch centers includes a microchip package having at least a thermocouple sensor onboard for sensing temperature of the core to which it is mounted. The microchip package is placed in a laser cut or otherwise formed opening in the core and potted in place. Data can then be collected by the machine 2704 as a function of the core position (operating data and a core identifier such as a serial number or other unique identifier), and operation of the grooving and grinding machine can be adjusted as desired, for example automatically or with operator intervention. Operation can be based on data from a single grooving and grinding machine, or from a plurality of grooving and grinding machines operating at the same job site, either simultaneously or at different times using accumulated data from previous operations at the job site.

Figure 28:
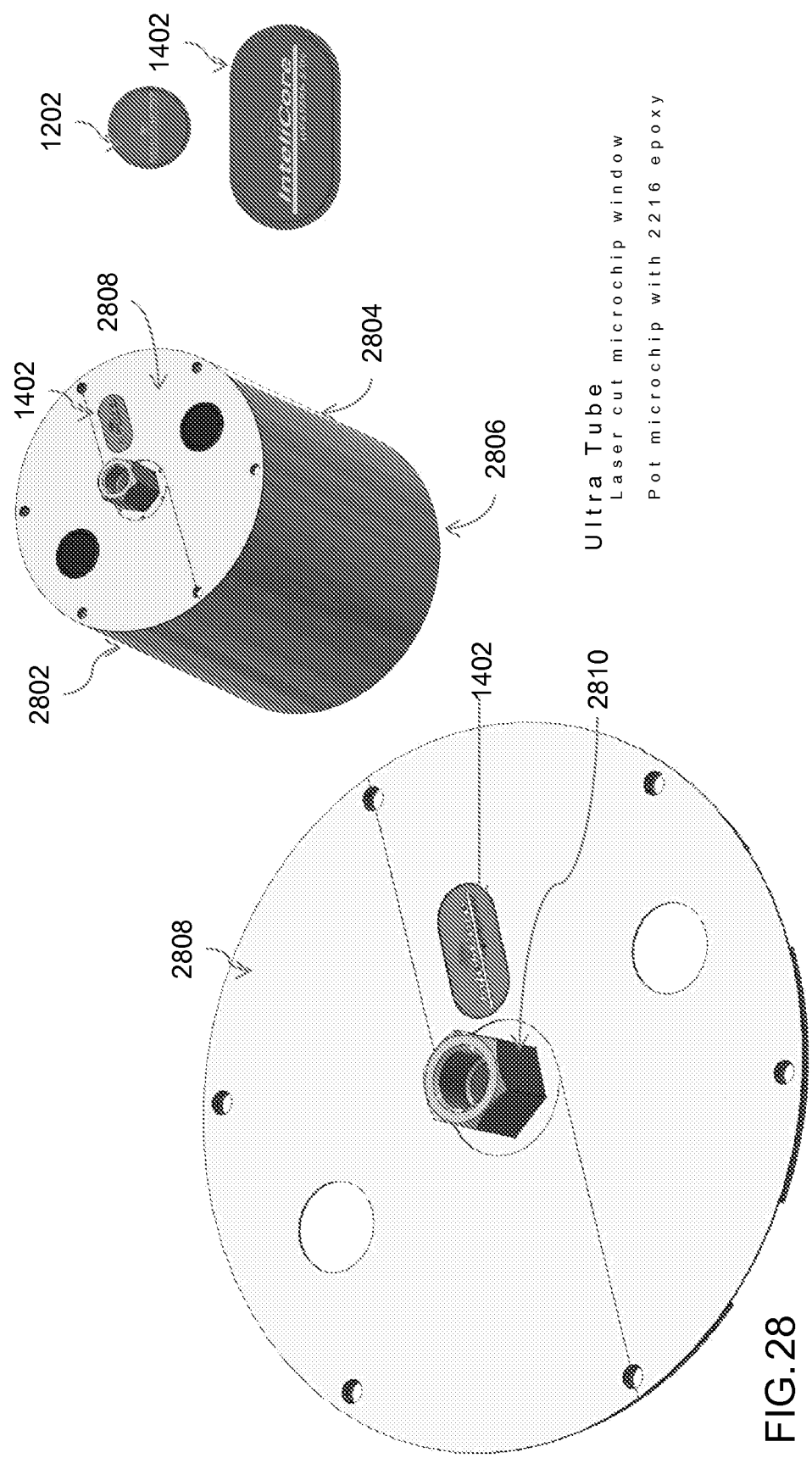
FIG. 28 includes an upper isometric view of a tool and exemplary data components for use there with, in the present example a core bit, and an upper isometric view of a splash plate, drive hub and data component.

FIG. 28 illustrates an example of a microchip package configuration for a core drill or core bit 2802. The core drill includes a cylindrical core 2804 on to which cutting segments are secured at an open end 2806. The core is supported by a transversely extending top plate and/or water guard 2808 to which the drill motor (not shown) is removably secured, such as by a drill nut or drive nut 2810. The microchip package can be secured in a laser cut or otherwise formed opening, for example by potting, or otherwise by fastening to a portion of the core drill. In the present illustration, it can be secured to the top plate or splash plate of the core drill. In the present example, microchip packages of Type 1 or Type 2 would be most commonly used, but external sensors such as strain sensors and the like can be used as well, for example with a Type 3 microchip package.

Figure 29:
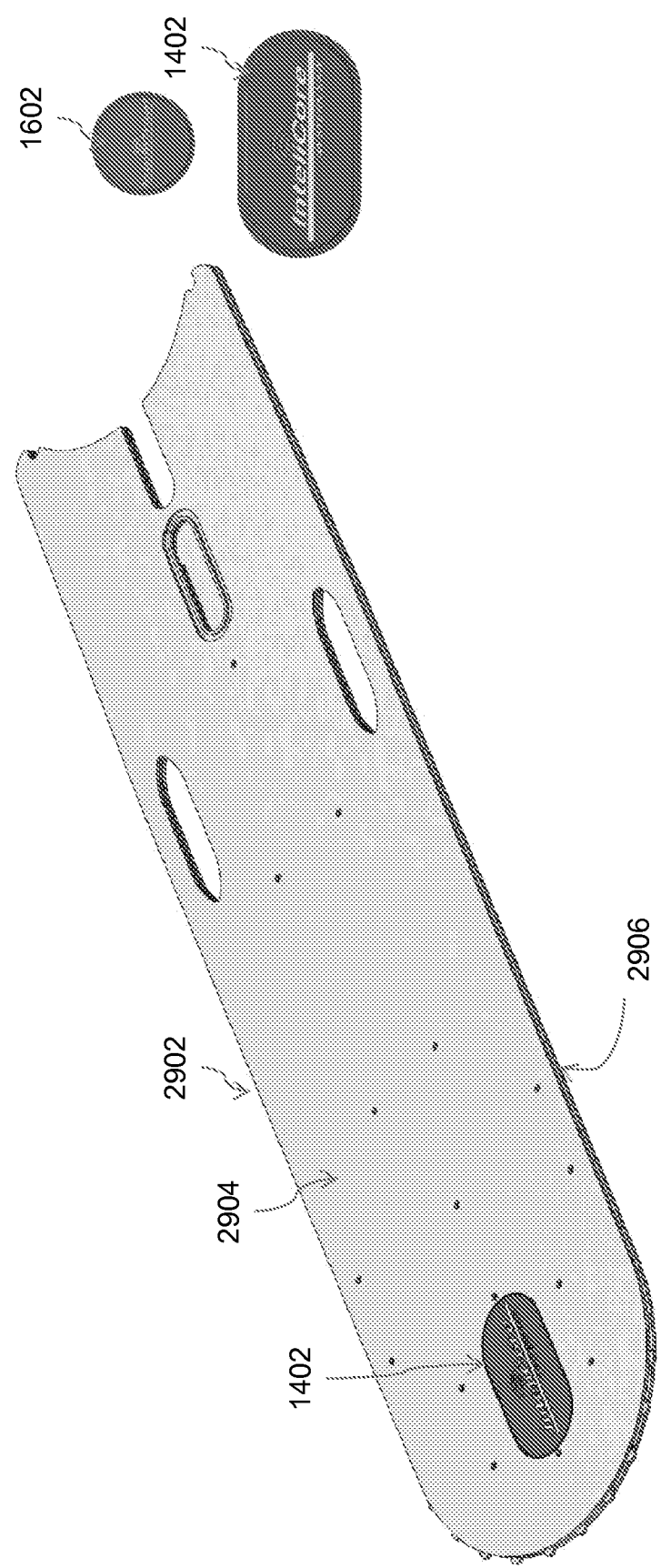
FIG. 29 includes an upper isometric view of a tool and an exemplary data component, along with plan views of possible data components that can be used with such a tool, in the present example a chain guide bar.

A chainsaw guide bar (FIG. 29) may also include one or more microchip packages, for example a microchip package configuration used on a chainsaw guide bar 2902. The guide bar includes at least first and second layers 2904 and 2906 secured together by adhesive, spot welds or other securements. The microchip package can be potted in or assembled as part of a laminate assembly in a laser cut or otherwise formed opening prior to curing the laminate. In the illustrated example, the microchip package 1402 is positioned near a nose of the guide bar in an opening formed in the layer 2904, which can be desired for sensing conditions in the sprocket area, but can be positioned elsewhere in the guide bar. External sensors may also be used to sense temperature and other conditions at desired locations around the guide bar. For example, multiple temperature sensors may be positioned for example at respective intermediate locations on opposite sides of the guide bar. Other microchip packages and sensor configurations can be used.

Figure 30:
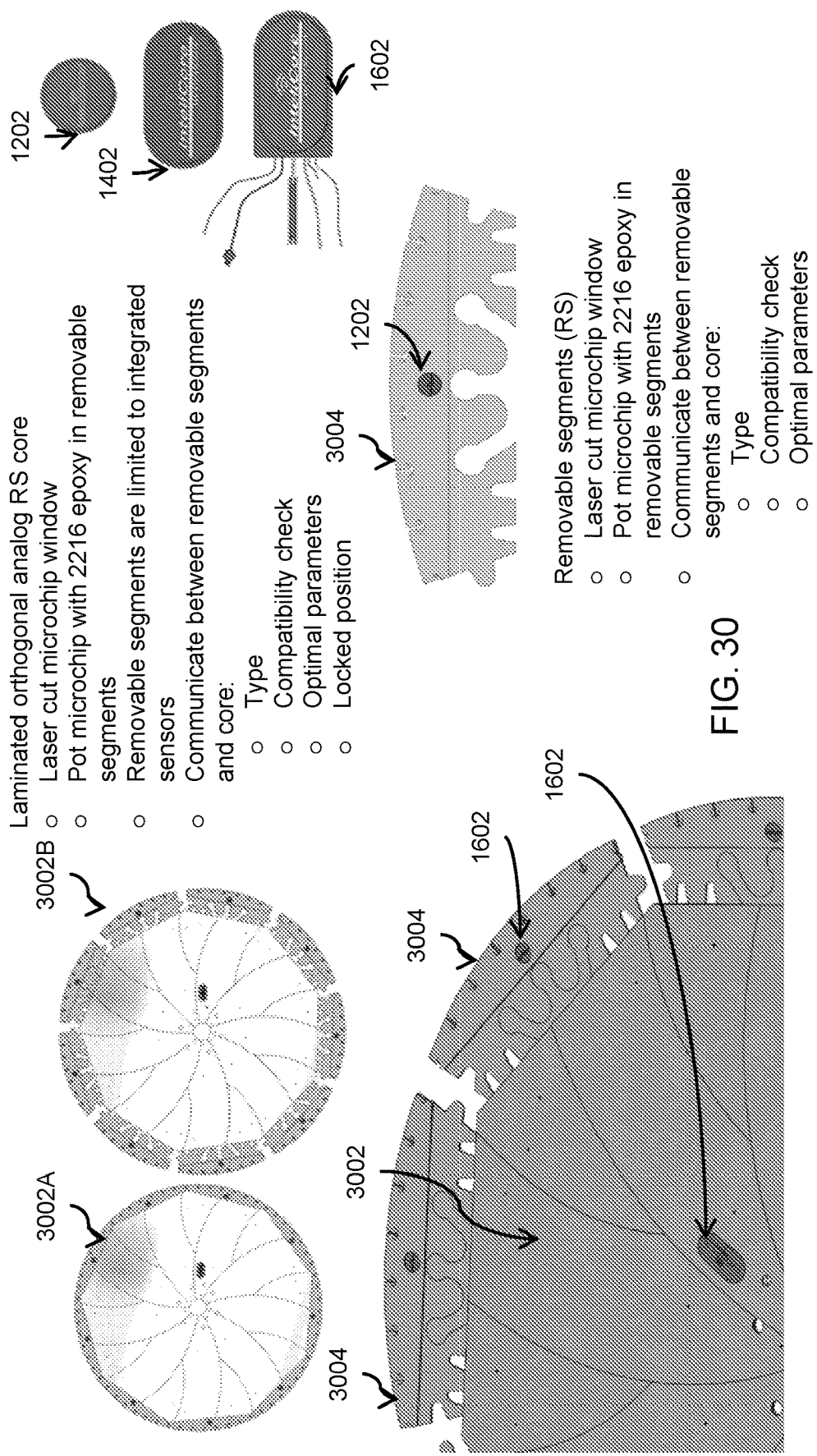
FIG. 30 includes a partial isometric view of a tool assembly and a plurality of data components, a plan view of such a tool in a first configuration, a plan view of such a tool in a second configuration, and a plan view of a removable component of such a tool, along with plan views of possible data components for use with such a tool.

One or more microchip packages, such as those described herein, can be used on a single tool (FIG. 30). In the example illustrated in FIG. 30, the tool configuration includes a core 3002 with removable sections 3004 (RS), wherein at least one and typically more of the removable sections include a respective microchip package. In the present example, the core 3002 is considered a laminated orthogonal analogue core, but can be laminated in a number of configurations. As noted herein, laminated cores can use any of the microchip package configurations described herein including the microchip package 1602 having external sensors and devices, such as those described herein. In the present example, the removable sections 3004 include respective microchip packages, for example those having onboard sensors, including any of the Type 2 microchip packages described herein. The removable sections are also configured to have cutting or other working segments or components (not shown) secured on to the perimeter of each of the removable sections. One or more microchip packages 1602 can be placed at a desired location or locations in the core. Exemplary microchip packages include Type 1, Type 2 and/or Type 3 microchip packages described herein, and/or other configurations, with a Type 3 microchip package 1602 illustrated in the example. In an example of a Type 3 microchip package, or similar, the external sensors can be positioned as desired. In another example, the core sensor could be a Type 1 or a Type 2 sensor that can be used with an Intelimodule. Microchip packages on removable segments can be used to communicate with other microchips, for example on the core, as desired, for example to check compatibility, proper configuration of the assembly, optimal operating parameters, presence or absence of the removable sections in their respective locked positions (3002A), etc. The assembly is shown in an opening or release configuration 3002 B, in which removable sections can be removed, added or replaced. The microchip packages in the removable sections can be used indicate the type of the removable section, provide for compatibility checks for the removable section and the tool on which it is mounted, to communicate optimal operating parameters for the removable section, and for other purposes. The microchip package 1602 can be assembled in the laminated core prior to curing, and the microchip packages in the removable sections can be placed in a laser cut or other form openings in the sections and potted in place with 2216 epoxy or similar.

Figure 31:
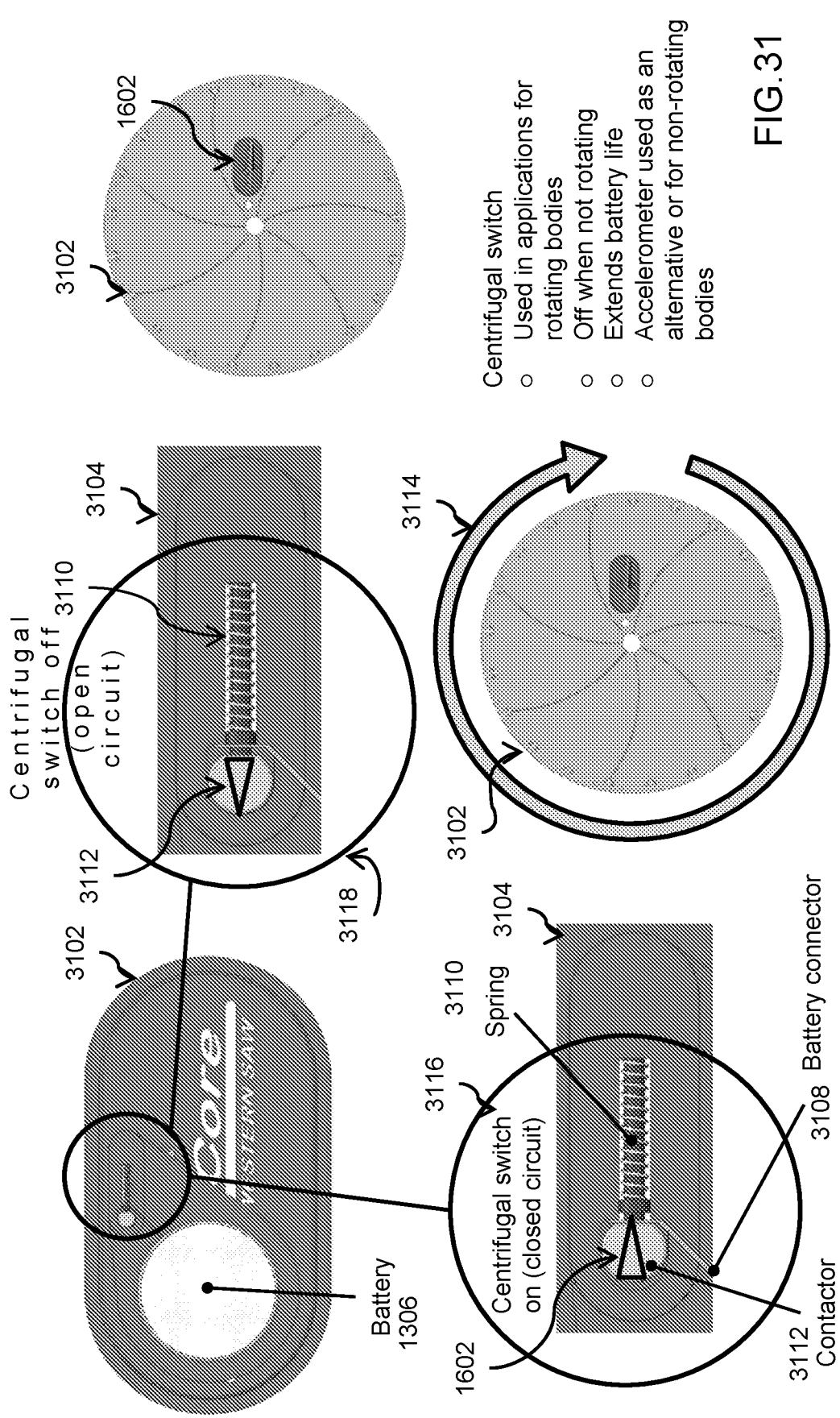
FIG. 31 includes plan views of an exemplary tool and data component for use there with, including a plan view and partial cutaway of a data component that can be used with one or more tools described herein, including details views of a component of the data component in the form of a centrifugal switch in a plurality of configurations.
Figure 33:
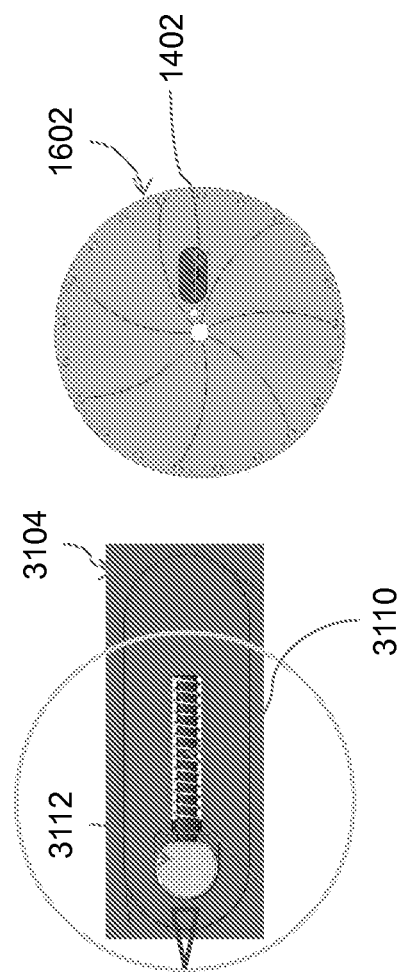
FIG. 33 includes a plan view of an exemplary tool and data component for use there with and a detailed plan view of a partial cutaway of the data component having an exemplary configuration.

FIG. 31 illustrates an example of a microchip package 3102 having a centrifugal power switch 3104. The illustration shows a portion of the microchip package cutaway to reveal an exemplary power switch 3104, and a battery 3106. The power switch and the battery are connected by a battery connector 3108 extending between the battery 3106 and the switch 3104. The switch 3104 includes a spring 3110 biased outward against a contactor 3112, which contactor 3112 can move toward and away from the battery connector 3108 and the spring 3110. In a rotating tool, the switch 3104 is oriented so that the contactor 3112 is located closer to the center of rotation than the spring 3110, so that centrifugal force caused by rotation 3114 moves the contactor against the battery connector 3108 compressing the spring too close to the circuit, producing the configuration shown at 3116. When rotation slows or stops, the spring pushes the contactor 3112 away from the battery connector opening the switch, as represented in the configuration shown in 3118. When the battery is disconnected, the microchip package can be programmed to enter a sleep mode (FIG. 33), for example after five minutes of nonuse/non-rotation/non-movement of the tool as determined by a clock in an onboard sensor in the microchip package 1402. A sleep mode can preserve battery life.

Figure 32:
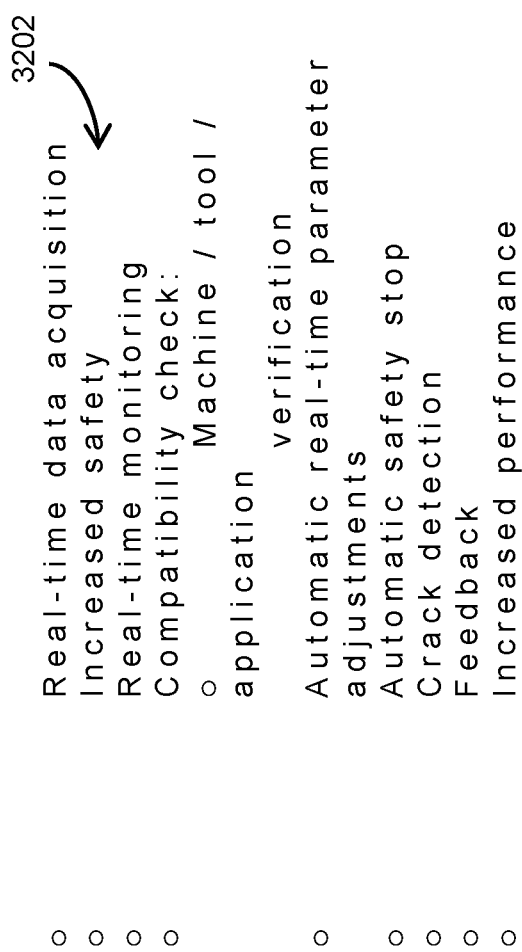
FIG. 32 is a schematic representation of uses and benefits of one or more data components for use with tools such as those described herein.

Microchip packages described herein, either alone or in combination with other devices and/or equipment, for example a machine to which a tool carrying a microchip package is attached, and Intelimodule, as well as other devices such as those discussed with respect to FIG. 10, have a number of benefits 3202 (FIG. 32). They provide for increased Safety, real-time monitoring of tool operation, real-time and delayed data acquisition, with or without operational feedback to a machine operating the tool or tools, feedback to a machine operating the tool or tools for automatic real-time adjustments of the operation, or adjustments of operation through intervention of a user, automatic safety stops or powerdown, increased performance or efficiency with feedback to machine operation, as well as other benefits.

Figure 34:
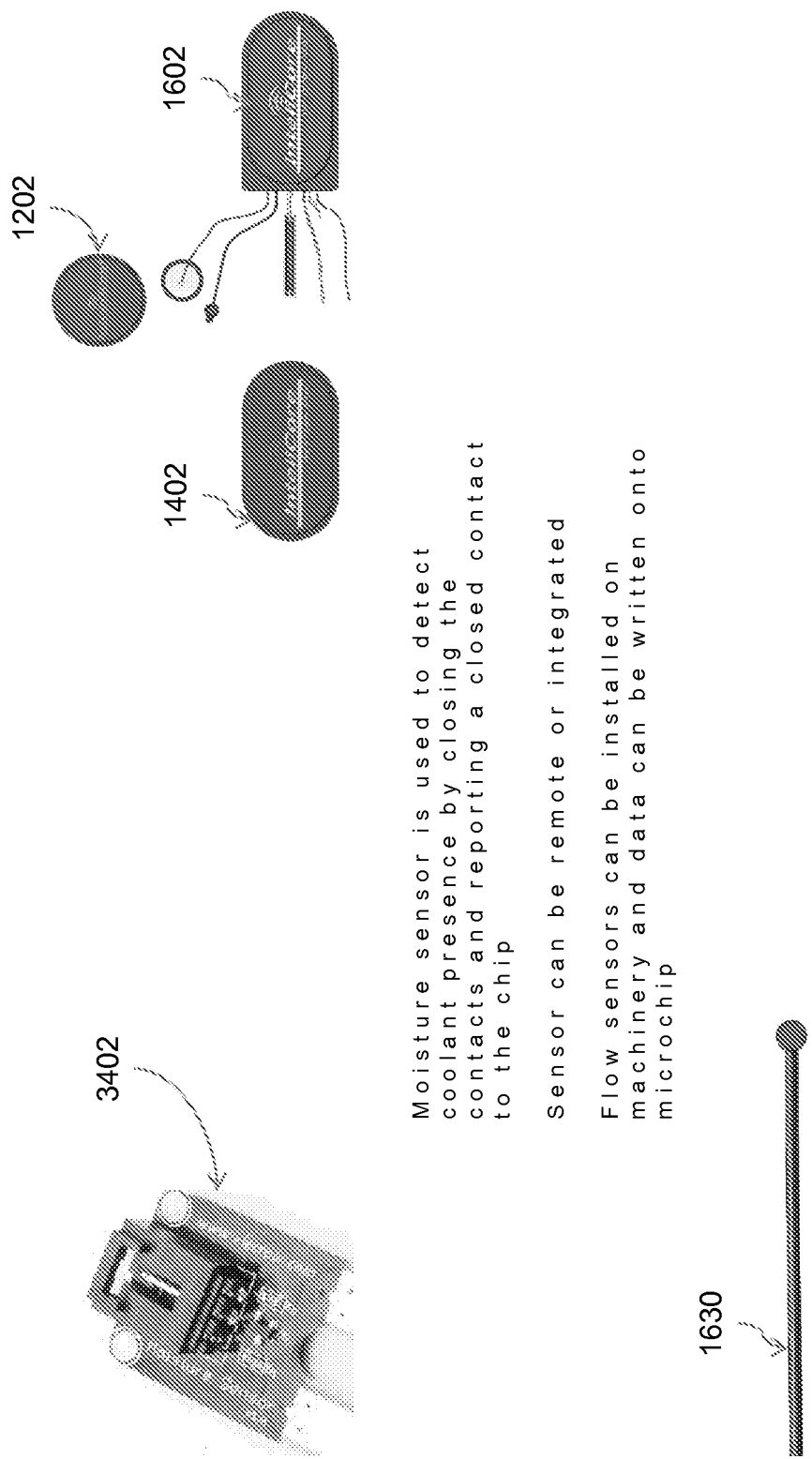
FIG. 34 includes a partial isometric view of a data component in the form of a data sensor, for example a moisture sensor, a detail plan view of such a motion sensor and plan views of exemplary data components on which such a data sensor can be included.

In another example of a sensor for use as a remote or external sensor with a microchip package, for example a Type 3 microchip package, a flow sensor 3402 may be used to detect the presence of moisture (FIG. 34). In one form of flow sensor such as 3402, contacts in the sensor close when moisture is sensed, and the closed contacts can be communicated to a processor on the microchip package and recorded or communicated for action, for example analysis, automatic shutdown, or other functions for the tool or for data analysis. Such a moisture sensor can also be placed in a microchip package as an internal or integrated sensor, for example with a Type 2 microchip package.

Figure 35:
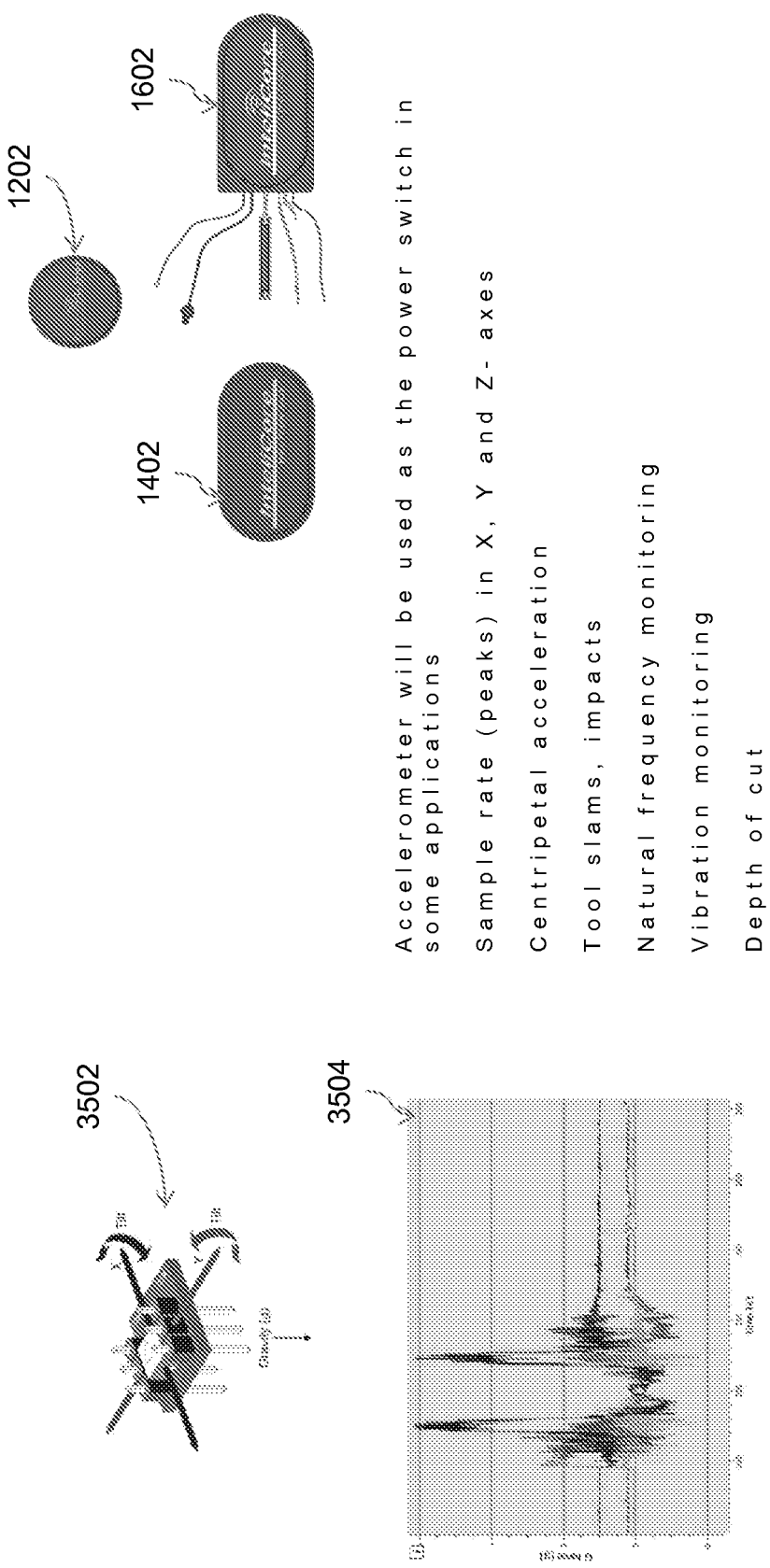
FIG. 35 includes a schematic isometric view of a data sensor, in the form of an accelerometer, and a schematic representation of possible responses of such an accelerometer, and exemplary data components on which an accelerometer can be used, for example with the apparatus and methods described herein.

In another example of a sensor for use as an internal or as an external or remote center with a microchip package (FIG. 35), and accelerometer 3502 maybe placed on board and coupled to an electronic circuit in a microchip package, or may be coupled through a lead (not shown) external of a microchip package to a connector on an electronic component inside a microchip package. An accelerometer can be used as a motion detector to turn on and off the processor or other circuit components in the microchip package. Additionally, or alternatively, the accelerometer can be used to record impacts and other loading, which can indicate tool slams, changes in the characteristics of the workpieces, and the like. An accelerometer can also be used to monitor the operation of a tool, for example to detect operation at natural frequencies of the tool, for example as illustrated in a recording such as 3504, and/or to monitor and record tool vibration. An accelerometer may also be used as an indication of position, for example for indicating depth of cut. An accelerometer can indicate tilt, yaw and rotation, which data can be recorded and independently analyzed for tool operation, characteristics of the workpieces, variations in machine operation, and the like.

Figure 36:
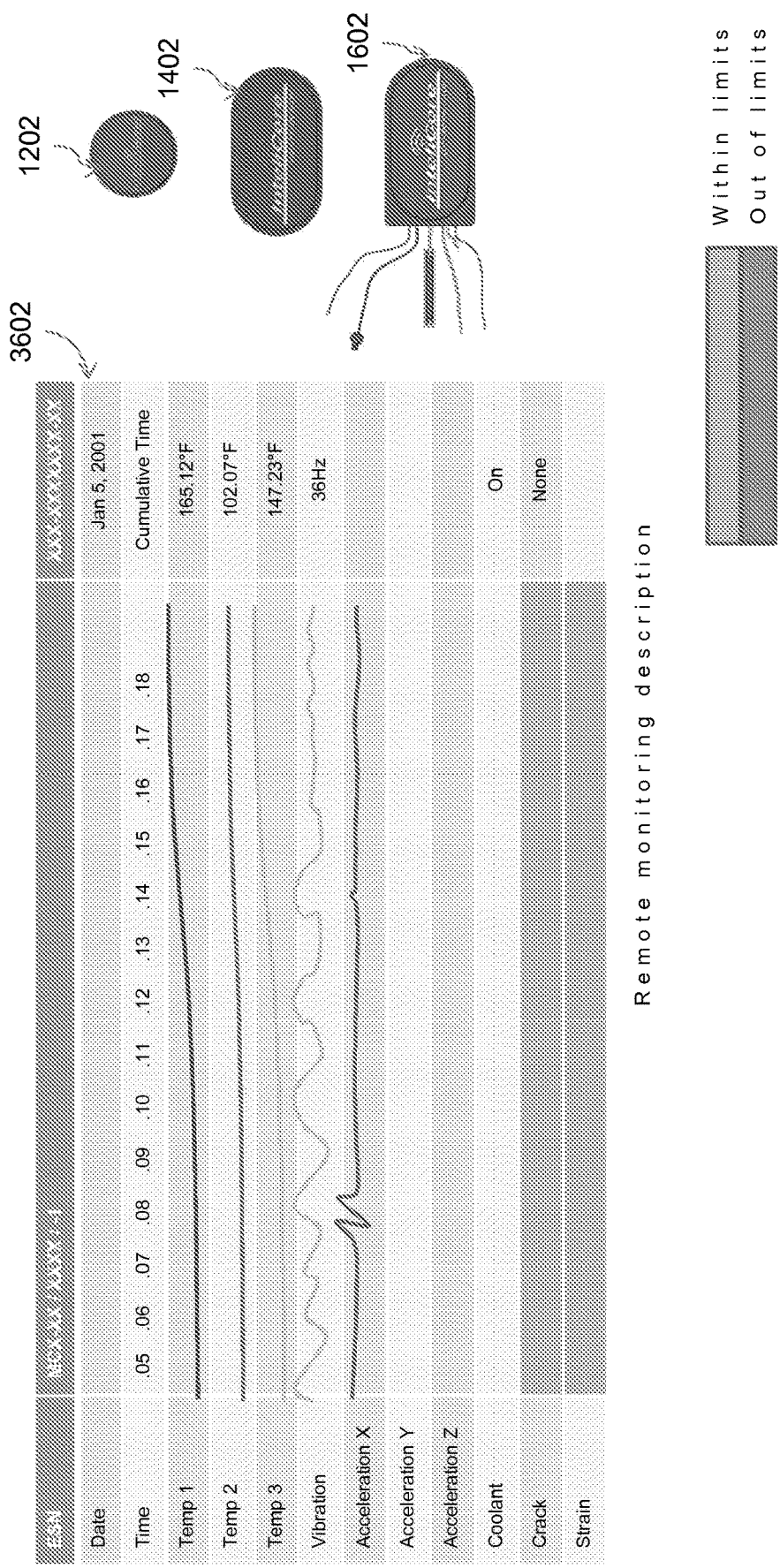
FIG. 36 is a schematic representation of a plurality of functions, any one or more of which can be incorporated into a data component, and plan views of exemplary data components that can include such functionalities, and can be used with apparatus and methods described herein.
Figure 37:
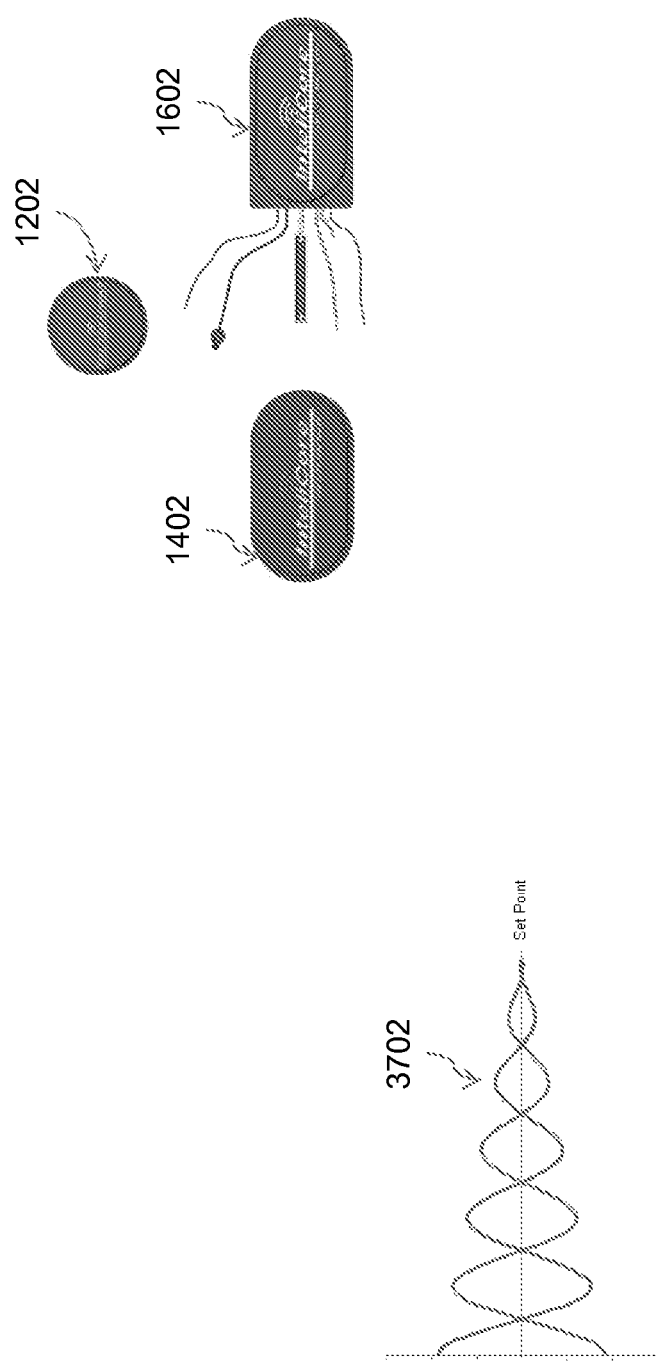
FIG. 37 is a schematic representation of a functionality of one or more data components that can be used with apparatus and methods described herein, and also including plan views of exemplary data components that can incorporate such functionalities.

Data collected from one or more sensors coupled in or to microchip packages can be used to monitor and analyze tool and machine operation as a function of a number of parameters, including geographic location, time and duration of operation, tool and machine properties, workpiece characteristics, etc. (FIG. 36). Such information can be illustrated in a number of forms, including graphically such as represented at 3602, which can allow a user, owner, manufacturer, or other interested party to evaluate tools, machines, and operations. Remote monitoring may be carried out with various devices, for example Intelimodules, remote data collection equipment, monitors, etc. Such monitoring operations can also be used to provide real-time feedback to machines, such as through Intelimodules, to adjust operation real-time, including even stopping operation. Monitoring and evaluation of data can also be used to provide feedback and controls to machines to optimize machine operation and use of a tool or tools. For example, data can be received, analyzed and used to calculate adjustments in one or more operating parameters to optimize machine and tool operation. Such analysis and feedback can be carried out over time, for example iteratively, as one or more sensed parameters can be gradually adjusted to desired values, such as a set point, revised operating parameter, or the like, as illustrated at 3702 (FIG. 37). Therefore, collected information can be used and/or analyzed to determine appropriate feedback to the tool and/or a machine operating the tool so as to bring the tool into a desired operating configuration.

Figure 38:
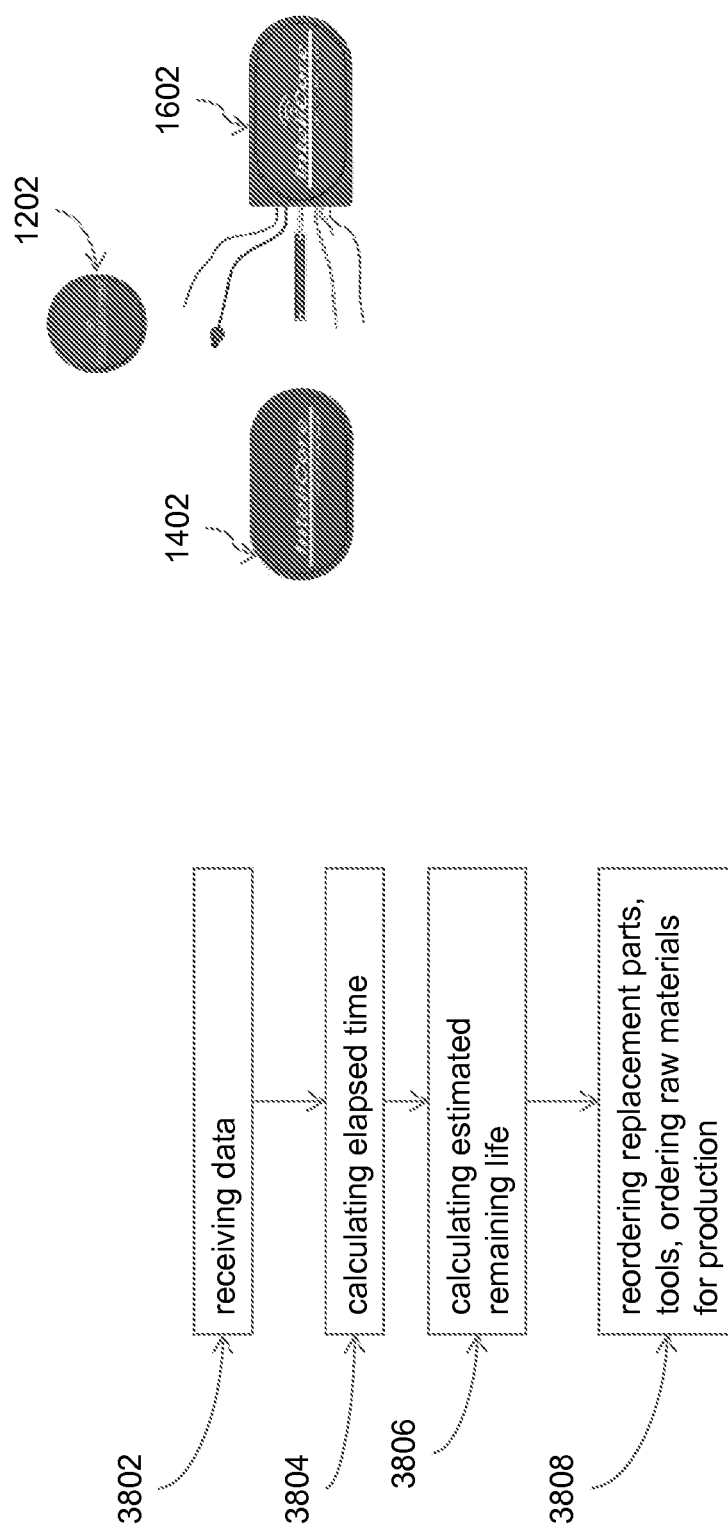
FIG. 38 is a schematic representation of functionalities of one or more data components that can be used with apparatus and methods described herein, and also including plan views of exemplary data components that can incorporate such functionalities.

FIG. 38 illustrates an example of action that can be taken based on data from a microchip package, for example receiving data 3802, calculating elapsed time 3804, and calculating estimated remaining life 3806, and reordering 3808 replacement parts, tools, ordering raw materials for production, or the like, if such data calculations indicate the tool is within a determined or selected time/operation window. The tool and or the operating machine can send a signal to the end user, to a company purchasing department, or to a supplier to re-order itself, or similar action. The data can also be used for other purposes.

FIG. 39 illustrates a further example of other uses for data obtained from one or more microchips. The data can indicate unauthorized use, for example outside normal business hours, outside acceptable geographic areas, etc. The data can also be used to take affirmative actions, such as automatically locking machines or disabling tools 3902.

Figure 40:
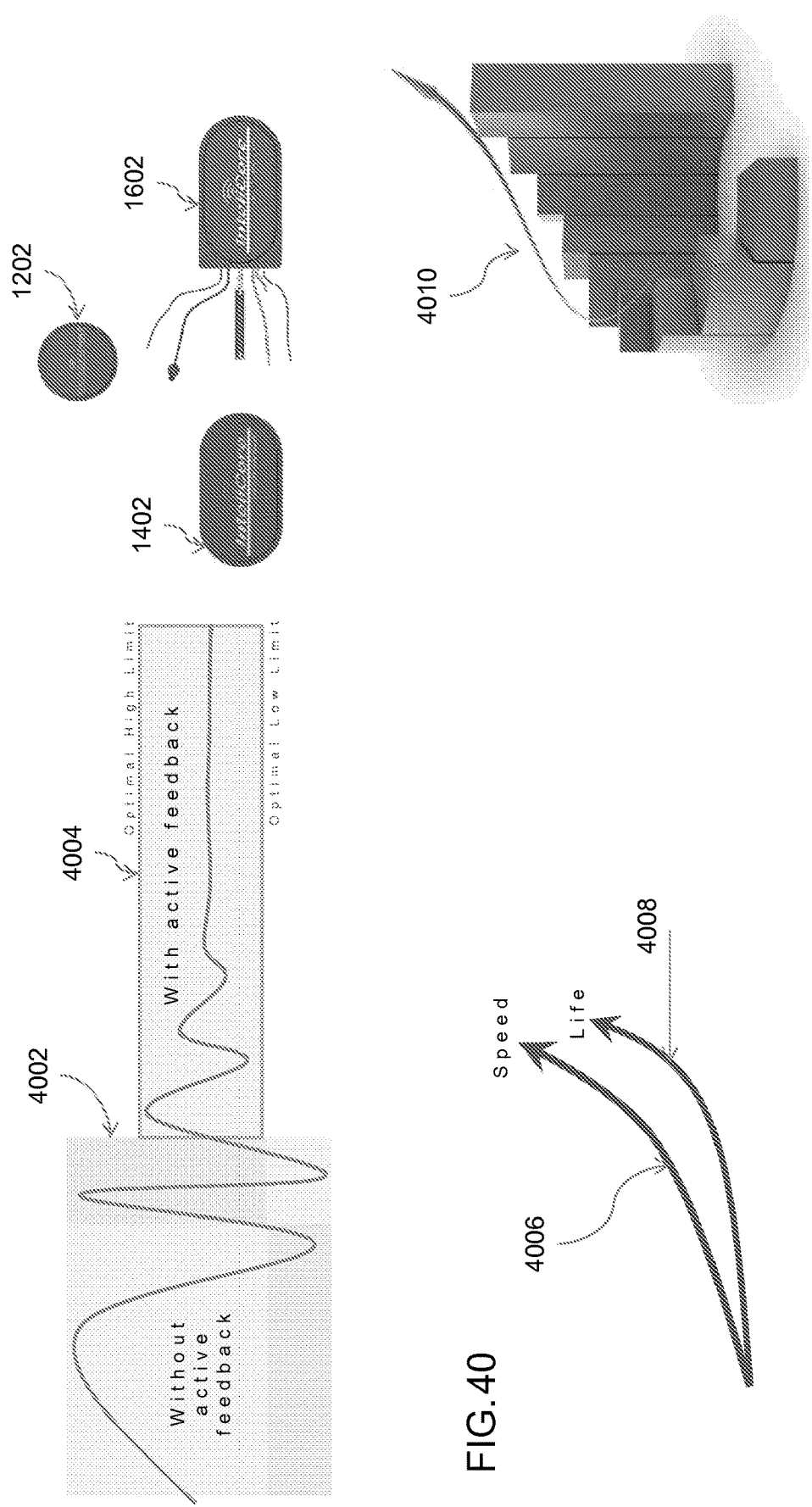
FIG. 40 includes schematic representations of functionalities and results that can be achieved with data components having one or more characteristics as described herein, and also including plan views of exemplary data components.

FIG. 40 graphically illustrates the benefits of obtaining data and providing feedback to optimize operation, and thereby improve performance. For example, without active feedback 4002, the machine and therefore a tool operated by the machine can swing widely in one or more of its operating parameters, for example tool speed, machine feed rate, and the like, whereas with active feedback 4004, the machine can operate the tool so that it operates within optimal limits. In some circumstances, the tool can be operated at a higher speed 4006, such as where increased coolant is applied to lower operating temperature, and in many situations tool lifetime 4008 can be increased.

Figure 41:
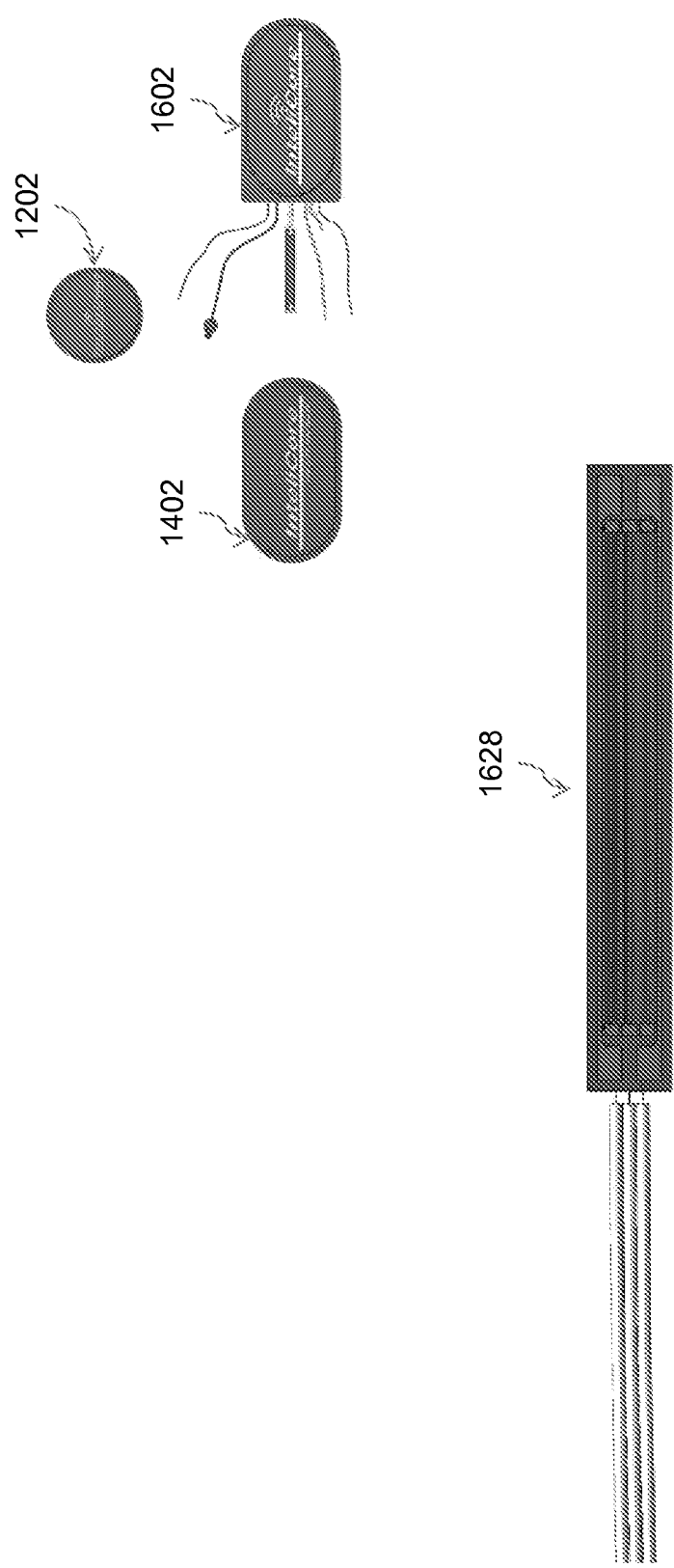
FIG. 41 is a plan view of part of a data collection component, in the present example a strain/fatigue gauge or sensor, and also showing plan views of exemplary data components at least one of which can include such a sensor.

FIG. 41 provides an illustration of a strain/fatigue external sensor that can be used with a tool, for example as implemented in a Type 3 microchip package, and that can be used to provide data in conjunction with one or more other types of microchips. Strain data can be used to record information about operation of the tool, and in some instances can be used to indicate structural fatigue, fracture, or the like, which can be used to provide feedback to the machine, for example to stop operation.

Figure 42:
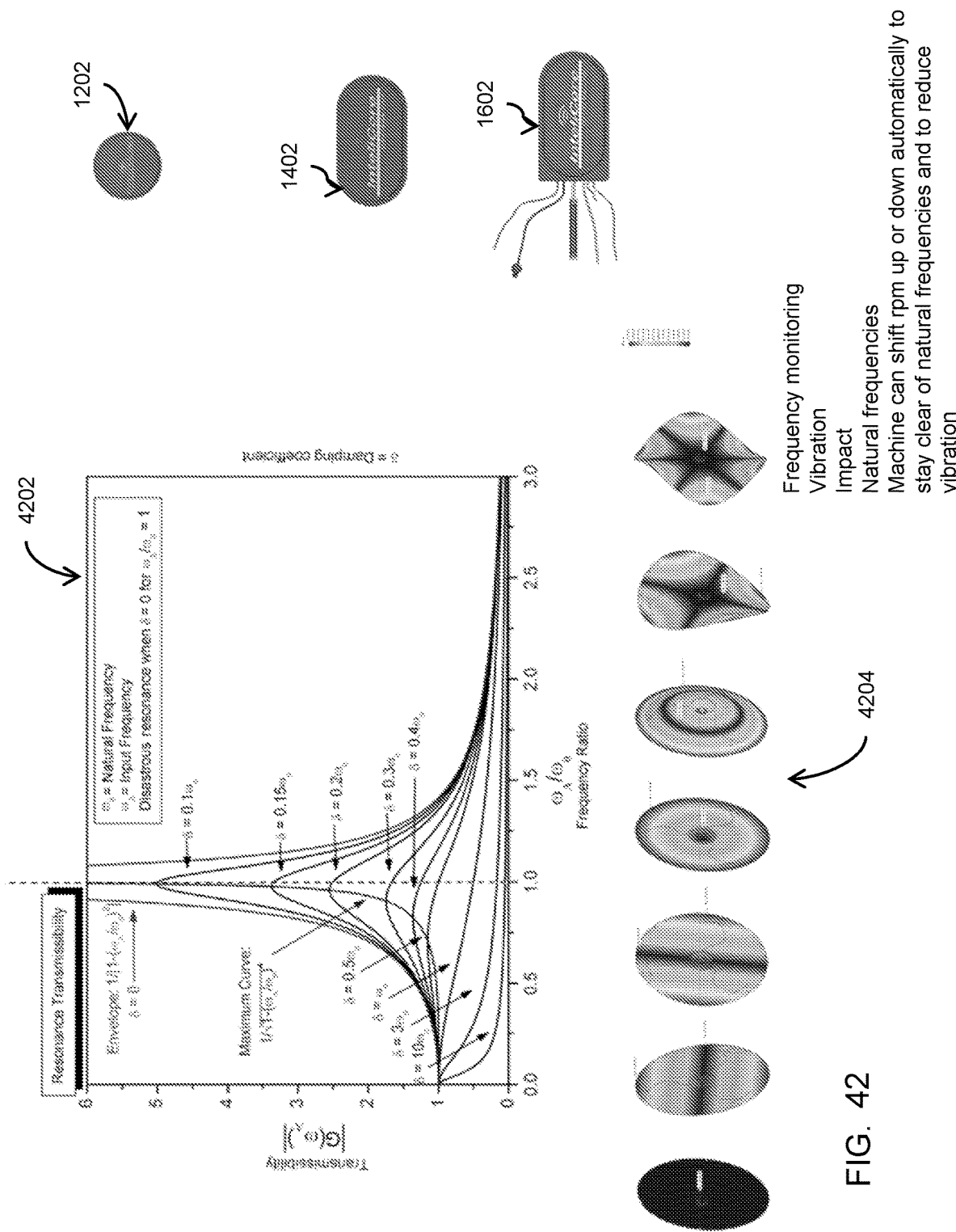
FIG. 42 includes schematic representations of functionalities and information that can be derived with such functionalities incorporated into data components as described herein, and also showing plan views of exemplary data components which can incorporate such functionalities.

FIG. 42 illustrates an example of the benefits of frequency monitoring 4202, such as by an accelerometer, or other sensors. Such information can be used for various purposes, including, for example, feedback to a machine for changing one or more operating parameters. Such information can also be used to map stresses in the tool, such as indicated at 4204, for optimizing tool operation, changing tool design, and the like.

Figure 43:
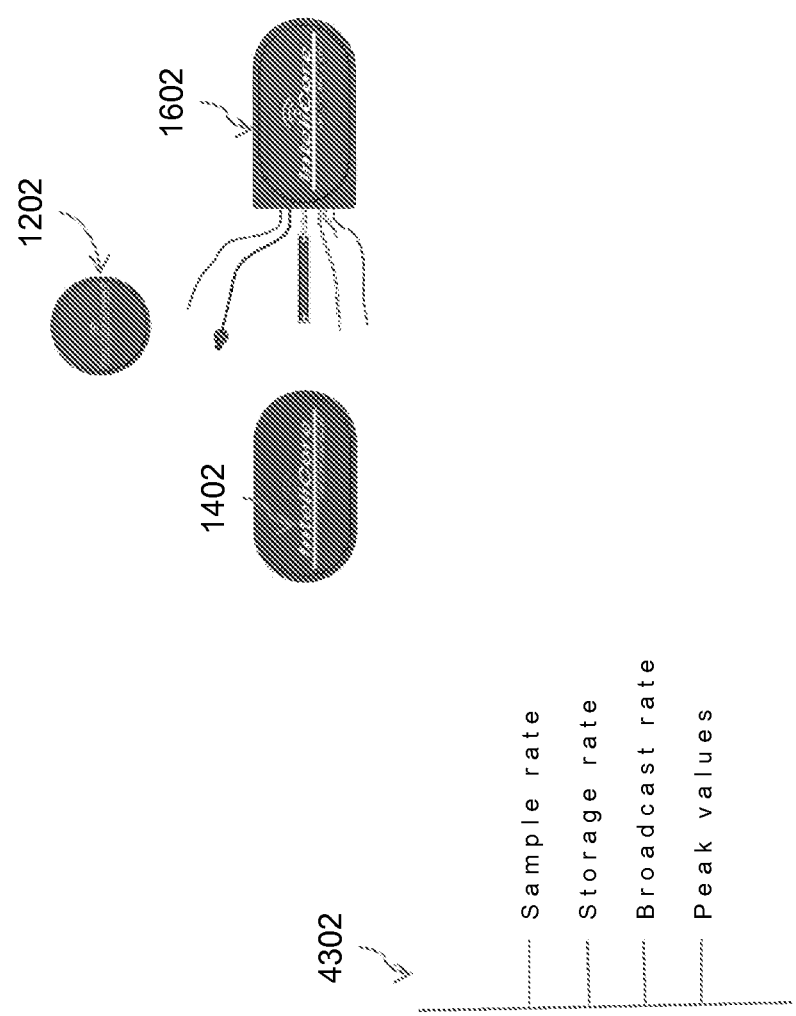
FIG. 43 is a schematic representation of possible operating characteristics of a data component such as those described herein, and also showing plan views of exemplary data components that can incorporate one or more of such possible operating characteristics.

FIG. 43 illustrates some of the design considerations for one or more microchips. For example, microprocessors can be programmed or otherwise instructed 4302 to sample onboard and external sensors at a specified sample rate, stored data at a specified storage rate, and to communicate data at a specified broadcast rate or frequency, for example to optimize power usage and maintain battery life. Rates can also be adjusted as a function of time of operation, availability of communications equipment, and the like.

Figure 44:
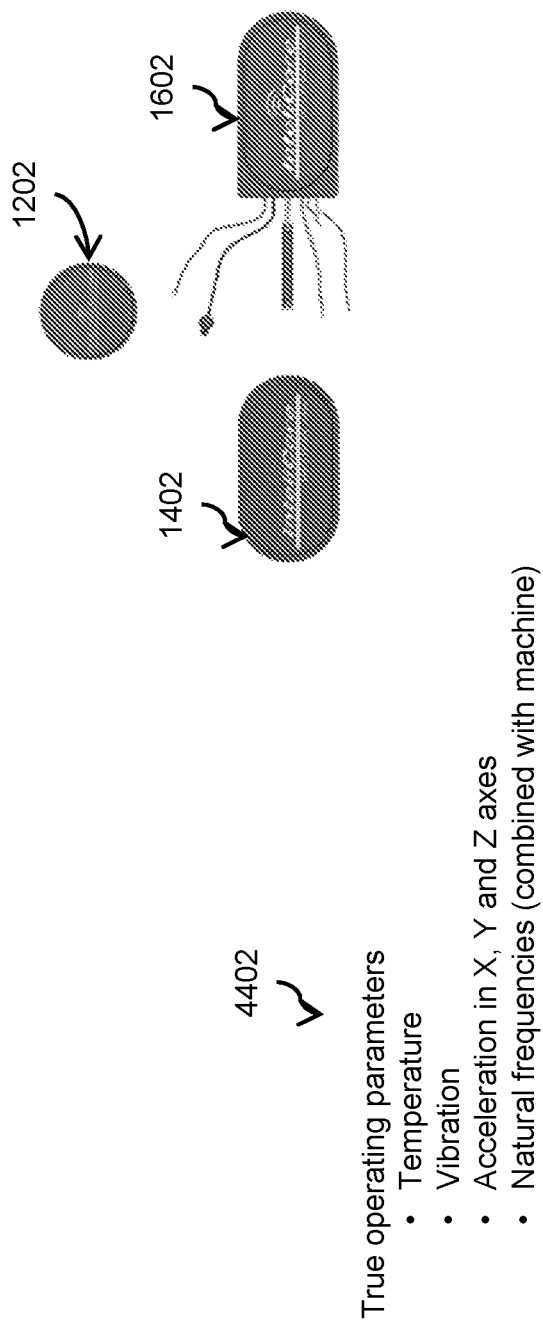
FIG. 44 is a schematic representation of parameters and data collection that can be monitored using data components such as those described herein in conjunction with apparatus and methods described herein, and also showing plan views of exemplary data components that can incorporate monitoring of such parameters and data collection.

FIG. 44 provides an example of uses 4402 of data collected by one or more microchips. Such data can be used by an original equipment manufacturer, a leasing company, a contractor, a monitoring agency or other interested parties, for example for tool and machine design and manufacturing, operating characteristics, and the like.

Figure 45:
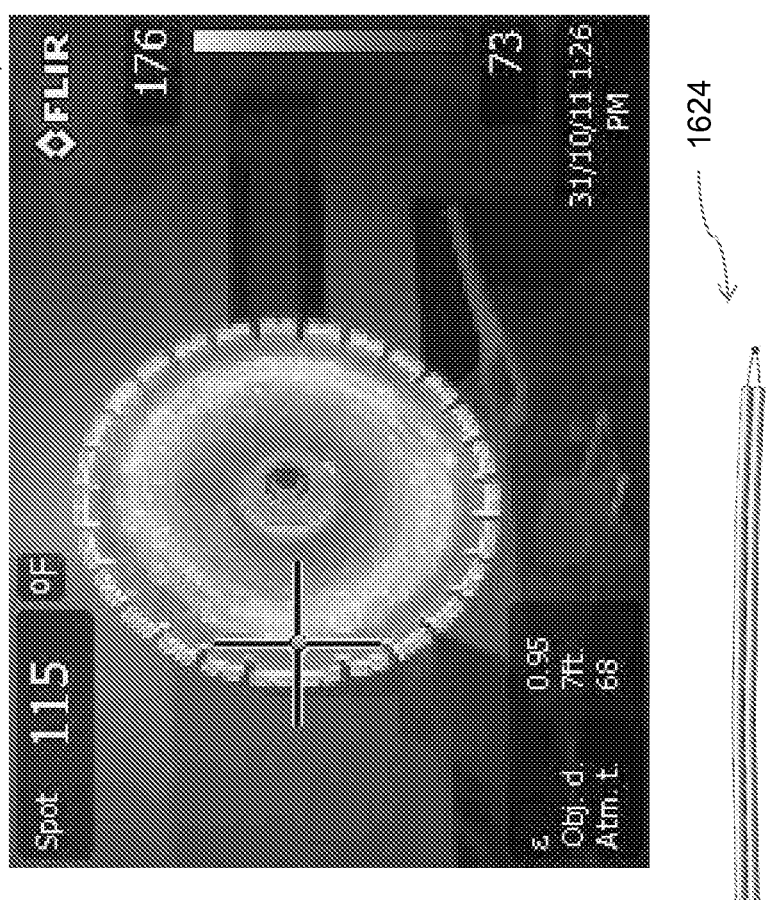
FIG. 45 shows a plan view of a part of a data collection device in the form of a temperature sensor, for example a thermocouple, and including a schematic representation of data that can be collected, stored and made accessible using such a data collection device and a data component such as those described herein.

FIG. 45 illustrates examples of uses and benefits of obtaining temperature measurements during operation of a tool. Temperature data can be presented graphically or pictorially 4502, for example to provide visual indications of areas of where, excessive fatigue, and the like. Relevant data not only includes real-time data, but also data as a function of location on a tool, for example a peripheral edge of the tool, a medial section of a core, temperature of a flange or shaft, or other areas of the tool or machine. Relevant accumulated data can also include maximum temperatures over time and minimum temperatures over time. Such information can be used to provide feedback to a machine, for example to increase coolant, or decrease speed, or take other action. Such data can be used by a machine for feedback to adjust operating parameters, and/or by interested parties for monitoring performance, operation, and/or planning, and/or for research and development.

FIG. 46 describes example characteristics of a microchip assembly with other components to form an Intelimodule, and an external device that can be incorporated into a machine for controlling the machine based on data from a tool and/or data from sensors on the machine. The Intelimodule can be a separate device electronically or otherwise coupled to the machine for assisting in the control of the machine, or can be incorporated into the machine itself. Such a module 4602 may interface a machine and a tool, the tool can send data to the machine, and vice versa, and the data can be processed by the module and commands sent to the machine for changing a parameter, such as an operating parameter, (in some examples speed, depth, etc.), applying coolant, increasing or decreasing or otherwise changing data collection, etc. An example of such a module is represented and discussed in conjunction with FIGS. 3A-3C. In one example, a module includes a microprocessor with appropriate storage for software and data, and a communications circuit for communicating with a tool on the machine, and possibly with any of the devices described with respect to FIG. 10. The user interface can also be included, but can be omitted where the module automatically sends signals to the machine or components of the machine based on data received and any pre-existing data, such as thresholds, limits, and the like. The module also includes an interface with machine controls, either hardwired or wirelessly. The interface can be coupled directly to a machine control, which is then used to control components of the machine, or the interface can be coupled to individual components for direct control from the module, bypassing any machine control. The module can also receive data from components in the machine, for example sensors, drive components and other operating components of the machine, either directly from the components or through a machine interface. This machine data can also be used by the module to control one or more aspects of the machine.

Figure 47:
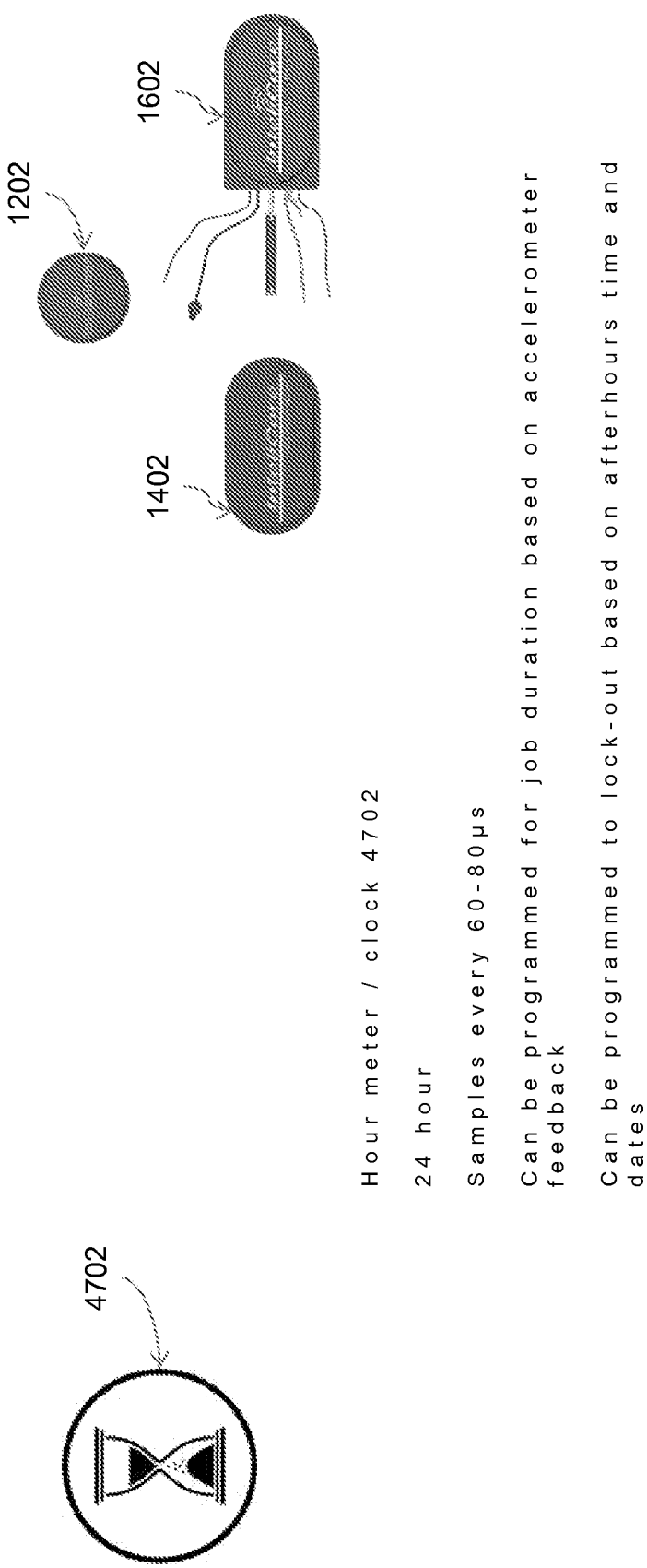
FIG. 47 is a schematic representation of an additional functionality of one or more of the data components described herein, for example a clock or timing function, and also illustrating plan views of data components that can be used with apparatus and methods described herein and that can incorporate such additional functionality.

Any of the microchip packages described herein having sensors, or processing or communications capabilities, will include a clock function 4702 (FIG. 47) for proper operation, and also for recording data as a function of time, which can then be used for feedback, data analysis, and research and development. In one example, a processor samples data every 60-80 μs, and the processor can be programmed to evaluate job duration and respond based on accelerometer feedback. A processor can also be programmed to operate during certain times, for example normal business hours, and to lockout operation at other times.

Figure 48:
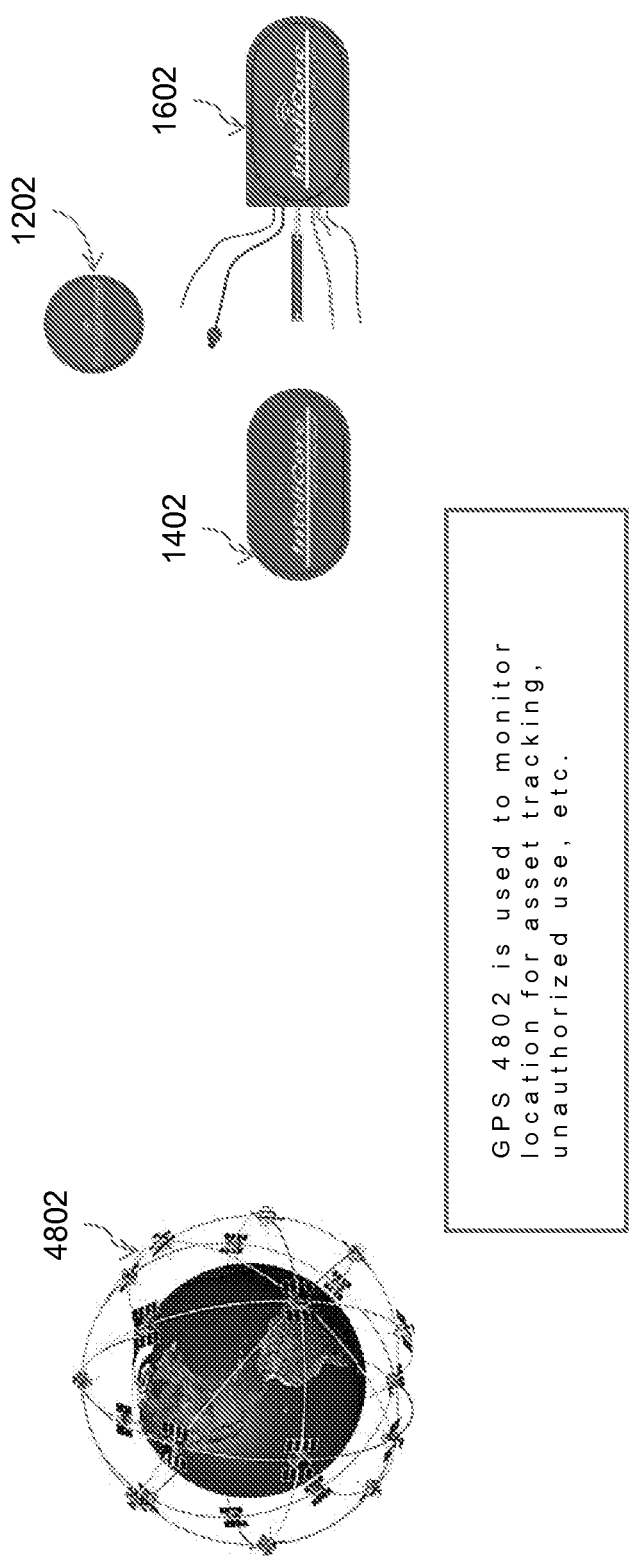
FIG. 48 is a schematic representation of a further additional functionality of one or more of the data components described herein, for example a positioning system, that can be incorporated into one or more data components described herein, and that can be used with the apparatus and methods described herein.
Figure 49:
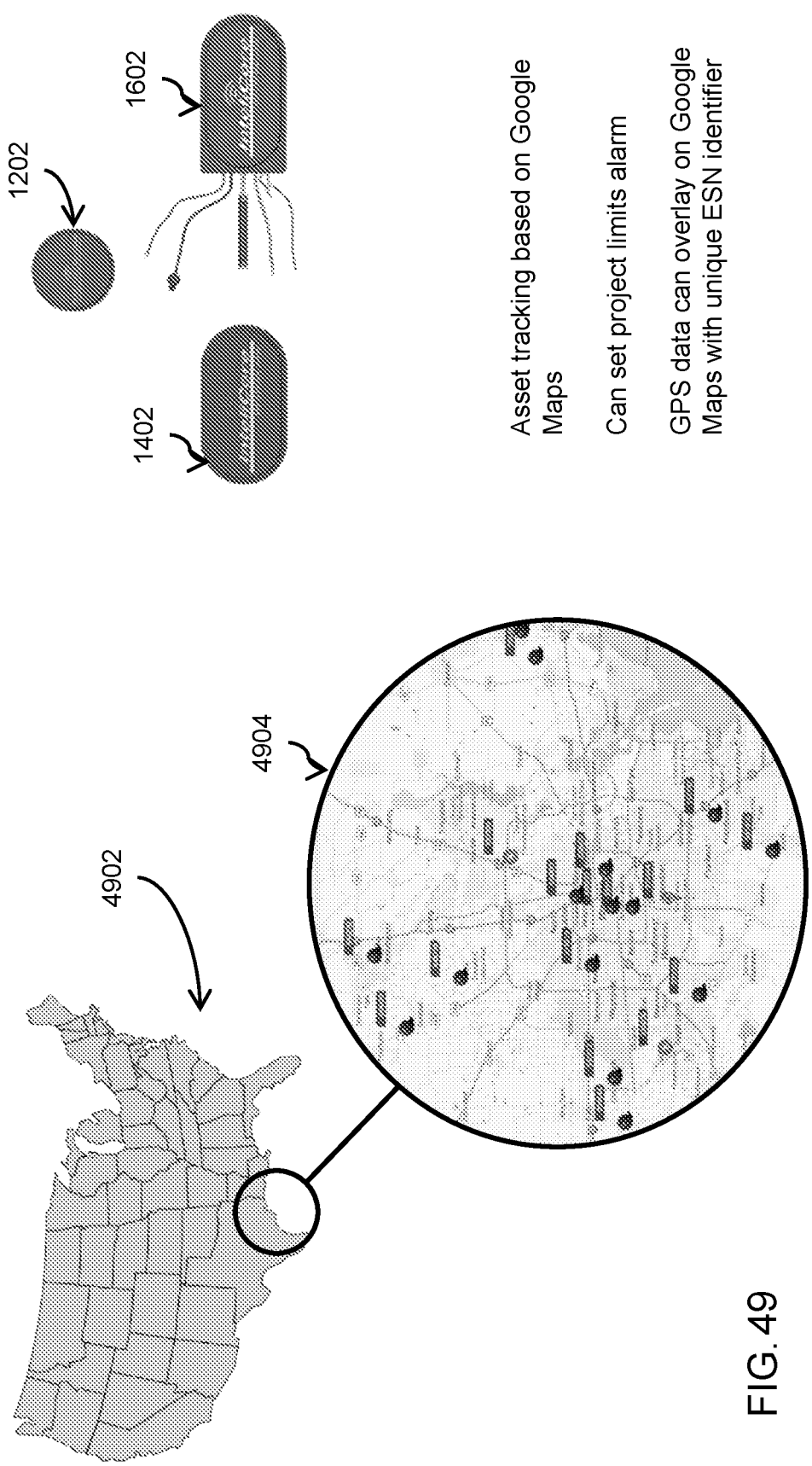
FIG. 49 is a schematic representation of functionality that can be incorporated into one or more data components and apparatus and methods such as those described herein, along with plan views of exemplary data components that can incorporate such functionalities.

A global positioning system 4802 (FIG. 48) can be beneficially used for asset tracking, data analysis, research and development for operations as a function of characteristics of the workpieces, such as different aggregates in concrete, different characteristics of wood, and the like, for example as a function of region 4902 (FIG. 49). GPS data can also be used for tracking locations of assets 4904 such as the tools, monitoring or taking action based on attempted used in unauthorized areas, and the like.

Figure 50:
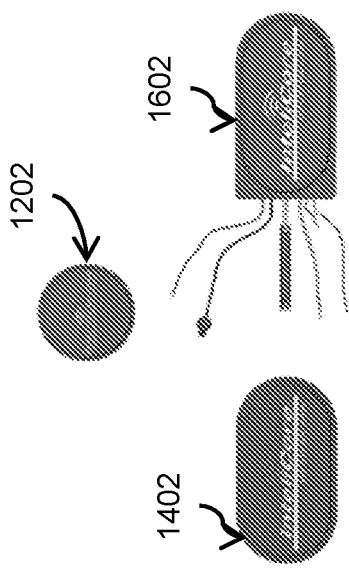
FIG. 50 is a schematic representation of functionality that can be incorporated into one or more data components and apparatus and methods such as those described herein, for example automated tool control, along with plan views of exemplary data components that can incorporate such functionalities.

FIG. 50 provides examples of the benefits of using an Intelimodule, for example a microchip package combined with other electronics for receiving and analyzing data and providing feedback, for example to a tool, machine, operator or other interested party.

FIG. 51 identifies an example of performance monitoring, such as may be used to confirm or otherwise identify issues, such as whether or not a tool is meeting performance guarantees or requirements, and whether or not a tool is subjected to usage adversely affecting performance.

Figure 52:
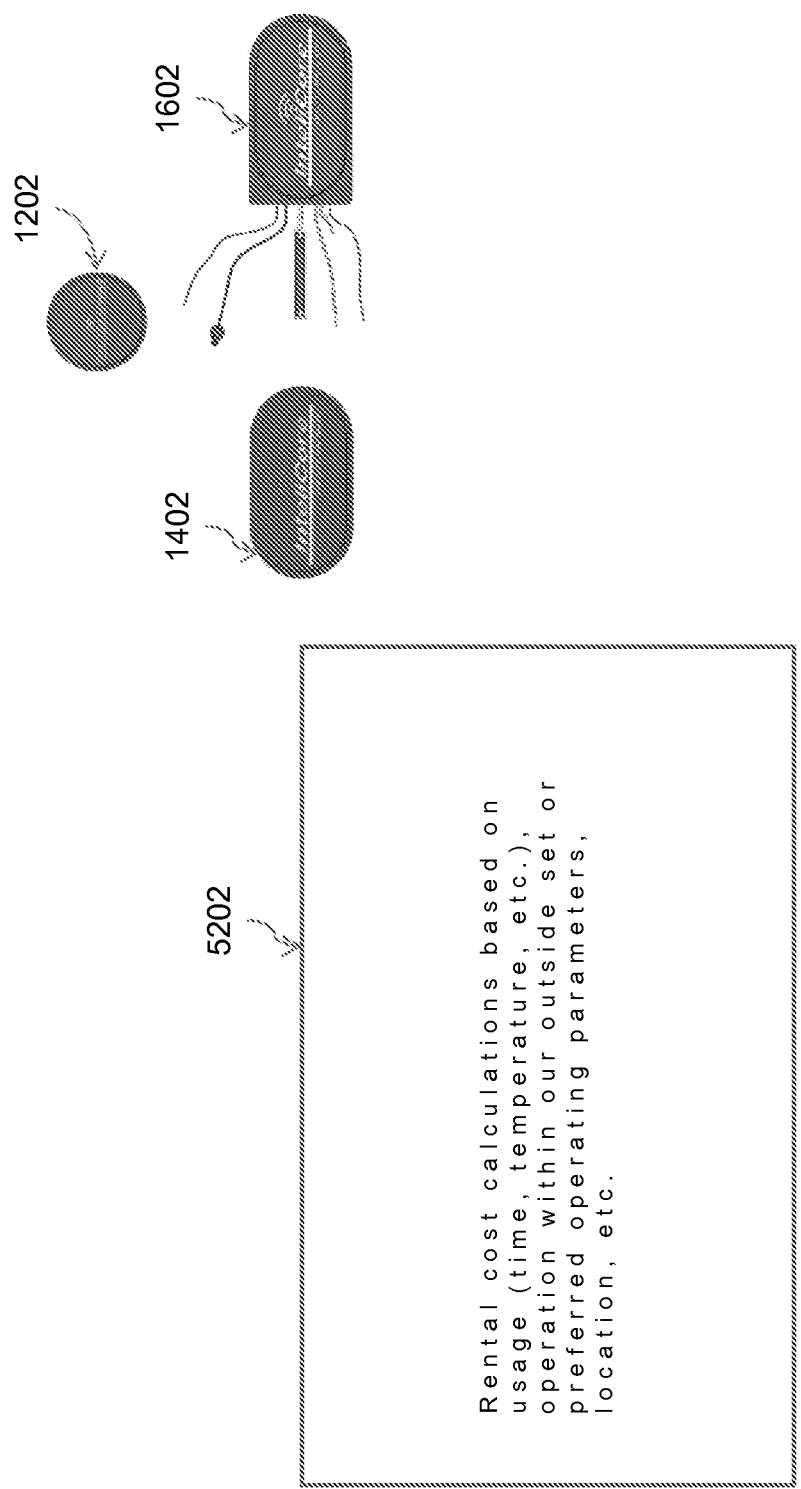
FIG. 52 is a schematic representation of an additional functionality that can be incorporated into one or more data components and apparatus and methods such as those described herein, for example usage monitoring and costing, along with plan views of exemplary data components that can incorporate such functionalities.

FIG. 52 provides another example of the use of collected data from one or more microchip packages on a tool or equipment associated with operating a tool.

Figure 53:
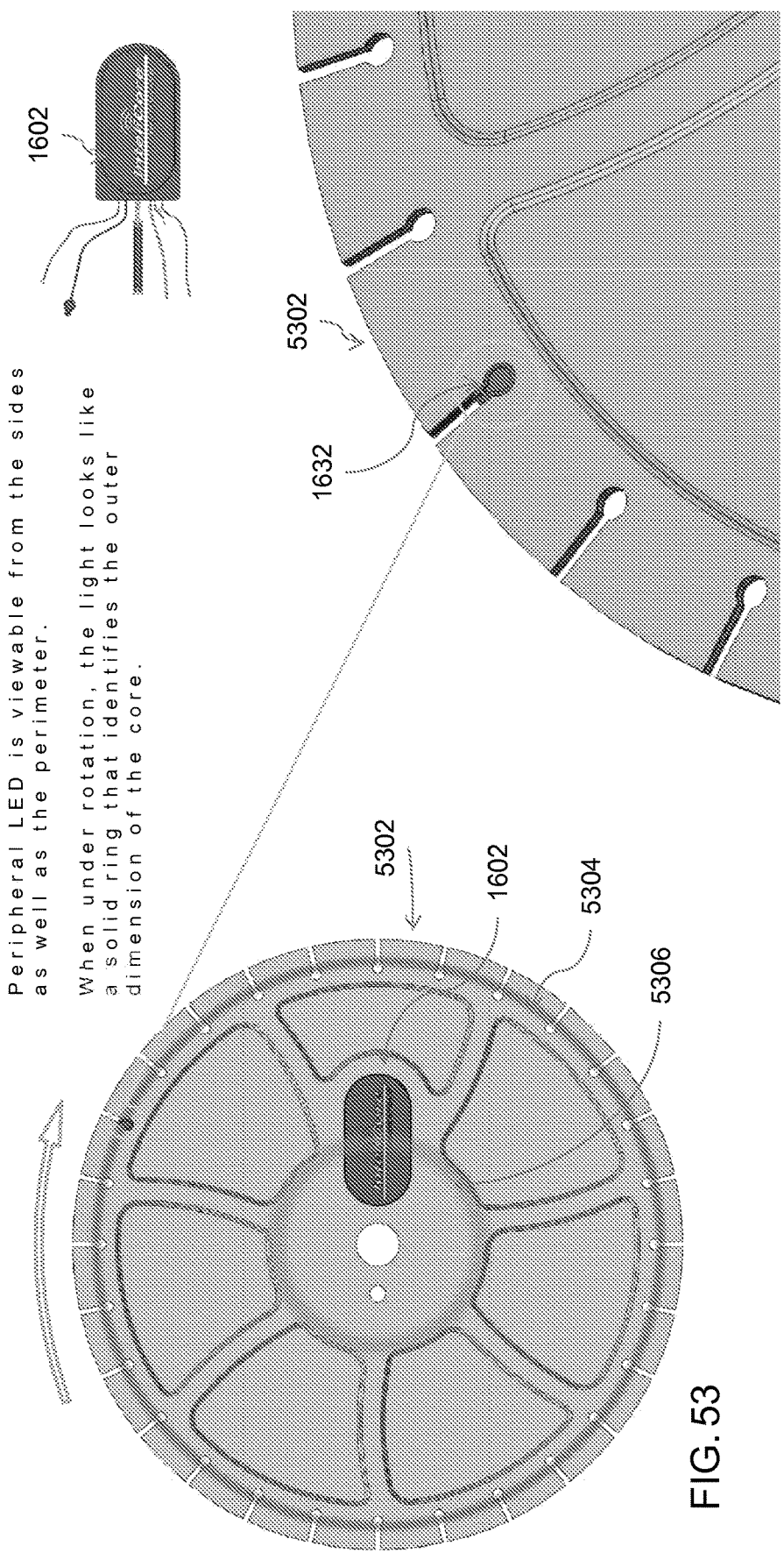
FIG. 53 includes a plan view and a detailed isometric view of an exemplary tool and a schematic representation of a functionality and component that can be incorporated into such a tool, along with a plan view of a data component that can be incorporated into a tool such as those described herein, incorporating in the present example a peripheral LED.

FIG. 53 illustrates an example of use of one or more indicators that can be observed by an operator or others during operation of a tool.

Figure 54:
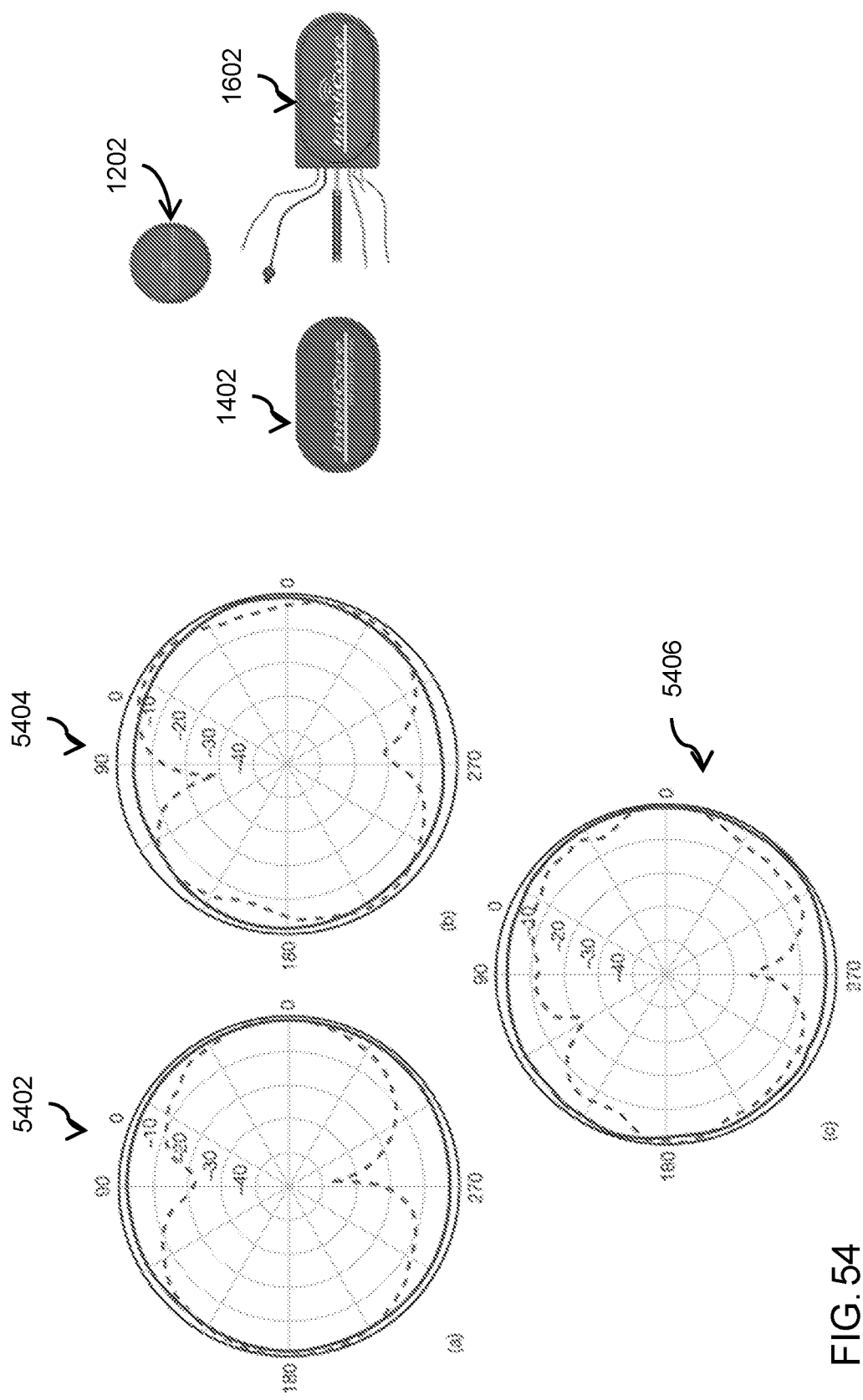
FIG. 54 is a schematic representation of possible antenna characteristics, and plan views of data components that can incorporate such possible antenna characteristics for use with apparatus and methods as described herein.

FIG. 54 illustrates possible antenna designs.

Figure 55:
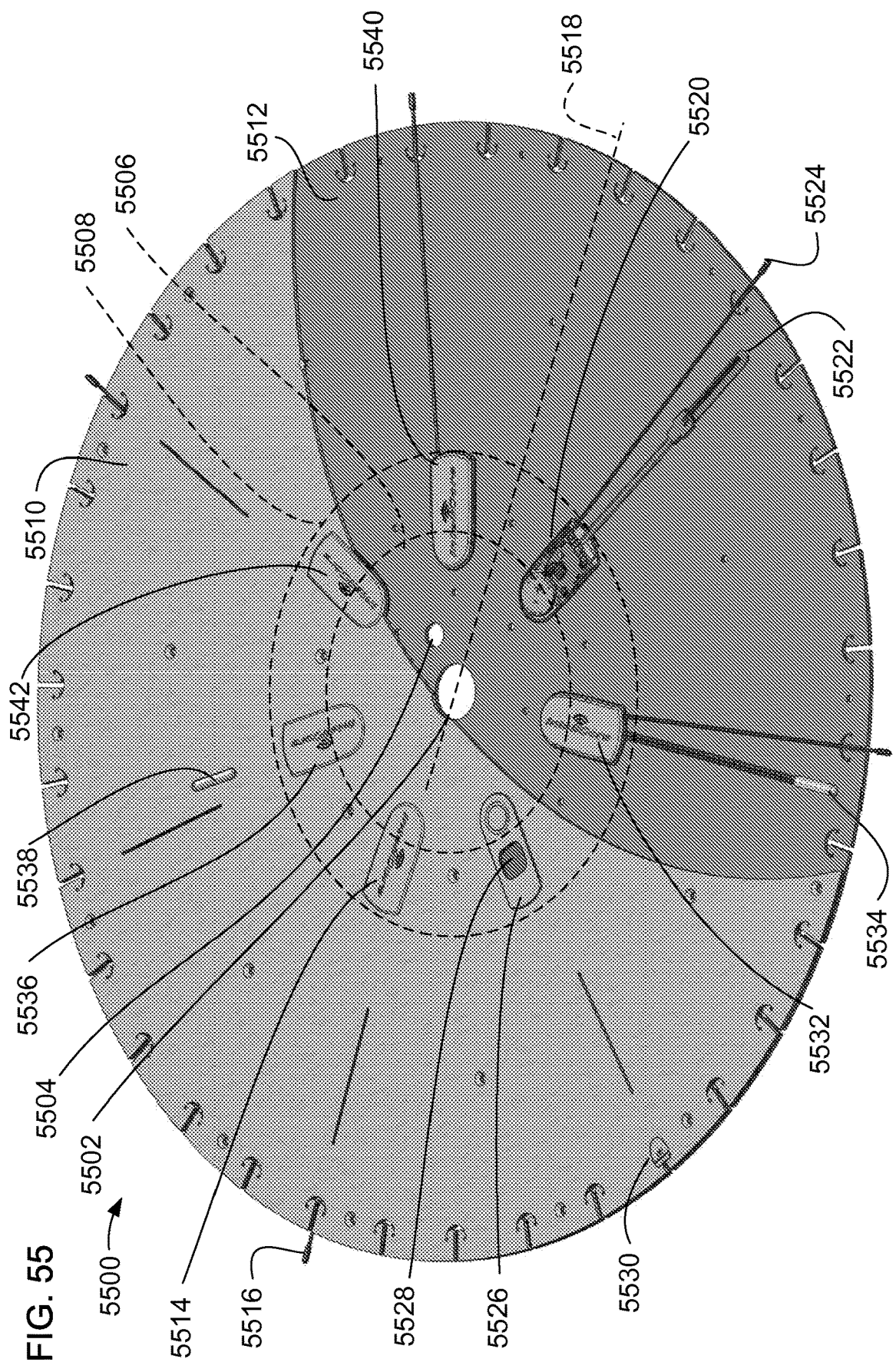

Another example of a tool and microchip assembly is shown in FIG. 55. In the illustrated example, the tool is a saw blade core for which cutting elements would be attached to the perimeter, but it should be understood that the microchip assemblies illustrated in the example of FIG. 55 are applicable to other tools, including the drill, guide bar, grinding and grooving cores and other tools described herein when wearing elements such as segments or cutting tips or chain or the like are added, and can be used to achieve the same or similar functions and results as they would when used on a blade core such as that shown in FIG. 55. In the present example, a saw blade core 5500 includes an arbor hole 5502 for receiving an arbor or drive shaft of a machine on which the blade is to be mounted and operated. A drive hole 5504 is offset from the arbor hole and receives a drive pin of the machine. Once fully assembled, the blade is mounted on the machine, for example a flat saw, wall saw, handsaw, or in the case of other circular disc tools such as grinding wheels, carbide blade, etc., for example a grinder and groover, wood saw, or the like. The disc is supported and secured by a blade flange or other stabilizing or securing structure, and in the example of a diamond blade, the blade is secured on the arbor by blade flanges on each side of the blade. In one example, the blade flange (not shown) can extend to an outer blade flange perimeter represented at 5506 (FIG. 55), in which case one or more microchip packages are partially covered by the blade flange and partially exposed. In another example, the blade flange can extend to a perimeter 5508 that completely covers the microchip packages. With a larger perimeter 5508, one or more microchip packages may be Type 1 and/or 2, and read or scanned prior to or after being covered by the blade flange, or one or more microchip packages may be Type 3, and include external antennas and/or external sensors, including any of those described herein.

In the present example, the blade 5500 is a laminar blade with a first layer 5510 and an opposite second layer 5512 adhesively bonded together. In the present example, the first and second layers are substantially mirror images of each other. The present illustration shows rivet holes for securing the layers together, if desired, or other fastener configurations can be used, but fastener hardware can also be omitted in favor of adhesive or other bonding configuration.

In one configuration of the blade assembly 5500 in FIG. 55, the blade assembly can include a single microchip package 5514. The microchip package 5514 may be a Type 1 microchip package, but it is understood that the tool core and single microchip package assembly may be similar to the assemblies described above with respect to FIG. 1, FIGS. 23-35, or other configurations using a Type 1 microchip package.

The microchip package 5514 can have the geometry and construction illustrated in and described with respect to FIG. 13. Alternatively, the microchip package 5514, as well as any of the microchip packages described herein, can have different geometries. For example, the perimeter rim can be omitted and the perimeter profile have other configurations, for example convex, flat or concave. Additionally, the perimeter profile of any of the microchip packages as viewed in plan, for example as viewed in FIGS. 12-15, can have a discontinuous profile, for example other than straight or continuously curved, for example polygonal, sawtooth or a random perimeter profile. Also, the side surfaces of any of the microchip packages in the planar direction can be flat or non-flat, with indentations, cavities, or other discontinuities.

Figure 56:
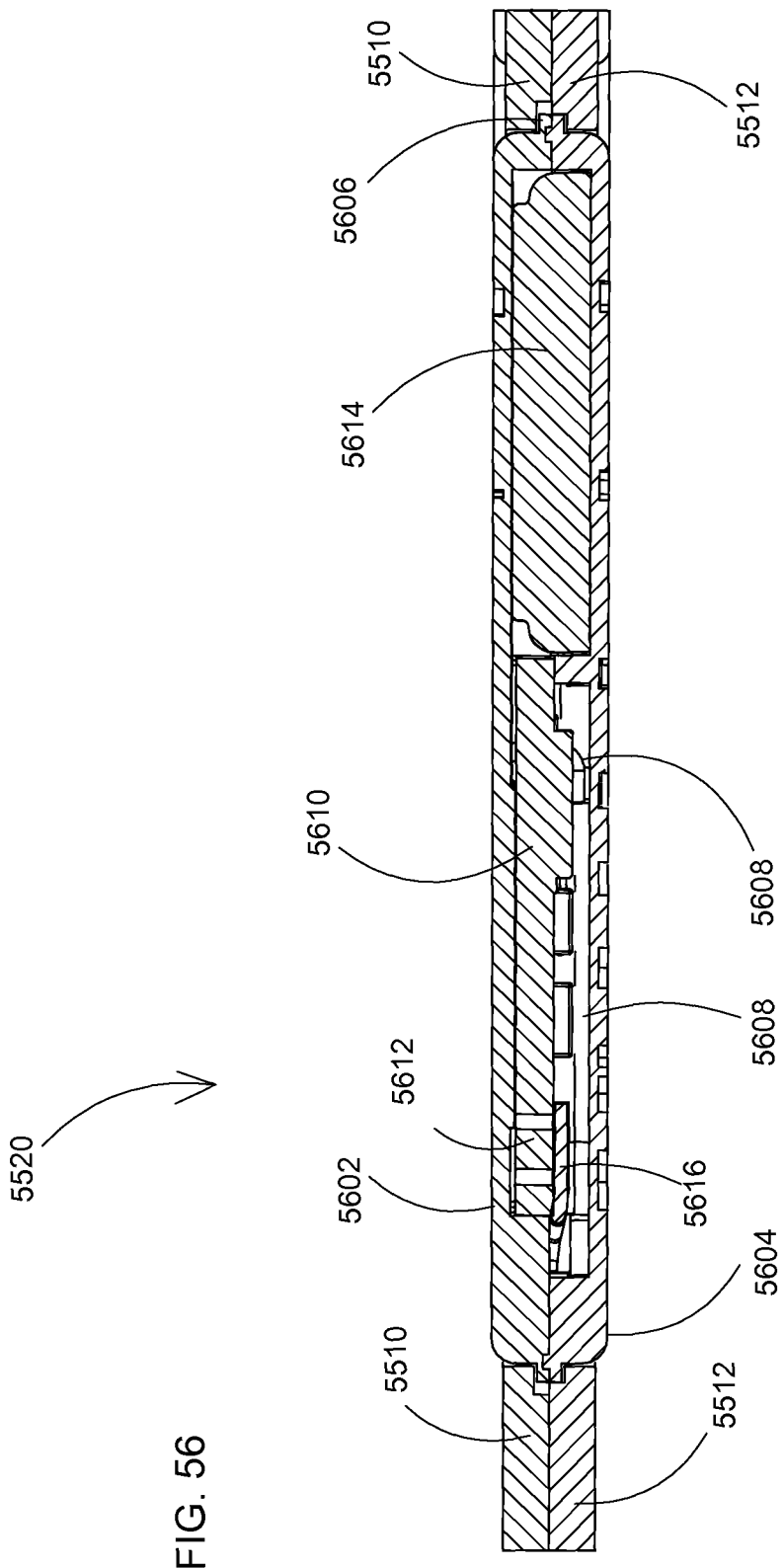
FIG. 56 is a detail and partial cross section of part of the tool of FIG. 55 showing a microchip package and installation configuration in a tool.

The microchip package 5514 can be placed on or in a tool in the desired location in a number of ways, including in the manner described with respect to the microchip package illustrated in FIG. 56.

The blade assembly 5500 can be used with blade flanges extending to a small perimeter 5506, or a larger perimeter 5508, with the understanding that reading data from the microchip package may be limited, spatially and/or temporally. In the example of a smaller blade flange conforming to the smaller perimeter 5506, data transfer is easier. For example, the microchip package 5514 can include an onboard antenna for communicating with another component, for example the machine controlling the tool, a user's electronic equipment (cell phone, tablet, computer, or other equipment suitable for reading information from the microchip package 5514), or a communications device that can send information to another device. In the example of a larger blade flange conforming to the larger perimeter 5508, data transfer for a Type 1 microchip would typically be limited both spatially and temporally. However, in the example shown in FIG. 55, the microchip package 5514 can be a Type 1 microchip package with an antenna 5516. In the present example, the antenna 5516 extends radially outward of the microchip package 5514 between the first and second layers 5510 and 5512 and into a gullet of the blade core. Alternatively, the antenna can extend less than completely to the perimeter and be exposed for transmission, for example in the gullet or other openings in the blade core. In this example, the antenna extends from a radially outward end of the microchip package 5514 and is in electrical communication with electronics in the microchip package, for example through contacts, connectors or other means.

In the present example of the assembly of the blade core and the single microchip package 5514, the blade core assembly can omit other microchip packages, but as discussed below, the assembly can include other microchip packages. In another example of the single microchip package 5514 being the only microchip package in the assembly, the microchip package 5514 can be a Type 2 microchip package. In this example, the microchip package can be the same as or similar to any of the Type 2 microchip packages described herein. Sensing and communications with the microchip package are made easier when the blade flange perimeter corresponds to a narrower perimeter such as that represented by 5506. It is preferred that any onboard antenna be sufficiently spaced from the blade flange to minimize any interference from a metal or other material of the blade flange. In one example, about half of the microchip package is positioned outboard of the blade flange, and in another example, about a half inch of microchip package is outboard of the blade flange.

In a further example of the assembly of the blade core and the single microchip package 5514 and omitting any other microchip packages, the microchip package 5514 can be a Type 3 or a combined Type 2 and Type 3 package, and the assembly can be used with either a smaller or larger blade flange. Whether the blade flange is smaller or larger will determine the communications and sensing capability limitations (for example spatially and/or temporally) of the microchip package. In a Type 3 configuration, the microchip package can have external temperature sensors such as thermocouples, strain sensor, resistance ring, or other sensor configurations. The Type 3 configuration can also have a communications antenna such as that illustrated at 5516, and one or more conductors for such functions can be packaged together or maintained separate. In a combination that includes one or more of the features described are illustrated for a Type 2 and Type 3 package, the microchip package can be the same as or similar to the Type 3 microchip package described with respect to FIG. 55, and can also include onboard sensors and/or communication. An example of an onboard sensor includes a temperature sensor for sensing the temperature in the area of the microchip package, an accelerometer, moisture sensor and the like.

Placing a microchip package on or in a tool will change the weight distribution of the tool. In a rotating body, the changed weight distribution can affect the stability of the operating tool, the tool lifetime and possibly the reliability of the tool. High-speed tools will be affected more than low-speed tools, and it is believed that microchip packages placed farther from an axis of rotation will affect the tool more than microchip packages placed closer to the axis of rotation. Weight distribution can also be affected more significantly when a microchip package is embedded in a tool compared to a surface mounted package, because some configurations of embedded microchip packages are positioned after removing material from the tool. Steps can be taken to reduce or minimize the effect of changes in weight distribution of the tool.

In the example of the blade assembly 5500 described to this point with respect to FIG. 55, the changes in weight distribution can be adjusted in a number of ways. In one example, a ballast can be added to the microchip package 5514 to bring the mass of the package as close as possible to the mass of the material removed to accommodate the microchip package 5514. As used herein, "ballast" is a material or object, in some examples one or more weights, added to the microchip package to add weight to the package greater than the weight without the ballast, and wherein the ballast has no electronic function other than electromagnetic shielding or other than housing contents of the package. In one example, such as where the microchip package is formed from opposite housing sides, one or more of the housing sides can include cavities separated from one or more other components in the package (for example battery, printed circuit board, contacts, or the like), and one or more balanced items can be placed in the cavities. For example, one or more items of metal, glass or other weight elements can be placed in the cavities. The location or locations of cavities or other receptacles for one or more ballast elements preferably allows the ballast element or ballast elements to come as close as possible to the center of mass of the removed or cut out portion of the core, while taking into account the mass added by the microchip package itself. For example, the weight distribution of the ballast or ballast elements combined with the weight and distribution of the microchip package is made to be as close as possible to the weight and distribution of any core material removed to accommodate the microchip package.

In another example of accounting for altered weight distribution due to the single microchip package 5514, an identical cut out and microchip package can be placed diametrically opposite and at the same radial distance on a diameter 5518 as the microchip package 5514. The respective weights and centers of mass of the single microchip package 5514 and its counter microchip package can be adjusted so that there is no effective weight difference on the diameter 5518 that contains the microchip package 5514 and its counter microchip package. In the example of a counter microchip package, such counter package can be functional or nonfunctional. If the counter package is functional, the counter package can be configured to be identical or similar to any of the microchip packages suitable for the application and the tool.

As an alternative to a counter package diametrically opposite a microchip package such as microchip package 5514, the same or similar balance can be achieved by multiple counter microchip packages. For example, two microchip packages positioned at the same radial distance from the center as the microchip package 5514 but equidistant from the diameter 5518 can have the effect of producing a weight having a center of mass on the diameter 5518 at the same radial distance as the microchip 5514. The multiple packages can be functional microchip packages or nonfunctional packages. Non-functional packages can be used to more easily make weight adjustments without regard to required functionalities. As described more fully below, other microchip packages can be included in an assembly such as that illustrated in FIG. 55, in which case there is more flexibility in the configuring and positioning of microchip packages to minimize weight distribution issues.

It is understood that a blade assembly 5500 supported on a tool using a wider blade flange, extending for example to cover the microchip packages such as at 5508, is affected to a lesser extent by weight variations across a diameter because the blade flanges clamp the tool in such a way that reduces the effects of changes in the weight distribution. Therefore, there may be a reduced need for accounting for changed weight distributions. Conversely, a tool supported by a smaller blade flange for example that extends to the perimeter of 5506 may be affected more by weight variations across a diameter such as diameter 5518.

In addition to weight variations that may occur with cutting of material and/or mounting or embedding the body of a microchip package such as that of 5514, the antenna 5516 and any other external conductors, sensors or other apparatus associated with a respective microchip package such as 5514 have weight or mass associated with them. It is desirable to account for such weight and its effect on weight distribution changes on the tool to reduce, minimize or eliminate the effect of such weight distribution changes. In the present example of the laminated blade core with the first and second layers 5510 and 5512, respectively, and the adhesive therebetween, the antenna 5516 is positioned between the facing layers and surrounded by adhesive. The antenna is positioned and maintained in place by radially-extending grooves formed in opposite faces of the first and second layers, and the antenna sandwiched in the channel formed by the opposing grooves. In the tool assembly 5500, the grooves extend from the outer portion of the microchip package 5514 to the gullet at the perimeter area of the blade core. To preferably counterbalance the effects of the weight removed when the grooves are formed, combined with the weight added with the antenna (along with any other component external to the package), a diametrically opposite groove can be formed along the diameter 5518 positioned and extending the desired distance along the diameter to counterbalance as closely as possible the weight distribution changes caused by the antenna 5516 and/or any other additional components.

Additionally, to the extent that weight distribution changes caused by the microchip package 5514 cannot be fully counterbalanced with a counter package, it is possible that such residual weight distribution changes can be accounted for by grooves or other geometries along the diameter 5518 on a side of the arbor hole 5502 opposite the microchip package 5514 and the antenna 5516. Counterbalancing can be achieved in a number of ways. Weight can be added, subtracted, or both to achieve the desired result, including possibly achieving the same center of mass as the removed material. Weight can be added by adding a component either outside one or both of the first and second layers, embedded in one or both of the layers, or sandwiched between the layers. Weight can be added by adding material with a greater mass than that removed. For example, weight can be fastened, bolted, riveted or welded onto a surface, either internal to or outside one or both of the layers. For example, a weld line can be applied to one or both of the layers having the desired geometry and distribution to counterbalance weight changes in the tool assembly. Weight can be subtracted by cutting or machining material from the tool, for example from one or both of the layers. Weight can be both added and subtracted by adding in one area and subtracting from another area, for example as a function of distance from the center of the tool. For example, grooves formed in the first and second layers to accommodate the antenna 5516 have material removed from the layers to form the grooves and material added in the form of the antenna 5516. Counterbalancing can be achieved for example by removing material on the opposite side of the core along the diameter 5518 and by adding material in the form of a wire or other structure approximating the math and distribution of the antenna 5516. To optimize the counterbalancing, more material or less material may be removed for forming the groove, and a lighter or heavier counter-antenna can be used to produce the desired counterbalancing. Additionally, the length of the counter grooves and the length of the counter-antenna can be selected as desired to produce the desired center of mass. As noted previously, counterbalancing can be carried out piece by piece, for example microchip package and counter microchip package separate from the calculation for the antenna and counter-antenna, or carried out in aggregate, for example microchip package and antenna to be counterbalanced by the combination of counter microchip package with counter antenna and its grooves. Furthermore, with multiple components as illustrated in FIG. 55 and discussed more fully below, counterbalancing may be more easily achieved with a larger number of components, providing more degrees of freedom or calculation for achieving the counterbalancing.

The microchip package 5514, as well as any of the other microchip packages described herein, including below with respect to FIG. 55, can be formed from two sides in the manner described below with respect to the two sides 5602 and 5604 (FIG. 56), bonded or welded together, for example ultrasonically around a perimeter of the package. The two sides may be formed from an impact resistant plastic, for example the type PA 6 plastic. One or both sides may include one or more translucent areas, such as may be covering an LED or other visible indicator. The indicator can be used to indicate to the user whether or not the microchip package is functioning properly, is paired with another electronic device, such as an electronic device on the machine, a communications device, a control device, or other functional device, or for other purposes. If the microchip package 5514 is a Type 1 package, it may include a memory device, internal antenna or external antenna 5516, a processor or other digital or analog circuitry illustrated generically at 5610 for allowing writing of information to the package and reading the information when needed, along with a printed circuit board supporting such components with appropriate contacts, contact points 5612 for external sensors and devices, and the like.

A Type 2 and/or Type 3 microchip package is also illustrated in FIG. 55 at 5520, the type of which will depend on its functionality and components associated with the package. In the package illustrated at 5520 can be formed from two sides 5602 and 5604 (FIG. 56), bonded or welded together, for example ultrasonically around a perimeter 5606 of the package. The package is secured and held in place by the perimeter 5606 extending between opposite layers 5510 and 5512 of the tool, and can also or alternatively be held in place with adhesive, epoxy or similar fixing means. The package includes a circular battery power supply 5614 (FIG. 56) at an inboard portion of the package, and coupled to the circuit board shown generically at 5610 for powering the components on the circuit board. With any of the microchip packages that would include a battery, the battery can be fixed and/or embedded in the microchip package, or the battery can be placed in a battery receiver so that the battery can be replaced as needed. Any of the batteries that might be placed in microchip packages of the type described herein can be fixed or replaceable, as desired. The circuit board 5610 includes one or more integrated circuits and one or more analog components, as necessary for the intended functionality. In the present example, the printed circuit board includes a plurality of contacts 5612, and in the example of the microchip package 5520, a strain sensor 5522 is coupled to the printed circuit board through a lead 5616 and one or more of the contacts 5612. Also in the present example, an antenna 5524 is coupled to the microchip package 5520, though it is understood that the microchip package could include an internal antenna 5608, in place of or in addition to the antenna 5524.

In another example of a tool assembly 5500, as illustrated in FIG. 55, the tool assembly 5500 can include a plurality of microchip package assemblies, and one or more of the microchip package assemblies can be Type 1, Type 2, and/or Type 3, as desired. The same comments as provided above with respect to the microchip package 5514 also apply to each individual microchip package positioned at other locations of the assembly 5500. This example of the tool assembly 5500 will include all of the microchip packages and associated components that are illustrated in FIG. 55, while it is understood that any one or more of the microchip packages and/or associated components can be omitted or substituted with other microchip packages or components. In the illustrated example, all of the microchip packages are positioned at the same distance radially from the center and are spaced apart evenly through 360 degrees about the arbor hole 5502.

In this example, the tool assembly 5500 is a laminated structure as previously described, and the microchip packages are supported and retained in the laminate in the same manner as the microchip package 5514 and 5520, for example as illustrated in FIG. 56. Also as previously described, the tool can be secured and supported in place by any of a number of blade flange configurations. The blade flange configuration may be selected as a function of the types of microchip packages to be used on the tool.

In this exemplary tool assembly 5500, the microchip package 5514 is an asset package or microchip package containing the desired tool information, usage information, machine information on which the tool is to be used, as well as any other data desired, such as that described herein. The microchip package 5514 can be configured to provide an alarm when the tool is operated outside permitted or accepted operating boundaries, for example operationally (speed, temperature, etc.), geographically (within or outside a jobsite), temporally (during business hours or after business hours), and/or other desired boundaries. The microchip package can be set to send data upon request, at predetermined times, or otherwise, and/or may include software to place the microchip in sleep mode, or to wait. The microchip may also include information and algorithms to allow finding and retrieving the tool if it is lost but still within range of a communications device, such as one or more of the devices described herein. The microchip package 5514 is illustrated as having an antenna 5516, but other communication configurations and modes are possible. Additionally, each of the other microchip packages except for the LED package in this example of the tool 5500 will also have similar antenna configurations as described previously with respect to the previous example of the tool assembly 5500, and their antenna configurations will not be discussed further.

The tool assembly 5500 includes an LED microchip package 5526, which may have desired include an LED light source embedded in the package. The LED light source is turned on or off by a touch sensor 5528 in the package. Suitable conductors (not shown) extending radially outward from the LED package 5526, for example in grooves formed in facing surfaces of the first and second layers and embedded in the adhesive, provide power to an LED light source 5530 at the perimeter area of the tool assembly. The LED light source 5530 can be a single LED, but in the present example includes respective LEDs on each side surface of the light source 5530, and a third LED light source in a perimeter portion of the light source 5530. The side LEDs can be different colors, for example red and blue, or the same color, and the perimeter light source can also be the same or different color. Different sides' LED colors give information about which side of the blade is visible, and the perimeter light source provides a measure of alignment as the blade is turning. The LED light source 5530 can be supported, mounted or embedded in the blade core as desired, for example in the same manner as any of the microchip packages.

Tool assemblies such as those described herein can include one or more temperature sensors, configured as desired, for example different locations radially, circumferentially, depth, and the like. In the present example of the tool assembly 5500 in FIG. 55, the tool assembly includes a temperature sensing microchip package 5532, its associated antenna for communications, and a conductor coupled to the microchip package 5532 extending radially outward to a thermocouple assembly 5534 adjacent the perimeter area of the tool assembly. The thermocouple assembly 5534 in the present example is hermetically sealed or otherwise encased in a protective cover, and is illustrated with a portion of the first layer 5510 removed. The conductor and the thermocouple are positioned in and retained in oppositely facing grooves in the first and second layers. The thermocouple senses the temperature in the perimeter area, closely adjacent the cutting segments mounted to the perimeter of the blade core. The temperature sensing microchip package 5532 includes the conventional electronics for sensing temperature, including for example as a function of time if desired, at a desired sampling rate, as determined by a clock on an appropriate integrated circuit on the microchip package 5532. As with each of the microchip packages, they are powered with a suitable power source, such as a conventional battery. Temperature data as sensed, recorded and/or stored can be communicated over the antenna associated with the microchip package. In an alternative configuration, as with any of the microchip packages of Type 1, 2 and 3, described herein, a microchip package can communicate over a short-range to a nearby microchip package, which can then record, store and/or retransmit such data to another device, such as the machine, communications device such as a cell phone, tablet or computer, or otherwise processed the information.

In the exemplary tool assembly 5500, the assembly further includes an additional temperature sensing microchip package 5536 which may be identical to or similar to the microchip package 5532, and includes conductors extending radially outward to a thermocouple 5538, which may be identical or similar to thermocouple 5534 and its conductor. The temperature sensing microchip package 5536 and the thermocouple 5538 measure or sense the medial temperature of the blade core interior to the perimeter area, but exterior to the center of the blade core, and record, store and/or transmit such temperature information in a manner identical or similar to that for the temperature sensing microchip package 5532. The thermocouple 5534 and conductor are positioned and retained in the blade core in a manner similar to that discussed with respect to the thermocouple and conductor for 5534.

In a manner similar to the temperature sensing microchip packages 5532 and 5536, an additional temperature sensing microchip package 5540 can also be included. With the microchip package 5540, temperature is sensed in the flange area of the core, and does not require an external thermocouple. In the microchip package 5540, the package includes an onboard temperature sensor, for example a thermocouple within or on the surface of the microchip package. The temperature is recorded, stored and/or transmitted from the microchip package 5540 over the associated antenna, depending on the design configuration of the microchip package.

The exemplary tool assembly 5500 also includes an accelerometer microchip package 5542, with a function and result similar to the accelerometers described and illustrated herein. The accelerometer senses motion, can be used to record start and stop times, in conjunction with a suitable clock and processor and memory, speech, vibration, and other tool and operating characteristics. The data can be recorded, stored or processed and/or communicated as desired, including as described herein.

Geolocation (GPS) apparatus and software can be included on a microchip package on any of the tools described herein, or on one of several of the microchip packages that may be on a tool such as one or more of those described with respect to the tool assembly 5500, or on a further discrete microchip package (not shown). GPS apparatus and software on a microchip package can be included on one or more of a tool, a machine for operating the tool, or a nearby portable communications device for receiving, storing and/or communicating data from the tool. In the example of a nearby portable communications device, the portable communications device would be configured for allowing a communications link, either permanently or intermittently, for transferring data either from the microchip package on the tool or to and from the microchip package on the tool. The nearby portable communications device could be a custom manufactured electronic device or dedicated device, a cell phone, tablet or other multipurpose computing device, a nearby vehicle, or nearby structures containing equipment for receiving, storing and/or communicating data from the tool.

In an example where GPS apparatus and software is not included on the tool, geolocation information for the tool can be derived based on the location information of equipment with which the tool is paired, where such equipment has GPS apparatus and software. The tool is paired with such equipment provided at least that the tool is within a certain known perimeter for reliable communications between the tool and such equipment. Other requirements for pairing may also be implemented, if desired. For example, some communications protocols, for example Bluetooth or WiFi/radio technologies, are useful over short, known distances, which can be used to estimate location of a tool paired with a device having GPS apparatus and software. As noted above, such a device can be a machine for operating the tool, a nearby portable communications device, or the like.

A GPS microchip package can be set to acquire data continuously, or intermittently, either according to a schedule or randomly. GPS data can be stored on the microchip package in suitable memory based on instructions from a processor, for example on an integrated circuit, in one example according to a schedule with an onboard clock, and the GPS functions can be powered with a battery or other power supply. In the example where a GPS microchip package is mounted on the tool assembly 5500, positioning data can be accumulated, recorded and communicated whenever the GPS system has access to satellites. In situations where satellite access is unreliable, for example when a tool is positioned under or within shielding structures (blade guards, driving equipment, housings, etc.) such a GPS microchip package can be turned off, deactivated or put in sleep mode until such time as satellites are available. Alternatively, GPS data can be obtained, recorded, processed and communicated through a helper device, which would have access to satellite signals. Such a helper device, including a portable communications device as described above, could be operating equipment, user's equipment such as cell phones, tablets, computers, vehicles, or the like. Once the helper device and the tool assembly are paired, linked or otherwise associated with each other, and remain or return often enough within range of each other, the GPS location of the helper device can be used to approximate or precisely locate the tool assembly.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A planar tool body for either a circular cutting tool or a chain cutting tool for working on a workpiece, including wood or concrete, wherein the tool body extends in a first direction from a first body location to a second body location on a periphery of the body, means on the first body location for mounting the tool to a machine to be used to operate the tool, at least one mounting surface on the second body location for supporting a wearing element on the tool, and an electronic circuit contained within a housing, and wherein the housing is supported by the planar tool body, wherein the housing contains a first sensor, and wherein at least one additional sensor is coupled to the electronic circuit through an opening in the housing, is supported by the tool body at a location external of the housing between the housing and the second body location and is for sensing a parameter associated with the tool, and a data transmission circuit coupled to the electronic circuit configured to allow a device remote from the electronic circuit to receive data associated with the parameter.

2. The tool body of claim 1 wherein the tool body is configured as a body for one of a circular saw, grinder core, groover core and chainsaw.

3. The tool body of claim 1 wherein the at least one additional sensor includes any one or more of a temperature sensor, a positioning sensor, an accelerometer, a centrifugal switch, a moisture sensor, electrical resistance sensor and a stress gauge.

4. The tool body of claim 1 wherein the electronic circuit includes a memory or storage circuit containing data corresponding to the tool.

5. The tool body of claim 4 wherein the electronic circuit and the memory or storage circuit are configured to receive sensor data from the at least one sensor coupled to the electronic circuit.

6. The tool body of claim 1 wherein the electronic circuit includes an antenna.

7. The tool body of claim 6 wherein the antenna is positioned within the housing containing the electronic circuit.

8. The tool body of claim 6 wherein the antenna is positioned external to the housing containing the electronic circuit and coupled to the electronic circuit through an opening in the housing.

9. The tool body of claim 1 wherein the electronic circuit is configured to transmit data from the electronic circuit when the electronic circuit is activated by a remote device.

10. The tool body of claim 1 wherein the electronic circuit is configured to transmit data from the electronic circuit based on instructions in a microprocessor in the electronic circuit.

11. The tool body of claim 10 wherein the electronic circuit is configured to access data stored in the electronic circuit as a function of time and received from a sensor coupled to the electronic circuit.

12. The tool body of claim 1 wherein the housing includes a rim extending around at least part of a perimeter of the housing.

13. The tool body of claim 12 wherein the housing has a thickness and the rim has a thickness less than a thickness of the housing.

14. The tool body of claim 1 wherein the electronic circuit includes a positioning circuit.

15. The tool body of claim 1 further including a thermocouple and the thermocouple is coupled to the electronic circuit through an opening in the housing and is supported by the tool outside the housing.

16. The tool body of claim 15 wherein the thermocouple is a first thermocouple, and further including a second thermocouple positioned so as to be spaced apart from the first thermocouple.

17. The tool body of claim 16 wherein the second thermocouple is positioned outside of a housing containing the first thermocouple.

18. The tool body of claim 1 further including an output device electronically coupled to the electronic circuit.

19. The tool body of claim 18 wherein the output device includes an antenna extending out of the housing containing the electronic circuit.

20. The tool body of claim 18 wherein the output device includes a light source.

21. The tool body of claim 18 wherein the output device is positioned at a periphery of the body.

22. The tool body of claim 18 wherein the output device is positioned within a housing containing the electronic circuit.

23. The tool body of claim 1 wherein the tool body is a laminate and the electronic circuit is contained within a housing supported by the laminate.

24. The tool body of claim 23 wherein the electronic circuit housing includes a perimeter portion extending between layers of the laminate.

25. The tool body of claim 23 wherein a sensor is coupled to the electronics circuit and is positioned outside the housing.

26. The tool body of claim 23 wherein a further sensor is coupled to the electronic circuit and the further sensor is positioned adjacent a periphery of the tool body.

27. The tool body of claim 1 wherein the tool body further includes releasable sections wherein at least one of the releasable sections includes a microchip package.

28. A tool body for a circular cutting or grinding tool for working on a workpiece, wherein the tool body includes a wall defining a central opening for being supported on a drive component of the machine used to operate the tool, a perimeter portion configured to receive wearing elements, and wherein the tool body extends from the central opening to the perimeter portion, an electronic circuit in a microchip package supported by the tool body wherein the electronic circuit includes a sensor and a communication circuit for communicating with a device external to the tool body, and further including an additional sensor coupled to the electronic circuit through an opening in the microchip package wherein the sensor is supported by the tool body and positioned between the microchip package and the perimeter portion.

29. The tool body of claim 28 wherein either one of the sensor and the additional sensor includes any one or more of a temperature sensor, a position sensor, an accelerometer, a centrifugal switch, a moisture sensor, an electrical resistance sensor and a stress gauge.

30. The tool body of claim 28 wherein the microchip package is supported by the tool body at an annular position such that a portion of the microchip package would be covered by a blade flange.

31. The tool body of claim 28 wherein the microchip package is a Type 3 microchip package.

* * * * *